US009152851B2

(12) United States Patent
Goulding et al.

(10) Patent No.: US 9,152,851 B2
(45) Date of Patent: Oct. 6, 2015

(54) SYSTEMS AND METHODS FOR BEHAVIORAL MONITORING AND CALIBRATION

(75) Inventors: Evan Goulding, San Francisco, CA (US); A. Katrin Schenk, San Francisco, CA (US); Laurence Tecott, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 414 days.

(21) Appl. No.: 12/863,970

(22) PCT Filed: Jan. 21, 2009

(86) PCT No.: PCT/US2009/031591
§ 371 (c)(1),
(2), (4) Date: Sep. 1, 2010

(87) PCT Pub. No.: WO2009/094396
PCT Pub. Date: Jul. 30, 2009

(65) Prior Publication Data
US 2010/0324861 A1  Dec. 23, 2010

Related U.S. Application Data

(60) Provisional application No. 61/062,173, filed on Jan. 23, 2008.

(51) Int. Cl.
*A01K 1/03* (2006.01)
*G06K 9/00* (2006.01)
*A01K 29/00* (2006.01)

(52) U.S. Cl.
CPC ............ *G06K 9/00335* (2013.01); *A01K 1/031* (2013.01); *A01K 29/005* (2013.01)

(58) Field of Classification Search
USPC ................................ 119/51.02, 417, 420, 421
See application file for complete search history.

(56) References Cited

U.S. PATENT DOCUMENTS 3,540,413 A * 11/1970 Castaigne ..................... 119/421
3,974,798 A *  8/1976 Meetze, Jr. ................... 119/421
(Continued)

FOREIGN PATENT DOCUMENTS

JP  2009500042  1/2009
WO  2009/094396  7/2009

OTHER PUBLICATIONS

Chinese Office Action issued Feb. 22, 2013, in Application No. 200980110652.8.
(Continued)

*Primary Examiner* — David Parsley
(74) *Attorney, Agent, or Firm* — Weaver Austin Villeneuve & Sampson LLP

(57) ABSTRACT

Systems and methods for the analysis of the diverse behaviors of animal subjects in defined areas are provided, including tools for filtering and analysis of high-resolution behavioral data. These systems and methods provide an opportunity to examine behavioral patterns with levels of precision and quantization that have not been previously achieved. Methods and systems for managing and analyzing the very large and unique datasets produced by behavioral monitoring systems, including quality assessment and control, archiving, data query, data reduction, analytical procedures and visualization techniques are provided. Such detailed analyses of spontaneous behavior provide fundamental insights into the neural organization of behavior and enable detection of genetic, pharmacological and environmental influences on brain function with high sensitivity.

27 Claims, 39 Drawing Sheets

(56) References Cited

U.S. PATENT DOCUMENTS

| | | | | |
|---|---|---|---|---|
| 4,337,726 | A * | 7/1982 | Czekajewski et al. | 119/421 |
| 4,917,117 | A * | 4/1990 | Brom et al. | 600/595 |
| 4,969,417 | A * | 11/1990 | Sakano | 119/421 |
| 5,163,380 | A * | 11/1992 | Duffy et al. | 119/418 |
| 6,715,444 | B1 * | 4/2004 | Yabusaki et al. | 119/421 |
| 7,086,350 | B2 * | 8/2006 | Tecott et al. | 119/421 |
| 2003/0028327 | A1 | 2/2003 | Brunner et al. | |
| 2003/0100998 | A2 * | 5/2003 | Brunner et al. | 702/19 |
| 2004/0217858 | A1 * | 11/2004 | Ingley et al. | 340/539.26 |
| 2005/0066910 | A1 * | 3/2005 | Tecott et al. | 119/421 |
| 2007/0236356 | A1 * | 10/2007 | Zhang et al. | 340/573.2 |

OTHER PUBLICATIONS

Chinese Office Action mailed Oct. 29, 2013, for Application 200980110652.8.
Australian Patent Examination Report dated Jan. 9, 2014, issued in Application No. 2009206511.
Japanese Notification of Reason(s) for Rejection mailed Oct. 1, 2013, in Application No. 2010-544397.
Chinese Office Action mailed Jan. 22, 2013 for Application 200980110652.8.
International Search Report and Written Opinion dated May 22, 2009, issued in Application No. PCT/US 09/031591.
Australian Patent Examination Report dated Apr. 8, 2013, issued in Application No. 2009206511.
Chinese Third Office Action dated Apr. 22, 2014 issued in CN Application No. 200980110652.8.
Australian Examination Report No. 3 dated Jun. 15, 2014 issued in AU Application No. 2009206511.
Japanese Notification of Reasons for Rejection dated Aug. 12, 2014 issued in JP Application No. 2010-544397.
Chinese Fourth Office Action dated Oct. 27, 2014 issued in CN Application No. 200980110652.8.

* cited by examiner

SYSTEMS AND METHODS FOR BEHAVIORAL MONITORING AND CALIBRATION

CROSS-REFERENCE TO RELATED APPLICATIONS

This application claims benefit of and priority to U.S. Ser. No. 61/062,173, filed on Jan. 23, 2008, which is incorporated herein by reference in its entirety for all purposes.

STATEMENT OF GOVERNMENT SUPPORT

This invention was made with government support under grant no. K08 MH071671, awarded by the National Institutes of Health. The government has certain rights in the invention.

BACKGROUND OF THE INVENTION

To survive and reproduce, animals acting in their natural environments must engage in a variety of behaviors such as procuring food, escaping predators, and seeking shelter or sexual partners. Because environmental constraints determine the most suitable times and places to perform specific behaviors and because many behaviors cannot be performed simultaneously, it is essential for animals to appropriately prioritize and organize when and where to engage in a particular behavior. As a result, the organization of behavior in a freely acting animal represents an adaptation to the environment This organization depends on the integrative activities of the central nervous system and reflects the functions and interactions of a diverse array of physiological and behavioral systems such as those regulating energy balance, thermal status, osmotic/volume status, sleep, reproduction, defense, and environmental entrainment. The ability to monitor and characterize the organization of behavior in a freely acting animal thus has the potential to provide a sensitive assay for examining the functions and interactions of numerous physiological and behavioral systems.

Substantial limitations currently exist in our ability to apply recent biotechnological advances to analyze neural substrates of complex mammalian behavior. In contrast to the rapid pace of innovation seen in the fields of mammalian genomics, medicinal chemistry and information technology, less progress has been made in the development of behavioral assessment techniques for mice or other mammals. Such procedures are vital for exploring the impact of genes, drugs and environment on brain functions relevant to common neuropsychiatric conditions such as schizophrenia, depression, and anxiety. Standard approaches, for example involving repeated removal of mice from their home cages for a battery of behavioral tests, are problematic because: 1) they are time-consuming and labor-intensive, 2) the order of test administration can skew the resulting data, 3) removal of mice from the home cage produces stress that confounds interpretation of behavioral data, and 4) data are frequently misinterpreted due to a failure to consider behavioral domains that are not the main focus of study (e.g.: impact of anxiety on tests of learning).

SUMMARY OF THE INVENTION

Systems and methods for the continuous monitoring of the diverse behaviors of animal subjects in defined areas are provided, including tools for filtering and analysis of high-resolution behavioral data. These systems and methods provide an opportunity to examine behavioral patterns with levels of precision and quantization that have not been previously achieved. Methods and systems for managing and analyzing the very large and unique datasets produced by behavioral monitoring systems, including quality assessment and control, archiving, data query, data reduction, analytical procedures and visualization techniques are provided. Such detailed analyses of spontaneous behavior provide fundamental insights into the neural organization of behavior and enable detection of genetic, pharmacological and environmental influences on brain function with high sensitivity.

One aspect of the invention relates to methods of quality assessment and filtering of behavioral data. In certain embodiments, the methods involve detecting inconsistencies between position tracking information and information about interaction with one or more devices and/or detecting inconsistencies in information about interaction with multiple devices. For example, in certain embodiments, a behavioral dataset including animal behavioral data collected over a measurement period using a measurement system, including event information regarding spatial position of an animal subject in a defined measurement area, device event information regarding behavior of the animal subject at or with a plurality of devices at known locations in the defined area, and temporal information associated with the position and device event information is received. The methods involve analyzing the behavioral data to detect 1) position information inconsistent with device event information, with said detection is based on the known location of the devices, and/or 2) device event information for one or more devices inconsistent with device event information for any other device, with said detection is based on temporal information associated with the device events; and updating the data based on at least some of the detected inconsistencies.

In particular embodiments, filtering the behavioral data set may involve receiving the collected behavioral data; identifying false device event onsets and removing associated device event information; calculating corrections to the position information by comparing the position information during at least some device events with the expected position of the animal based on the known location of the device; updating position information based on the calculated corrections; and identifying and removing data resulting from failure of the measurement system to detect termination of a device event.

Another aspect of the invention relates to organizing or classifying animal behavior into states, e.g., active and inactive states. According to certain embodiments, automated methods are provided that involve identifying transitions between active states and inactive states of the animal subject using spatial (e.g., position tracking) and temporal information received from a behavioral monitoring system. Also provided are methods of analyzing animal behavioral data collected using a measurement system, said behavioral data comprising spatial and temporal information regarding the position of the animal in a defined measurement area, the methods involving using the spatial information to identify transitions between active and inactive states by determining the location of the longest duration between animal subject movements during a time period.

Another aspect of the invention relates to behavioral bout classification. In certain embodiments, automated methods of analyzing a set of animal subject behavioral data collected over a measurement period using a measurement system are provided. The automated methods involve receiving position tracking information for the animal subject in a defined area during the measurement period and information about temporal patterns of one or more behaviors during the measurement period; and using the position tracking information and the temporal information to identify bouts of the one or more behaviors.

In certain embodiments, method of analyzing a set of animal subject behavioral data collected over a measurement period using a measurement system that involve receiving spatial information regarding the spatial position of the animal subject during the measurement period and information about temporal patterns of one or more behaviors during the measurement period; using the spatial information and the temporal information to identify bouts of the one or more behaviors, wherein the spatial information comprises information about the spatial position of the animal subject during events and inter-event intervals, wherein an inter-event interval is the interval between consecutive device events at a device, are provided.

Another aspect of the invention relates to comparing two groups of animal behavioral data (e.g., a control and a test group). In certain embodiments, the methods involve clustering the combined data for two groups and determining the cluster that contributes most to the difference to the two groups. In particular embodiments, the methods involve receiving a test dataset having behavioral data associated with a group of test animal subjects; receiving a control dataset having behavioral data associated with a group of control animal subjects; combining the behavioral data from the test and control datasets; clustering the combined dataset into a selected number of clusters; calculating a chi-square statistic for each cluster based on the hypothesis that the behavioral data in the control and test data sets is the same; summing the chi-square statistic for all clusters to obtain a measure of the difference between the test group data and the control group data; obtaining a measure of the significant of the difference by permuting data for the animal subjects between the test and control groups; and if the difference is statistically significant, determining the clusters that contribute most to the difference.

According to various embodiments, patterns of behavior that may be compared include patterns of movement, patterns of feeding, patterns of drinking, patterns of drug ingestion, patterns of other ingestive behaviors, patterns of sleeping, patterns of contact with a test object, and patterns of response to another animal or other sensory stimuli. Physiological measurements, e.g., indicating behavioral measurements or responses, may also be compared, including, heart rate, metabolic rate, blood pressure and body temperature.

Also provided are computer program products including machine-readable media on which are stored program instructions for implementing at least some portion of the methods described above. Any of the methods described herein may be represented, in whole or in part, as program instructions that can be provided on such computer readable media. Also provided are various combinations of data and data structures generated and/or used as described herein.

These and other features and advantages will be described in more detail below with reference to the associated figures

BRIEF DESCRIPTION OF THE DRAWINGS

FIGS. 17A-17-B shows a screen shot of a Stage 2 QC GUI showing an example of a flagged failure-to-detect error. Panel A in the figure shows no licking events in the event plot except for one at the very end of the day while Panel B shows that the amount of water that the mouse consumed that day (value highlighted within square) is similar to normal daily intake for this and other mice (apx. 4 g) strongly suggesting a failure to detect licking events.

FIG. 24A shows average daily intakes and movement. For each group, the edges of the boxplots show the 75th and 25th percentile values, and the line within the box indicates the median. Data for each mouse shown as dots. The OB mice exhibit a significant decrease in movement ($p=4.3\times10^{-8}$: WT 471±37 m, OB 78±5 m) without significant changes in food ($p=0.047$: WT 3.9±0.1 g, OB 4.16±0.08 g) or water ($p=0.2$: WT 3.3±0.1 g OB 3.6±0.1 g) intake.

FIG. 24B shows average daily bout intensity for feeding, drinking, and locomotion. The OB mice exhibit a significant decrease in the intensity of locomotion bouts ($p=7.9\times10^{-11}$: WT 13.3±0.4 cm/s, OB 5.0±0.2 cm/s) without significant changes in the intensity of feeding ($p=0.6$: WT 0.78±0.03 mg/s, OB 0.76±0.03 mg/s) or drinking ($p=0.03$: WT 7.4±0.3 mg/s, OB 6.4±0.3 mg/s) bouts.

FIG. 24C shows average time budgets. The pie charts for each group display the division of time between the IS (black) and bouts of feeding (orange), drinking (blue), locomotion (green), and other behaviors (red). The OB mice demonstrate a significant increase in percent time spent in the IS ($p=2.3\times10^{-10}$: WT 66.8±0.9%, OB 83.5±0.5%) and significant decreases in the percent time spent in bouts of locomotion ($p=2.4\times10^{-5}$: WT 3.7±0.3%, OB 1.8±0.1%) and other behavior ($p=3.7\times10^{-11}$: WT 22.4±0.7%, OB 7.4±0.4%). No significant changes in percent time spent in feeding ($p=0.6$: WT 6.4±0.4%, OB 6.7±0.2%) and drinking ($p=0.08$: WT 0.63±0.03%, OB 0.71±0.03%) bouts. Bonferroni corrections were applied for multiple testing in evaluating the significance of amounts and intensities (3 tests: chow, water, movement) and time budgets (5 tests: inactive state, feeding, drinking, locomotion, and other bouts).

FIG. 25A shows average daily intakes and movement. The 2C mice exhibit significant increases in movement ($p=0.01$: WT 515±50 m, 2C 712±57 m) and food intake ($p=0.007$: WT 4.4±0.1 g, 2C 4.81±0.09 g) without a significant change in daily water intake ($p=0.8$: WT 3.6±0.1 g 2C 3.6±0.1 g).

FIG. 25B shows average daily bout intensity for feeding, drinking, and locomotion. The 2C mice exhibit a significant increase in the intensity of locomotion ($p=0.006$: WT 12.5±0.4 cm/s, 2C 13.9±0.3 cm/s) and feeding bouts ($p=0.01$: WT 0.98±0.07 mg/s, 2C 1.22±0.04 mg/s) without significant changes in the intensity of drinking bouts ($p=0.8$: WT 7.6±0.3 mg/s, 2C 7.7±0.4 mg/s).

FIG. 25C shows average time budgets. The 2C mice demonstrate a significant decrease in percent time spent in the IS ($p=4.8\times10^{-5}$: WT 66±1%, 2C 57±2%) and a significant increase in percent time spent in bouts of other behavior ($p=9.2\times10^{-7}$: WT 22.8±0.7%, 2C 32±1%). No significant changes in the percent time spent in feeding ($p=0.02$: WT 6.4±0.5%, 2C 5.0±0.2%), drinking ($p=0.7$: WT 0.61±0.02%, 2C 0.64±0.04%) or locomotion bouts ($p=0.04$: WT 4.4±0.3%, 2C 5.5±0.4%).

FIG. 27A shows AS Probability (G $p=1.7\times10^{-10}$, T $p=8.2\times10^{-64}$, G×T $p=2.0\times10^{-29}$); FIG. 27B shows AS Onset Rate (G $p=2.5\times10^{-6}$, T $p=7.8\times10^{-13}$, G×T $p=1.4\times10^{-6}$); FIG. 27C shows AS Duration (G $p=0.96$, T $p=5.7\times10^{-25}$, G×T $p=2.8\times10^{-8}$) and FIG. 27D shows IS duration (G $p=5.7\times10^{-8}$, T $p=4.9\times10^{-32}$, G×T $p=1.0\times10^{-5}$).

FIG. 28D shows AS Probability (G $p=8.9\times10^{-5}$, T $p=7.0\times10^{-148}$, G×T $p=1.2\times10^{-9}$); FIG. 28B shows AS Onset Rate (G $p=0.002$, T $p=1.4\times10^{-52}$, G×T $p=4.4\times10^{-13}$); FIG. 28C shows AS Duration (G $p=0.5$, T $p=1.8\times10^{-48}$, G×T $p=1.2\times10^{-6}$)

FIG. 28E shows comparison clustering plots. Comparison clustering reveals a significant difference in the circadian time variation of AS number and duration between WT and 2C mice ($\Sigma\chi^2=233$, $p=0.001$). Cyan dots indicate regions where the WT mice contribute significantly fewer active states than the 2C mice. The regions with significant differences account for 48.3% of the $\Sigma\chi^2$.

FIGS. 29A1-29A4 and 29B1-29B4 display plots showing feeding and locomotion bout properties for WT and OB mice. The variation with time of day are shown as follows: (FIG.

29A1) Chow intake (G p=0.1, T p=5.7×10$^{-38}$, G×T p=3.4× 10$^{-8}$); (FIG. 29A2) Feeding bouts per hour (G p=8.3×10$^{-7}$, T p=2.5×10$^{-28}$, G×T p=2.8×10$^{-19}$); (FIG. 29A3) Feeding bouts per active state hour (G p=4.4×10$^{-5}$, T p=8.8×10$^{-5}$, G×T p=0.2); (FIG. 29A4) Feeding bout size (G p=1.4×10$^{-5}$, T p=0.0004, G×T p=0.2); (FIG. 29B1) Movement (G p=2.8× 10$^{-8}$, T p=6.3×10$^{47}$, G×T p=1.6×10$^{-36}$); (FIG. 29B2) Locomotion 20 bouts per hour (G p=7.4×10$^{-7}$, T p=1.4×10$^{-44}$, G×T p=1.0×10$^{-32}$); (FIG. 29B3) Locomotion bouts per active state hour (G p=1.8×10$^{-6}$, T p=1.7×10$^{-18}$, G×T p=3.3× 10$^{-13}$), (FIG. 29B4) Locomotion bout size (G p=0.0167, T p=6.5×10$^{-7}$, G×T p=0.06).

FIGS. 30A1-30A4 and 30B1-30B4 display plots showing feeding and locomotion bout properties for WT and 2C mice. The variation with time of day are shown as follows: (FIG. 30A1) Chow intake (G p=0.01, T p=3.2×10$^{-92}$, G×T p=4.9× 10$^{-9}$); (FIG. 30A2) Feeding bouts per hour (G p=0.6, T p=6.1×10$^{-46}$, G×T p=0.001); (FIG. 30A3) Feeding bouts per active state hour (G p=0.3, T p=8.2×10$^{-10}$, G×T p=0.002); (FIG. 30A4) Feeding bout size (G p=0.4, T p=2.0×10$^{-54}$, G×T p=0.02); (FIG. 30B1) Movement (G p=0.016, T p=6.8× 10$^{-105}$, G×T p=3.8×10$^{-5}$); (FIG. 30B2) Locomotion bouts per hour (G p=0.002, T p=9.2×10$^{-106}$, G×T p=1.3×10$^{-8}$); (FIG. 30B3) Locomotion bouts per active state hour (G p=0.06, T p=4.2×10$^{-59}$, G×T p=2.9×10$^{-5}$); (FIG. 30B4) Locomotion bout size (G p=0.08, T p=4.2×10$^{-18}$, G×T p=0.006).

In FIGS. 31C-31F, variation in bout probability with time since the onset of the ASs for WT (open squares) and OB (filled circles) mice is displayed in one minute bins: (FIG. 31C) Feeding bouts (G p=4.6×10$^{-6}$, T p=3.3×10$^{-65}$, G×T p=6.2×10$^{-42}$); (FIG. 31D) Locomotion bouts (G p=0.2, T p=6.2×10$^{-18}$, G×T p=4.2×10$^{-13}$); (FIG. 31E) Drinking bouts (G p=0.6, T p=5.3×10$^{-3}$, G×T p=0.0002); (FIG. 31F) Other bouts (G p=9.9×10$^{-6}$, T p=6.7× 10$^{-63}$, G×T p=7.9×10$^{-34}$). Bonferroni corrections were applied for multiple testing in evaluating the significance of the bout probabilities (4 tests: feeding, drinking, locomotion, and other).

(FIG. 32C) Feeding bouts (G p=0.008, T p=4.9×10$^{-154}$, G×T p=1.2×10$^{-7}$), (FIG. 32D) Locomotion bouts (G p=0.6, T p=4.2×10$^{-22}$, G×T p=0.9), (FIG. 32E) Drinking bouts (G p=0.07, T p=7.1×10$^{-6}$, G×T p=0.05), (FIG. 32F) Other bouts (G p=0.002, T p=3.5× 10$^{-131}$, G×T p=0.0001).

(FIG. 36A) AS Duration (G p=0.96, T p=5.7×10$^{-25}$, G×T p=2.8×10$^{-8}$), (FIG. 36B) AS Chow (G p=5.6×10$^{-6}$, T p=2.8× 10$^{-21}$, G×T p=5.57×10$^{-5}$), (FIG. 36C) AS Water (G p=7.4× 10$^{-6}$, T p=9.6×10$^{-36}$, G×T p=4.6×10$^{-9}$), (FIG. 36D) AS Movement (G p=7.3×10$^{-5}$, T p=1.7×10$^{-20}$, G×T p=4.2× 10$^{-14}$).

(FIG. 37A) AS Duration (G p=0.5, T p=1.5×10–48, G×T p=1.2×10–6), (FIG. 37B) AS Chow (G p=0.8, T p=1.0×10–43, G×T p=7.2×10–11), (FIG. 37C) AS Water (G p=0.07, T p=1.5×10–50, G×T p=5.1×10–8), (FIG. 37D) AS Movement (G p=0.7, T p=5.7×10–43, G×T p=0.003).

FIGS. 38A1-38B4 shows drinking and "other" bout properties for WT and OB mice. The variation with time of day is shown as follows (FIG. 38A1) Water intake (G p=0.09, T p=9.6×10$^{-53}$, G×T p=7.5×10$^{-7}$), (FIG. 38A2) Drinking bouts per hour (G p=0.0006, T p=2.1×10$^{-50}$, G×T p=2.9×10$^{-6}$). (FIG. 38A3) Drinking bouts per active state hour (G p=0.5, T p=3.6×10$^{-12}$, G×T p=9.5×10$^{-7}$), (FIG. 38A4) Drinking bout size (G p=0.003, T p=0.002, G×T p=0.005), (FIG. 38B1) Other time (G p=2.2×10$^{-11}$, T p=3.3×10$^{-62}$, G×T p=3.5× 10$^{-40}$). (FIG. 38B2) Other bouts per hour (G p=2.9×10$^{-7}$, T p=1.6×10$^{-47}$, G×T p=1.4×10$^{-34}$). (FIG. 38B3) Other bouts per active state hour (G p=5.6×10$^{-7}$, T p=8.510$^{-18}$, G×T p=2.5×10$^{-11}$), (FIG. 38B4) Other bout duration (G p=0.003, T p=9.3×10$^{-9}$, G×T p=0.06). Bonferroni corrections were applied for multiple testing in evaluating the significance of water intake (3 tests: chow, water, movement), time spent in other bouts (5 tests: inactive, feeding, drinking, locomotion, other), bout rates (5 tests: inactive state rate, feeding, drinking, locomotion, and other), water bout size (3 tests: feeding, drinking, locomotion), and other bout duration (5 tests: inactive state, feeding, drinking, locomotion, and other).

FIGS. 39A1-39B4 shows drinking and "other" bout properties for WT and 2C mice The variation with time of day is shown as follows: (FIG. 39A1) Water intake (G p=0.8, T p=5.5×10$^{-101}$, G×T p=5.2×10$^{-9}$), (FIG. 39A2) Drinking bouts per hour (G p=0.04, T p=5.1×10$^{-73}$, G×T p=0.1), (FIG. 39A3) Drinking bouts per active state hour (G p=0.9, T p=3.9×10$^{-27}$, G×T p=0.003), (FIG. 39A4) Drinking bout size (G p=0.007, T p=9.4×10$^{-17}$, G×T p=0.9), (FIG. 39B1) Other duration (G p=1.6×10$^{-6}$, T p=6.2×10$^{-146}$, G×T p=2.0×10$^{-12}$), (FIG. 39B2) Other bouts per hour (G p=0.002, T p=7.5×10$^{-108}$, G×T p=3.4×10$^{-8}$), (FIG. 39B3) Other bouts per active state hour (G p=0.06, T p=8.9×10$^{-54}$, G×T p=4.8×10$^{-5}$), (FIG. 39B4) Other bout duration (G p=0.5, T p=8.9×10$^{-23}$, G×T p=0.2).

DETAILED DESCRIPTION OF THE PREFERRED EMBODIMENTS

1. Introduction and Relevant Terminology

Figure 1:
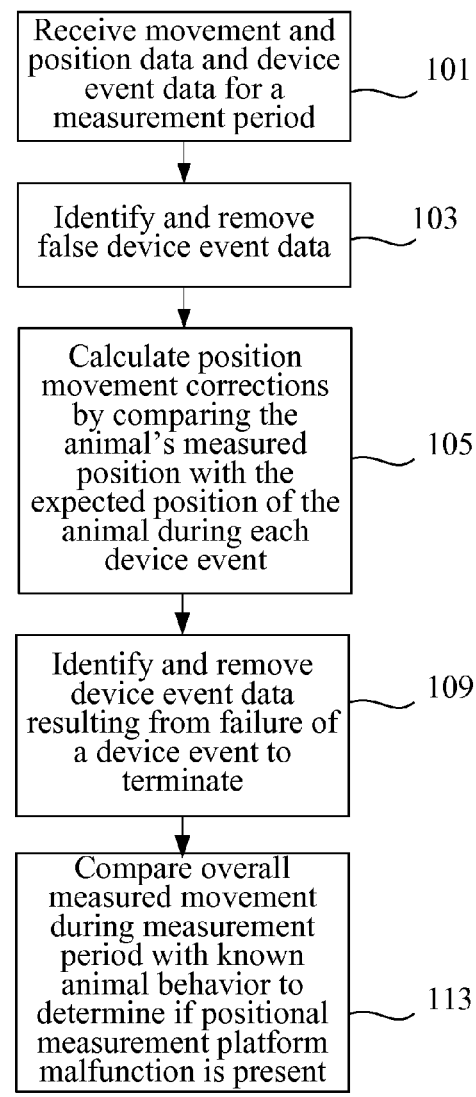
FIG. 1 is a flow diagram presenting certain operations employed in a method of filtering movement and device event data collected from a behavioral monitoring system in accordance with various embodiments of the present invention.

The present invention relates to methods, systems and apparatus for the collection, management, and analysis of high-resolution behavioral data. These systems and methods provide an opportunity to examine behavioral patterns with levels of precision and quantization that have not been previously achieved. Methods and systems for managing and analyzing the very large and unique datasets produced by behavioral monitoring systems, including quality assessment and control, archiving, data query, data reduction, analytical procedures and visualization techniques are provided. Such detailed analyses of spontaneous behavior provide fundamental insights into the neural organization of behavior and enable detection of genetic, pharmacological and environmental influences on brain function with high sensitivity.

While much of the description below is presented in terms of systems, methods and apparatuses that relate to behavior of animal subjects in home cage monitoring (HCM) systems, the invention is by no means so limited. For example, the methods and systems for filtering and analyzing behavioral data may be used with any behavioral monitoring system. In the following description, numerous specific details are set forth in order to provide a thorough understanding of the present invention. It will be apparent, however, that the present invention may be practiced without limitation to some of the specific details presented herein.

The invention relates to the filtering, data quality control and assessments, and analysis of data from behavioral monitoring systems. In general, the behavioral monitoring systems include one or more devices in a defined area, at or with which the animal subject(s) being monitored interact. The monitoring system may be a home cage monitoring system such as described in U.S. Pat. No. 7,086,350, titled "Animal Cage Behavior System," incorporated herein by reference in its entirety for all purposes. Typically, the monitoring system provides continuous monitoring of movement and device event data over a measurement period. For example, the monitoring system may provide data resulting from continuous monitoring of movement (e.g., in the form of spatial position versus time), as well as ingestive events, sensory stimuli events, etc.

The behavioral monitoring systems used in accordance with the methods and systems of the invention produce large volumes of data, e.g., a single subject over a day may produce tens to hundreds of thousands of movements, thousands to tens of thousands of ingestive events, etc. Multiplying this data by hundreds or thousands of subjects over weeks, years, etc. of observation requires techniques for robust automated quality assessment and correction of data. Methods and systems of data quality assessment and control are discussed below.

Another aspect of the invention are novel quantitative approaches for defining elements of behavior and their temporal and spatial organization, including data reduction, visualization and analysis methods that are the most biologically relevant. These approaches are facilitated by the data quality control algorithms. In particular, classification of clusters and bouts of behavior, as well as the classification of active and inactive states of behavior are described below. In certain embodiments, methods and systems are provided that allow behavioral classification to be performed in robust, automated fashion.

The following terms are used throughout the specification. The descriptions are provided to assist in understanding the specification, but do not necessarily limit the scope of the invention.

A behavioral event is an instance or occurrence of a particular type of behavior. Examples of types of behavioral events include events related to consumption behavior, (including consumption of food, liquid, medicines, pharmaceuticals, etc.), events related to movement behavior, events related to communication, events related to various common activities associated with the subject being monitored. For example, behavioral events that may be measured for a mouse in a cage include feeding, drinking and movement about the cage. Behavioral events that may be measured for a human include feeding, drinking, movement around a certain area, and using a particular electronic device such as a phone or computer, etc. Other behavioral events may relate to animal responses to particular stimuli or devices A device event is a behavioral event that involves interaction with a device at a known location. The location may be fixed or variable. Examples include feeding events, which occur at a feeder in a cage and lick events, which occur at lickometer in a cage. Other examples of a device event include use of a computer at a known location within a house, feeding events that occur at a particular restaurant as indicated by interaction with a device at that restaurant.

Examples of devices include a lickometer, a device that provides a measure of fluid consumption by an animal, and a feeder, a device that provides food to an animal in captivity. In certain embodiments, the feeder provides a measure of the amount of food consumed by the animal. Interaction with the device may be an interaction with the device necessary to the behavior being measured. For example, water consumption by a mouse may be measured at a lickometer by a change in capacitance in the licking spout when licked by the mouse to obtain water. Similarly, feeding may be measured by a photobeam and photobeam detector when an animal breaks a photobeam in order to reach food in a feeder. Other devices include running wheels, levers and holes. Levers and holes may be interacted with for delivery or provision of food, fluid, drugs, or any sensory stimulus. In certain embodiments, the device is an operant conditioning device. Interaction with a device may involve exposure to another animal, sensory stimuli (e.g., odorant) or a novel or familiar object, with the measurement providing behavioral information about the animal's subject response to the exposure or sensory stimuli, etc.

An inter-event interval is the interval between two behavioral events of the same type: for example, the interval between two photobeam breaks. Similarly if a certain behavior is measured by interaction with a computer, an inter-event interval may be the interval between keyboard keys being pressed, between mouse clicks, etc.

An event onset error refers to an erroneous measurement of the onset of an event when no device event in fact occurred. Jostling of a cage, brief occlusion of a photobeam by shifting chow or electromagnetic field noise detection by a lickometer are examples of sources of occasional spurious feeding and drinking event measurements.

An event termination error refers to an erroneous measurement that indicates that a device event is ongoing when it has in fact terminated. Examples of sources of event offset errors include feeder photobeams becoming blocked by food particles during a feeding bout. Lickometer failure could result from spontaneous dripping, or placement (by the mouse) of bedding material in the lick slot. Such errors, if undetected, would produce overestimates of device event length and an erroneous indication of prolonged activity by the animal at the device.

Movement data includes information about the movement of an animal subject in the measurement area. It may include spatial and temporal information, e.g., the spatial position of the animal at times during the measurement period. Movement data may also be collected at certain times, e.g., 1 second, though in many embodiments to reduce the amount of data in a raw data set, movement data may be collected when the animal moves more than a threshold amount. Data collection threshold distances vary according to the behavioral monitoring system and type of subject: for human subjects in a large measurement area, thresholds on the order of kilometers may be appropriate, for other animals, meters may be appropriate, for rodents centimeters, etc. Movement data may thus include the animal's positions and the time of each position, or the duration since the previous position. Position and/or movement may be measured by any number of mechanisms, including load beams, RFID transponders, satellite systems, video tracking, etc.

Drift refers to accumulated error associated with a measurement. Overall position drift is the drift in x and y coordinates (and/or other coordinates or dimensions if measured) in the measurement area at any time during a measurement period. For example, where load beams are used to monitor animal movement, movement measurements are influenced by changes in the distribution of mass within the cage. Changes may occur in the animal's body weight, in the amount of food in the feeder and water in the lickometer, as well as by shifting of bedding material. A shift of position information in the y axis, such that the locomotor path and the ingestive behavior locations shift up relative to the cage location may result from the removal of food and water from devices at the opposite end of the cage. Device event drift is the apparent drift in the location of a device as measured at each event. As with overall position drift, the device event drift is typically measured for each coordinate or dimension.

The animal subject(s) behavior can be broken down into bouts and clusters. Bouts are the occurrence or repeated occurrences of the same behavioral act or indication of a behavioral act (e.g., food consumption or photobeam breaks) that appear to cluster together in time and/or are not separated by the intervention of a different behavior. In certain embodiments, a bout may be characterized by the occurrence and/or repetition of a behavior at a particular location. Clusters are repeated bouts of the same behavioral act or indication of a behavioral act (e.g., food consumption or photobeam breaks) that appear to cluster together in time.

The animal subject(s) behavior may be further organized into states, e.g., active and inactive states. A state may be characterized by increased probability of a particular behavior or behaviors and/or the occurrence of these behaviors at one or more characteristic locations. For example, active states and inactive states may be classified. Active states are states in which there is an increased probability of some measured behaviors (such as feeding, drinking, or locomotion) occurring. Inactive states are states in which the probability of being in characteristic location or locations is high over some measurement window. These characteristic locations may act as refuge from predation or environmental conditions. During inactive states, the animal subject(s) may have an increased probability of engaging in certain measured behaviors (such as rest or sleep). Although for the sake of discussion, the below description chiefly refers to active/inactive state classification, the methods are not so limited and may be used but may used to identify and classify other states in which there is an increased probability of a particular behavior or behaviors occurring at a particular location or locations.

Embodiments of the present invention relate to tangible and intangible computer readable media or computer program products that include program instructions and/or data (including data structures) for performing various computer-implemented operations. Computer readable media or computer program products that include program instructions and/or data (including data structures) for performing various computer-implemented operations. Examples of computer-readable media include, but are not limited to, magnetic media such as hard disks, floppy disks, magnetic tape; optical media such as CD-ROM devices and holographic devices; magneto-optical media; semiconductor memory devices, and hardware devices that are specially configured to store and perform program instructions, such as read-only memory devices (ROM) and random access memory (RAM), and sometimes application-specific integrated circuits (ASICs), programmable logic devices (PLDs) and signal transmission media for delivering computer-readable instructions, such as local area networks, wide area networks, and the Internet. The data and program instructions of this invention may also be embodied on a carrier wave or other transport medium (e.g., optical lines, electrical lines, and/or airwaves).

Database refers to a means for recording and retrieving information. The database may also provide means for sorting and/or searching the stored information. The database can include any convenient media including, but not limited to, paper systems, card systems, mechanical systems, electronic systems, optical systems, magnetic systems or combinations thereof. In certain embodiments databases include electronic (e.g. computer-based) databases. Computer systems for use in storage and manipulation of databases are well known to those of skill in the art and include, but are not limited to "personal computer systems", mainframe systems, distributed nodes on an inter- or intra-net, data or databases stored in specialized hardware (e.g. in microchips), and the like.

2. Data Quality Control

Behavioral monitoring systems generate large volumes of data. For example, a 32 cage monitoring system for mice, each cage containing a food consumption indicator, a fluid consumption indicator an activity platform to measure movement, has 96 data collection devices. Per day, each device may record thousands of events, e.g., 500-5,000 feeding events, 1,000-10,000 lickometer events as well as 10,000-350,000 spatial positions. Robust automated quality assessment algorithms are needed to process these events. The effective use of large biological datasets requires novel methods for assessing data quality. Data quality can be compromised, for example, by mechanical failure or by idiosyncratic interactions of animal subjects with devices. Assessment of the quality of behavioral system data requires careful consideration of numerous factors that can compromise the quality of behavioral data.

Aspects of the present invention relate to quality control and assessment of large volumes of data generated by a behavioral monitoring system. According to various embodiments, the methods incorporate experimenter observations relating to periodic intake measurements, animal subject and device appearance, and environmental conditions. In addition, automated techniques are required to monitor the function of behavioral data collection devices are presented.

Behavioral monitoring systems that assess feeding, drinking and locomotor activity continuously, with high temporal and spatial resolution. The high resolution of the collected data is critical for the development of analytical approaches that discriminate behavioral patterns with high sensitivity. However, the complex nature and large size of these behavioral datasets pose multiple challenges. These include: 1) the requirement for a high-volume behavioral data management system for data storage and querying, 2) the development of quality control tools to detect and manage episodes of system noise, device failure and human error, and 3) the development of data reduction and analysis techniques to maximize the ability to detect genetic or other influences on behavioral patterns. Because these datasets are unique, novel solutions are required to meet these challenges.

As indicated above, the datasets typically contain data relating to movement or spatial position of an animal in the measurement area, as well as behavioral device event data from one, and more typically, multiple devices. According to various embodiments, the quality control methods involve analyzing the behavioral data to detect inconsistencies between the position information and device information and/or between information received from multiple devices.

FIG. 1 shows overviews of a process of filtering data according to certain embodiments, with FIGS. 2-6 showing details of specific embodiments of certain operations described in FIG. 1. Some or all of the operations described in the FIG. 1 may be used for data quality assessment and producing a filtered dataset to analyze. Additional quality control operations may also be performed. The process begins with receiving movement and device event data for a measurement period (101). The combined movement and device event data for a measurement period and measurement area (e.g., a cage) may be referred to as a dataset. The datasets may take any form, and may include data for multiple animal subjects, etc. In many embodiments, movement data is presented as position versus time data. Device event data may include indications of interaction with the device at various times during the measurement period. For example, position/locomotion data in the dataset may include a record of every time the animal moved a distance greater than a certain pre-determined distance (e.g., 1 cm, 10 feet, etc.). The data may be in the form of, e.g., the animal location and the time during the measurement period or the duration from the previous recorded location. Similarly, for drinking or eating behavior, a dataset may include the time of duration between signals from the food and fluid consumption devices. Data may be collected, e.g., using methods described in above-referenced U.S. Pat. No. 7,086,350, referenced above, received from external sources, etc.

The process continues by identifying and removing false device event data (103). This involves detecting event onset errors, also referred to as false device event onsets. Sources of spurious device events, such as jostling of the cage, brief occlusion of a photobeam by shifting chow, electromagnetic field noise detection by the lickometer may occasionally produce spurious feeding and drinking events. Similarly, in a behavioral monitoring system that relies on a subject to press a button on a mobile phone or tracker in a deliberate manner, a false device event onset may occur by inadvertent interaction. Any type of error that results in an indication of a device event when in fact no device event occurred is an event onset error. Although these events are typically infrequent, their significance is enhanced in embodiments in which device events are used for movement position correction (described below).

Figure 2:
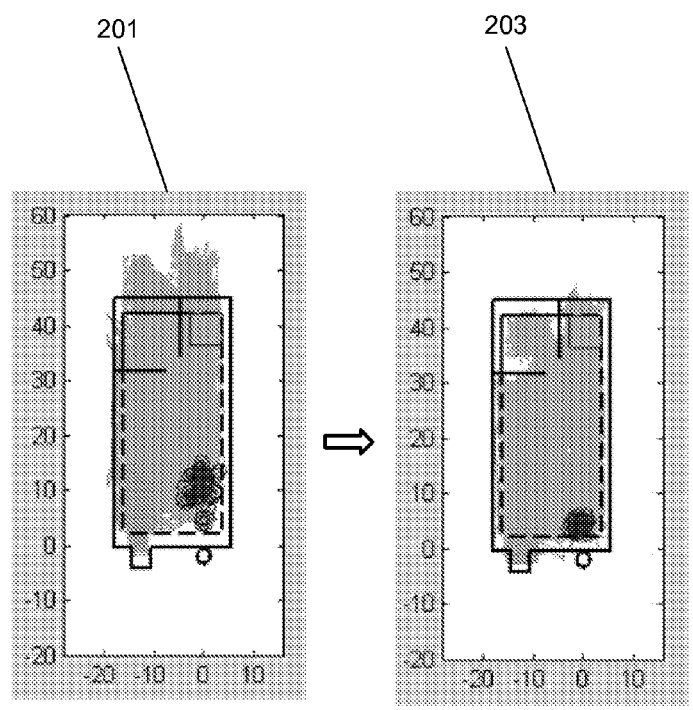
FIG. 2 is a screen shot depicting a 24-hr mouse behavioral record in which positions are indicated in green, feeding event locations in orange, and drinking event locations in blue.

After detecting event onset errors and removing the associated device event data from the data set, corrections to the position movement data are calculated (103). In certain embodiments, inaccuracies in position information may accumulate. For example, where load beams are used to monitor animal movement, movement measurements are influenced by changes in the distribution of mass within the cage. Changes may occur in the animal's body weight, in the amount of food in the feeder and water in the lickometer, as well as by shifting of bedding material. If such changes are not accounted for, then inaccuracies in position information result. An example of movement position error is shown in FIG. 2, which depicts a 24-hr behavioral record in which locomotor positions are indicated in green, feeding event locations in orange, and drinking event locations in blue. Here, at 201, we see evidence of a shift of position information in the Y axis, such that the locomotor path and the ingestive behavior locations shift backward (up), relative to the cage location. Such inaccuracies result from the removal of food and water from devices at the front of the cage.

FIG. 2 shows an example of inaccuracies that can result using a load beam in a cage to measure position information. Regardless of the position detection mechanism (load beam, video, RFID, etc.) and the measurement area, position information in the dataset may contain inaccuracies. The device events (e.g., drinking and feeder photobeam breaks) occur at known locations in the cage or other measurement area, and this information is used to correct movement and position data. The corrected behavioral record is depicted in FIG. 2 at 203. Details of one embodiment of correcting movement position data are described further below with respect to FIG. 6. It should be noted that because the known locations of the devices (and the expected positions of the animal) are used to correct inaccuracies in position data, it is optimal to remove device event data associated with false device event onsets as described above prior to correcting the position data. Movement position correction may also be performed prior to the removing false device events in addition to after their removal.

Once the position data are corrected, inaccuracies in the dataset resulting from failure of a device event to terminate are identified and removed (109). In some cases, an animal may initiate a device event that does not terminate when the animal leaves the device. For example, a feeder photobeam may become blocked by food particles during a feeding bout. Lickometer failure could result from spontaneous dripping, or placement (by the mouse) of bedding material in the lick slot. Similarly, video, satellite or electronic tracking could malfunction failing to register termination of a device event. Such errors, if undetected, would produce overestimates of device event length and an erroneous indication of prolonged activity by the animal at the device. In certain embodiments, failure of a device to terminate is detected by finding all positions of the subjects during device events, using data in which device onset errors have already been detected and excluded, and the position corrections have been performed. The positions of the subjects during device events are clustered using a rapid nearest neighbor clustering algorithm. If there are no event termination errors, then there should only be one cluster centered at the device. If more than one cluster is present, the largest cluster centered closest to the device is considered to contain valid events, and events occurring elsewhere are excluded. Further details of detecting device event termination failure according to certain embodiments are discussed below with reference to FIG. 7.

In certain embodiments, the overall measured movement of the animal during the measurement period is compared to known animal behavior to detect potential errors with the position detection mechanism (113). For example, a load beam can malfunction, producing errors in position measurements. In one embodiment, a screening strategy for instances of malfunction makes use of the predisposition of animals to explore the entire area of their cage enclosures during the course of a 24 hour recording period. Saturation of a load beam results in truncation or skewing of the movement data and problems such as loosening of the central pivot can also result in underestimates of force that result in truncation of movement data. Further details of detecting load beam or other position detector malfunction according to certain embodiments are discussed below with respect to FIG. 10. Similarly, position data can be compared to known animal behavior for other types of position detection mechanisms. In addition, the position data can be examined for boundary violations, i.e., positions outside the measurement area, where the subject is incapable of going.

Various embodiments of the operations in FIG. 1 are discussed below.

A. Detecting Device Onset Errors

Detecting potential device event onset errors involves detecting inconsistencies between recorded device events and independently gathered position data. For example, signals from a lickometer may indicate that a lick event occurred at a certain time when position data at that time indicates that the mouse or other subject is not at the device at that time. In such cases, errors exist in either device data collection or movement data collection. In certain embodiments, the methods of the invention use position information to detect and flag potentially erroneous device events for removal and/or subsequent user review.

In certain embodiments, once an inconsistency between position data of the animal and device onset data is identified, a determination is made whether the error is from device data collection or movement data collection. If it is determined that the error is from the device data collection, that device event may be removed automatically or flagged and presented to a user for a decision on whether to remove it.

As discussed above, a potential event onset error is detected when the indication of a device event at a particular time is inconsistent with the measured position of an animal at that time. In certain measurement systems, position (movement) data is collected by mechanisms for which accumulated error can be a problem. This accumulated error is referred to as drift. If device events occur when position data indicates that the animal is not near the device, then either a large position drift or a false event onset has occurred. These possibilities can be distinguished by measuring the overall position drift and comparing this with the drift in the indicated positions of the animal during device activations. If the overall position drift at the time of an event activation is similar to the drift in the position of the animal at the onset of a device activation, then the event would be considered valid. A difference in the overall drift and the device drift raises the possibility of a spurious device event. FIG. 2 is a process flow sheets showing an overview of a process of detecting event onset errors by comparing device event drift with overall position drift according to certain embodiments.

The process begins by measuring the overall position drift (PD) for an animal subject in a time period (301). (Measuring the overall position drift is discussed below with reference to FIG. 4). Each device event is then considered. For a given device event, the indicated or measured position of the animal subject at the time t of the event onset is obtained (303). The device event drift (ED) is then determined (305). The difference between the position drift at time t ($PD_t$) and the device event drift (ED) is determined (307). This difference is compared to a threshold difference (309); if the difference is larger than the threshold, the event is flagged to be presented to a user (311). Alternatively, the device event may be automatically classified as false and the associated data removed. There is a check for remaining device events at decision block 313. If there are remaining device events for the subject and measurement period, the flagged events are presented to the user for review (315).

Calculating the ED involves comparing the measured position of the animal at the time of an event with the first measured of position of the event in the measurement window. This will be the expected position of the animal during an event based on the known location of the device if the first event of this type was used to initialize the coordinates of the measurement area. Initialization of the coordinates is described as part of movement position correction described below.

To obtain an estimate of the overall position drift, an estimate of the drift in the minimum and maximum positions (X, Y, and/or others) that define the boundaries of the subject's movement in the measurement area, is obtained. In certain embodiments, determining overall position drift involves fitting a convex hull to the X and Y (or other coordinate) positions vs. time in a sliding time window with the requirement that the distance from the minimum to the maximum position on each side of the convex hull must be greater than a certain percentage of the width (X positions) or length (Y positions) of the cage or other measurement area. Any type of coordinate system appropriate for the particular measurement area may be used. The overlapping convex hulls are independently expanded until the distance requirement is met, yielding an estimate of the overall drift in the minimum and maximum positions. This position envelope can then be averaged, and the average used to obtain an estimate of the overall drift at any time during data collection. If this drift differs from the apparent drift in device position by more than a certain threshold, e.g., 10 cm in X or 15 cm in Y, then the device event is flagged for subsequent review as in operation 311.

Figure 4:
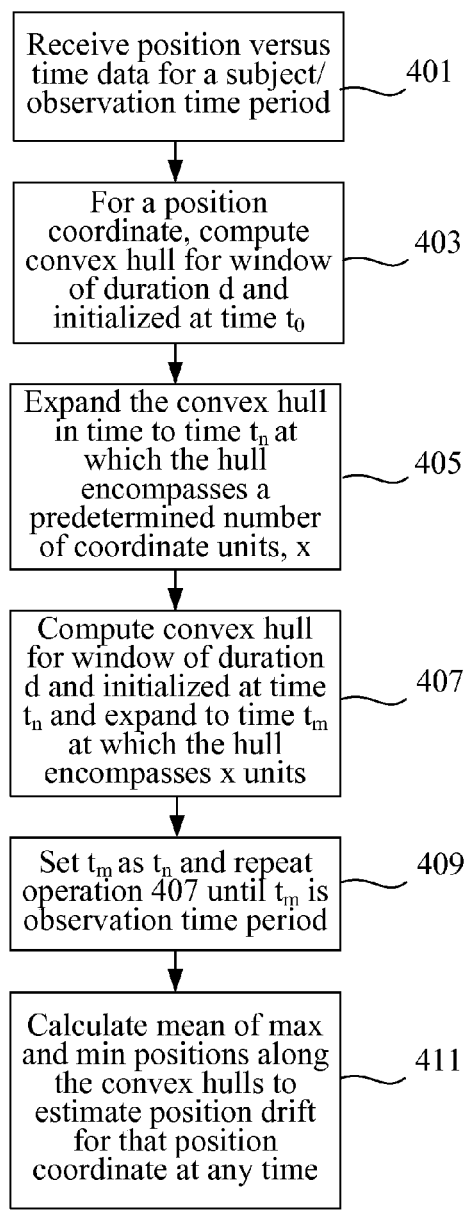
FIG. 4 is a flow diagram presenting certain operations in a method of determining overall drift in position measurements. In certain embodiments, overall position drift is used to detect false device events.

FIG. 4 is a process flow sheet showing key operations in obtaining the overall position drift as described above. The process begins by receiving position vs. time data for the subject and measurement period (401). For a position coordinate, e.g., X, Y and/or any other coordinate, a convex hull is fitted to the coordinate positions vs. time for a window of duration d and initialized at time $t_0$ (403). The convex hull is expanded in time to a time $t_n$ at which the convex hull encompasses a predetermined number of coordinate position units, x (405). For example, the convex hull may be expanded until the convex hull encompasses a certain percentage, e.g., 80%, of the total width or length, etc. of the measurement area. Operations 403 and 405 are then repeated for a convex hull of duration d, initialized at time $t_n$ and expanded until the distance requirement is met at time $t_m$ (407). This is repeated until $t_m$ is the measurement or observation time period, e.g., 1 day. Position drift for the coordinate is then estimated by obtaining the mean of the max and min positions along the convex hulls at any time, thereby obtaining position drift as a function of time. The process described in FIG. 4 is performed for each position coordinate, yielding for example a position drift at time t=3 hours of −3 cm in the X-direction and 2 cm in the Y-direction.

Figure 5A:
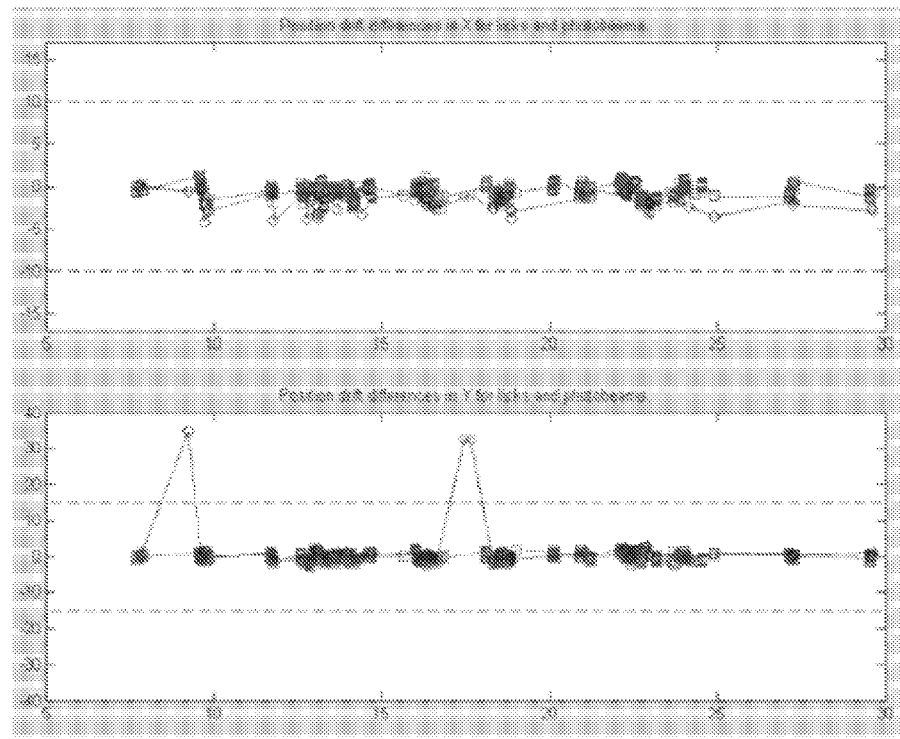
FIG. 5A is a screen shot depicting graphs on which the differences between the overall position drift and lickometer event drifts (blue) and photobeam event drifts (red) over a 24-hr monitoring period are plotted. X and Y axis drifts are plotted separately.
Figure 5B:
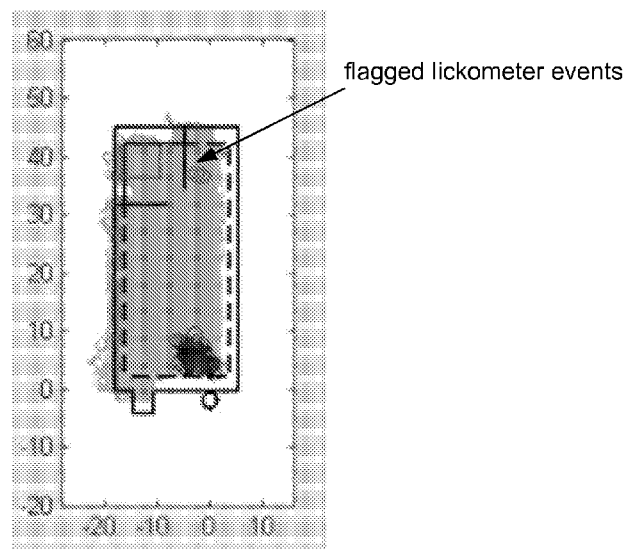
FIG. 5B is a screen shot depicting a mouse behavioral record in which locomotor path is indicated in green, feeding event locations in orange, and drinking event locations in blue. Potential false drinking events are flagged for user review.

A graphical example of the detection of event onset failures is shown in FIG. 5A. These graphs plot differences between the overall position drift and lickometer event drifts (blue) and photobeam event drifts (red) over a 24-hr monitoring period. X and Y axis drifts are plotted separately. The drift difference thresholds for flagging events, in this case 10 cm in X and 15 cm in Y, are indicated by dashed lines. In this example, two instances are flagged in which Y axis drift differences exceed threshold for lickometer events. The lickometer event data can be automatically excluded or the flagged events can be presented to the user for review, as in FIG. 5B.

B. Movement Position Correction (MPC)

Movement position correction uses the known locations of device events to correct movement and position data. The MPC algorithm compares the animal's position at each device event onset, as calculated from the movement/position data, with the expected position of the animal, based on the known location of the device. If the calculated and expected positions differ by more than a threshold amount, movement data in the prior loop are corrected.

Figure 6:
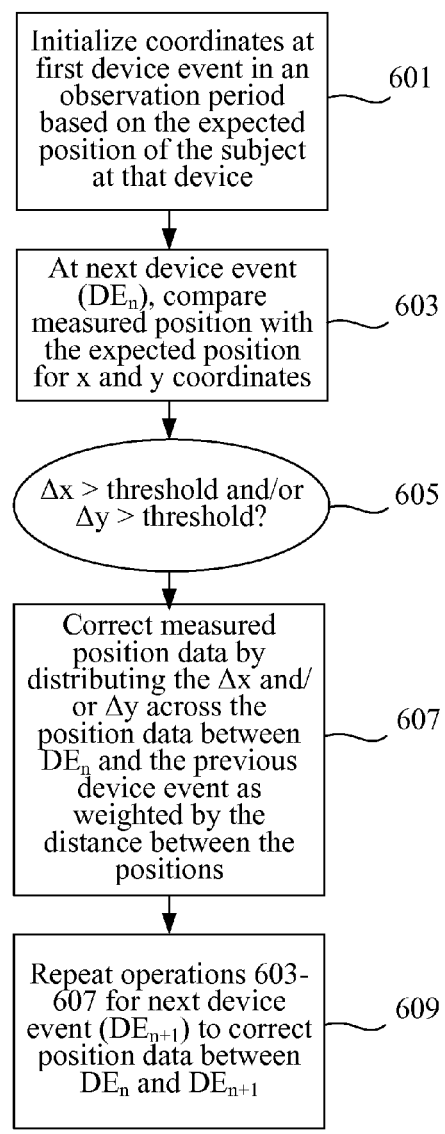
FIG. 6 is a flow diagram presenting certain operations employed in a method of correcting movement/position data using the known locations of devices in accordance with various embodiments of the present invention.

Certain operations are illustrated in the process flow sheet of FIG. 6. The process begins by initializing coordinates (601). At the beginning of each session (measurement period), the animal subject's coordinates are initialized. This initialization can take place at the first device event with the animal subject's coordinates initialized based on the expected position of the animal subject at the device as in the example shown in FIG. 6, though any appropriate initialization may be used. The positions of the animal prior to the first device event (or other initialization) can then be back-calculated. At the next device event ($DE_n$), the position of the animal subject as measured by the load beam, video tracking, other position detection mechanism, etc. is compared with the expected position of the animal subject based on the known location of the device (603). This difference is the position drift (PD). This comparison is done for each position dimension (X and Y in the example.) If the difference between measured and expected positions during the device event exceeds a certain threshold (see decision block 605), the position data in the dataset is corrected by distributing that difference across the measured positions between $DE_n$ and the previous device event (607). The distribution may be weighted by the distance moved between positions. This process is repeated for the next device event $DE_{n+1}$ (609) until all device events in the measurement period are considered.

The use of the MPC tool in correcting movement and position data for a mouse in a cage is shown in FIG. 2, discussed above. However, the MPC tool may be used for a variety of experimental settings in which interactions of animal subjects with any device having a known location are available to validate and correct position information. In FIG. 1, the MPC tool is shown as being performed after detection and removal of false device onsets: this can be important as the MPC relies on expected positions of the animal subjects to correct position information. In certain embodiments, the MPC tool may be run prior to removing false device events, and rerun after they are removed.

C. Detecting Device Event Termination Failure

Figure 7:
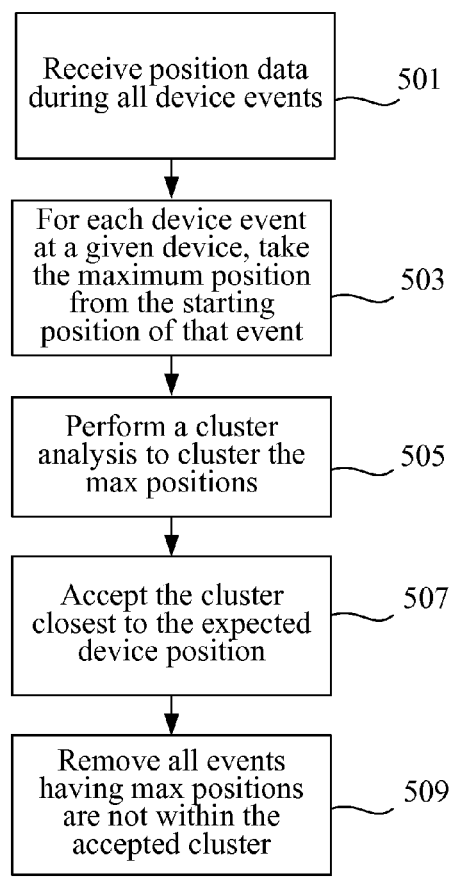
FIG. 7 is a flow diagram presenting certain operations employed in a method of detecting the failure of a device event to terminate in accordance with various embodiments of the present invention.

As indicated above, in certain embodiments, detecting instances of a device failing to terminate involves using a nearest neighbor clustering algorithm. All positions of the animal subject during device events are clustered. FIG. 7 shows key operations in a process flow sheet: the process begins by receiving all position data for all device events for a particular device (701). As indicated above, this is data for which device onset errors have already been detected and excluded, and the MPC tool has been run or rerun. For each device event, the maximum position from the starting position for that event is obtained (703). A cluster analysis is then performed to cluster these maximum positions (705). If there are no event termination errors, then there should only be one cluster centered at the expected device position. If more than one cluster is present, the largest cluster centered closest to the expected device position is considered to contain valid events, and events occurring elsewhere are excluded. Thus, the cluster closest to the expected device position is accepted (707). All events having maximum positions outside of the accepted cluster are removed (709). One of skill in the art will understand that different clustering and exclusion criteria may be used. It should also be noted that the event data may be automatically removed, or flagged and presented to a user for a decision on removal.

Figure 8:
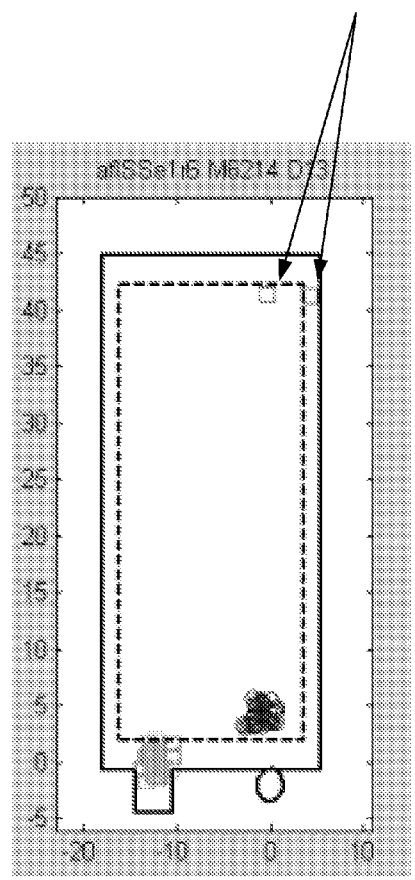
FIG. 8 is a screen shot depicting a mouse behavioral record showing a cluster of feeding events near the feeder (green squares) and a cluster of drinking events near the lickometer (blue circles). The two squares in the opposite corner represent the maximum distances of the animal from the feeder determined during two feeding events. The red coloring indicates that they fall outside the criteria for valid feeding events.

A graphical example of clustering feeding and drinking events in a mouse home cage monitoring system is shown in FIG. 8. In the example shown in FIG. 8, a cluster of feeding events near the feeder (green squares) and a cluster of drinking events near the lickometer (blue circles) have been identified. The two squares in the opposite corner represent the maximum distances of the animal from the feeder determined during two feeding events. The red coloring indicates that they fall outside the criteria for valid feeding events.

D. Detection of Position Detector Malfunction

Figure 9:
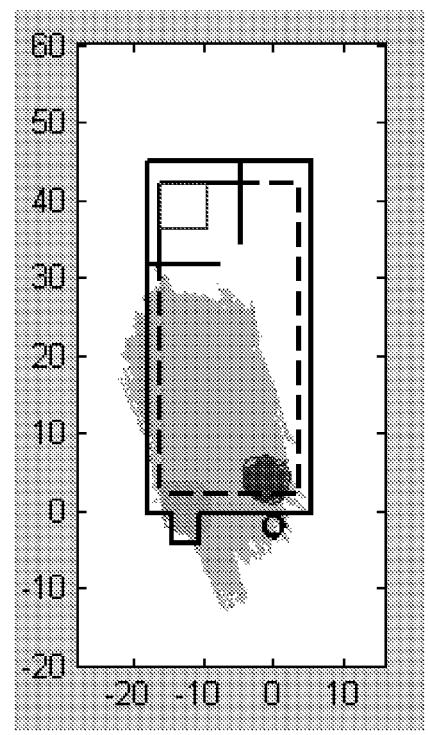
FIG. 9 is a screen shot depicting a mouse behavioral record in which positions are indicated in green, feeding event locations in orange, and drinking event locations in blue. The positions are heavily skewed toward one end of measurement area indicating position detector (load beam) malfunction.

In certain embodiments, a behavioral monitoring system utilizes load beams to function as force transducers for determination of animal movement and position. Occasionally, a load beam can malfunction, producing errors in these measurements. Saturation of a load beam results in truncation or skewing of the movement data and problems such as loosening of the central pivot can also result in underestimates of force that result in truncation of movement data. An example of data in which such error has occurred in graphically shown in FIG. 9, with the measured positions in green. The potential for these types of errors lies not just with load beams, but other types of position detection. For example, position detectors that rely on mobile tracking devices in large area measurement areas such as cities, etc., may lose reception/transmission in certain geographic areas due to weather, etc.

In certain embodiments, detection of such errors involves comparing all corrected movement positions during the measurement period to known or expected animal behavioral patterns. One example is the predilection of a mouse to explore its entire cage area over the course of a 24 hour measurement period. Another example is the expectation or a preference for a human subject to roam an area located next to a workplace during the course of a day or week.

Figure 10:
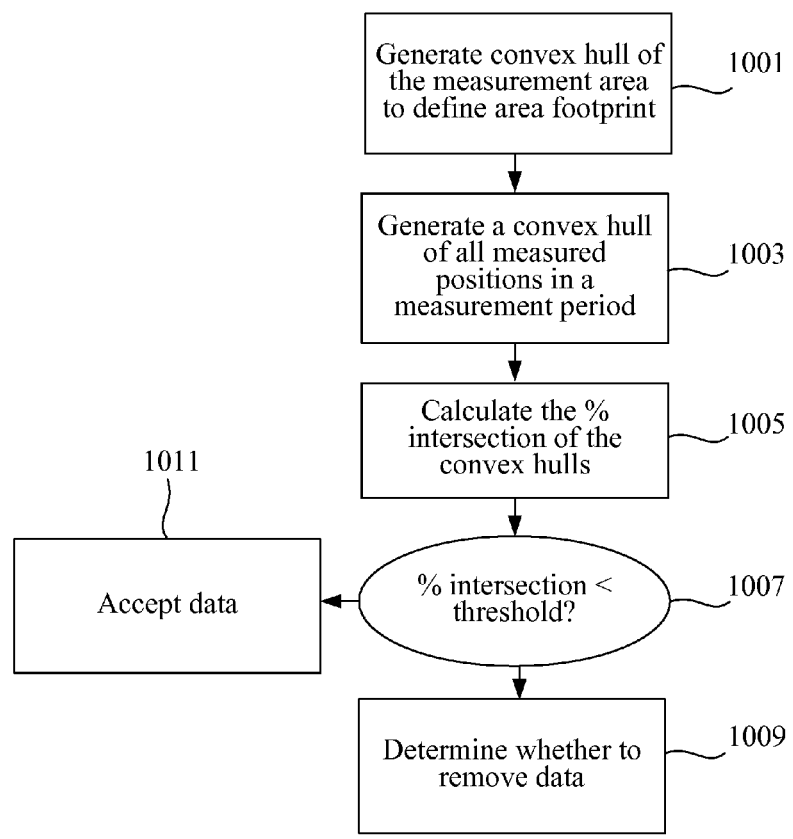
FIG. 10 is a flow diagram presenting certain operations employed in a method of detecting position detector malfunction in accordance with various embodiments of the present invention.

In certain embodiments, detection of such errors involves plotting the convex hull of all corrected movement positions and comparing that convex hull to known or expected animal behavioral patterns. For example, the comparison may involve calculating the percentage of the measurement area that the convex hull occupies. If less than a certain percentage, e.g., 80%, of the cage area is occupied by the convex hull, then the data from the day or other measurement period of data may be flagged for subsequent user review. FIG. 10 is a process flow sheet showing key operations in one embodiment of detection position detector malfunction from position data received for a measurement period. The process begins by generating a convex hull of the measurement area to define a measurement area footprint (1001). Other methods to generate or pre-existing knowledge of the measurement area footprint may be used. A convex hull of all measured positions in the measurement period is generated (1003), and the percent intersection of the convex hulls is calculated (1005). The intersection is compared to a threshold in decision block 1007: if it greater than the threshold, the data is accepted, or at least not flagged (1011). If it is less than the threshold, a determination is made whether to remove the data or not (1009). The determination can be made after user review, or in other embodiments, data can be automatically removed.

In certain embodiments, the comparison of the measured positions with the measurement area footprint may involve analyzing overlap in specific areas of the measurement area, e.g., a northeast quadrant of a city, etc. Note that other types of position error detection may also be employed, including detecting boundary violations. Comparison of measurement area footprint with measured positions may reveal systematic malfunction with the position detector, such as load beam saturation, as opposed to isolated errors such as stray signals picked up from outside the measurement area.

E. Computer Implemented Methods of Automated and User Data Quality Control

As described above, the data quality control algorithms may involve some user review combined with automated algorithms. For example, data quality control determinations resulting from user entered comments or automated algorithms described above can have a three level structure in which each event is assigned a quality of 1 (use), 2 (flag for further inspection), or 3 (don't use). A quality of 2 indicates the existence of a potential error that must be inspected by the investigator. To facilitate this inspection, tools are provided that will allow the experimenter to view and process these potential errors. Data visualization techniques facilitate examination of the data and the flagged errors, allowing the investigator to determine whether each flag warrants a downgrade to exclusionary status or an upgrade to "ok to use" status.

In certain embodiments, a quality control process can be performed in two main stages (Stage 1 and Stage 2). In Stage 1, automatic algorithms are run to search, e.g., for cumulative errors in position data, position detector failure, false device event onsets. Potential errors can be flagged for further inspection. The experimenter will then process all the flagged errors using a graphical user interface (GUI). Once this is done, all movement data will be either excluded or corrected. This fully processed movement data will then be run through a second stage, where a device termination algorithm uses the corrected position data to search for and exclude device termination errors. At this point, all automated detection of device errors is completed, and any large deviations from the expected correlation between device events (e.g., photobeam time and lick number) and intake will be flagged for inspection. Such deviations may result from data entry errors or failure of the device to detect events. The experimenter will then use the GUI to view and process data flagged due to possible data entry or device failures, as well as data that has been flagged by the user for review—for example, when the food hopper is very low, raising the possibility that the animal had been food deprived.

Figure 16:
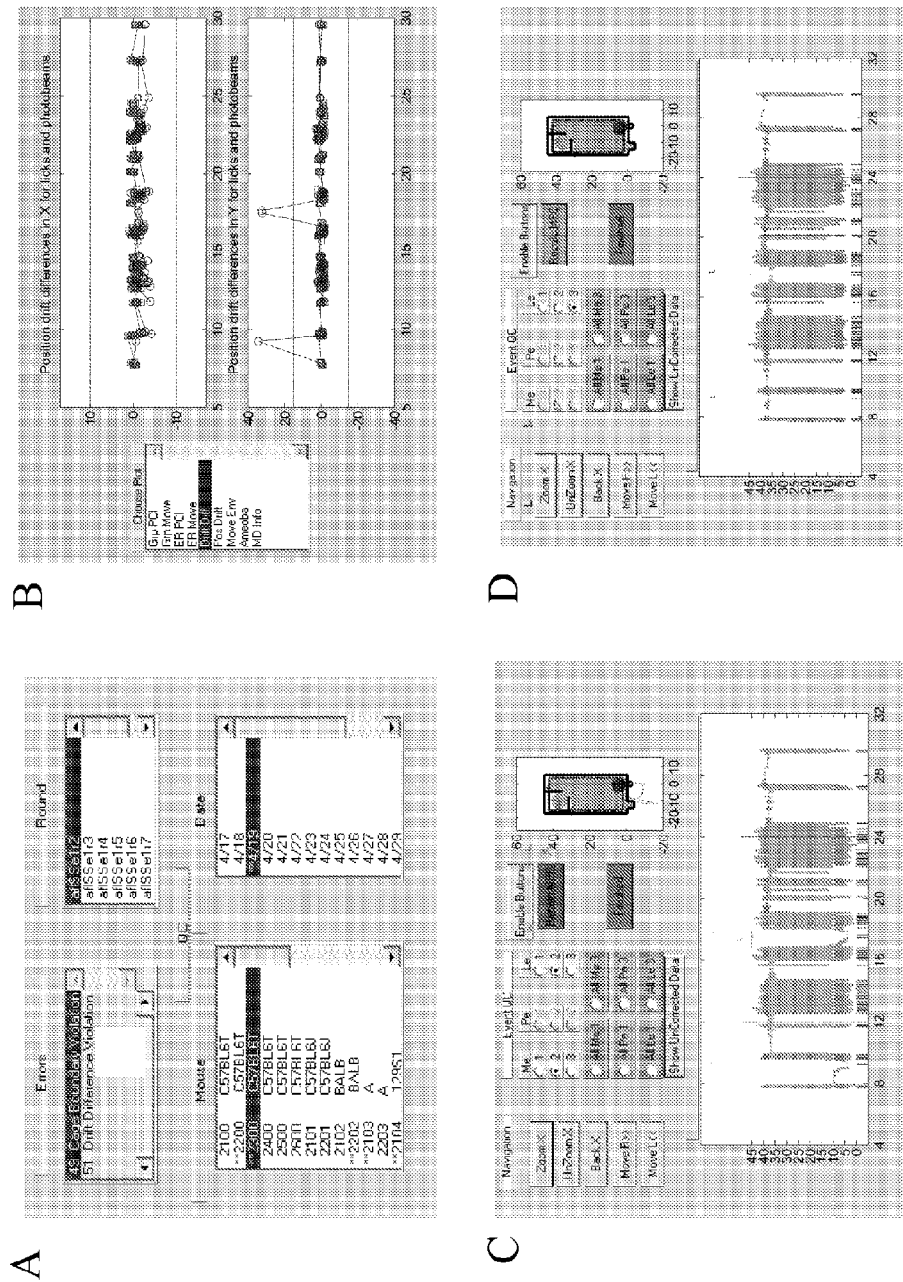
FIGS. 16A-16D shows screen shots depicting a user interface for data quality control. Panel A shows a screen with experiment round, mouse and data selection boxes. For this particular mouse-day selected, two flagged error events are listed. Panel B shows the Supplemental Plot Chooser on left, which enables viewing of multiple features of the data. The Drift Difference option is selected and corresponding plot shown on right. Panels C and D show two examples of the Main Screen each containing an event plot (bottom), a quiver plot showing animal positions (upper right), and the layout of quality control buttons, navigation buttons and movement position correction and finish buttons. In C, two lick events (L) and one movement event (A) are flagged, as indicated by the designations in the Event QC columns. In Panel D, the lick events have been excluded (indicated by "3" in the "Le" column), resulting in elimination of the movement event flag and the cage boundary violation.

FIG. 16 shows screen shots of Stage 1 QC GUI. Panels A and B show a screen shot of the Stage 1 QC GUI showing the experiment round/mouse/date selection box (Panel A) and the Supplemental Plot Chooser/Viewer (Panel B). (The screen shots shown here are made using the Matlab Guide GUI design interface, which allows one to place buttons, plots etc in a design and to change their attributes (i.e. color, state, etc)). In the selection box, two error flags are showing, a "Cage boundary violation" and a "Drift difference violation". The drift difference violation is clearly present in the position drift differences plot in Panel B. Because these stray licks do seem to be actual lick device failures, the user can now understand the origin of the second error ("Cage boundary violation"); since the mouse positions during lick events are used by the movement position correction algorithm to correct the movements, the bad lick positions flagged above cause the mouse to appear to have moved beyond the cage, as shown in Panel C (a byproduct of the MPC tool). To correct both of these problems the user would use the GUI to exclude the bad licks by clicking the "3" radio button (in the "Le" column) and then rerunning the MPC tool. As seen in Panel D, this procedure removes the cage boundary violation as expected.

In certain embodiments, the excluded licks are automatically excluded by simply excluding all licks whose drift differences were above some threshold. However, as described above, the algorithm that calculates the drift difference relies on the accuracy of the algorithm that estimates the movement drift. Estimating this drift is a non-trivial problem, so in many embodiments there may be a need for the experimenter to check any flagged lick or feeding events using the Stage 1 QC GUI. Other flagged errors can also be examined in this manner.

Figure 17:
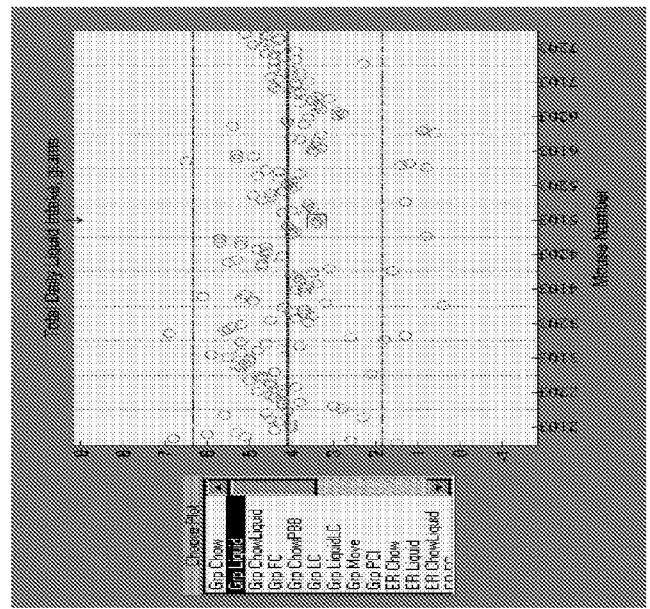
Figure 17:
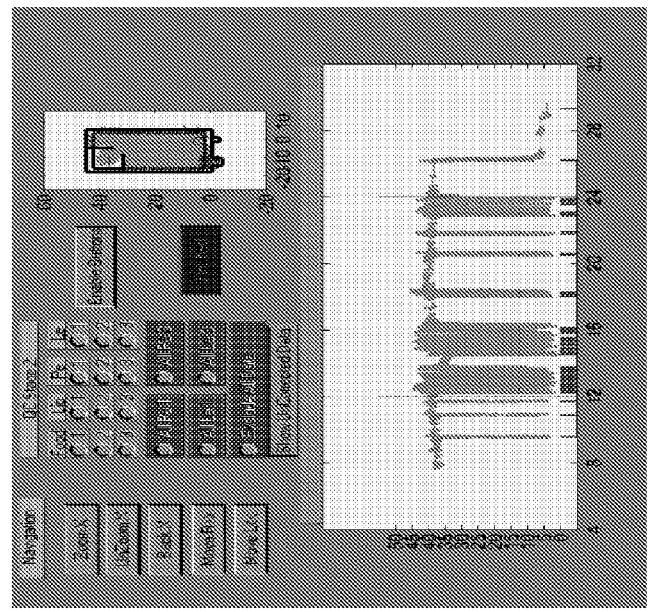

FIG. 17 shows a screen shot of a Stage 2 QC GUI. Here we see an example of a flagged failure-to-detect error. Panel A in the figure shows no licking events in the event plot except for one at the very end of the day. However, panel B shows that the amount of water that the mouse consumed that day (value highlighted within square) is not anomalous—neither when compared with its intake on the other days of the experiment, nor with the intake of other mice in the experiment. This indicates a lick device failure-to-detect error, and the lick event data for that mouse and day must be excluded. However, the food intake and movement data does not have to be excluded. Again, errors like this can be checked by the experimenter using the Stage 2 QC GUI.

Further details of the user interface and displaying classification results are include in the attached Appendices 1 and 2.

3. Active and Inactive State Classification

Another aspect of the invention relates to the classification of active and inactive states. In general, active states are states in which there is an increased probability of some measured behaviors occurring (including movement), punctuated by inactive states during which the probability of being in characteristic location(s) is high and resting and sleeping are likely to occur. Transitions between active and inactive states represent a basic feature of behavioral organization of freely acting animals. The methods and systems described below of classifying these states may be applied across species, etc. Also, as indicated, these methods may be used for classification of other states, beyond active and inactive states, in which there is a high probability of a behavior or behaviors occurring and/or a high probability of being at characteristic locations.

In certain embodiments, approaches for automating the objective identification of active and inactive states, which, as indicated, may serve as fundamental features of behavioral organization, are provided. This allows detailed analysis of behavioral sequences and circadian and ultradian influences on active state properties. Once active and inactive states are classified, temporal variations can be characterized. Examples of this characterization are discussed further below, and in the Examples.

In certain embodiments, inactive state classification involves deriving an inactive position duration threshold. Positions with durations longer than the inactive threshold are classified as inactive. To accurately and robustly identify this threshold, it was necessary to determine two parameters: a time window and a spatial filter parameter. The time window is used to capture epochs in which a single home base is used; over some period of time animals may relocate their home base, for example, a mouse may change the location of its nest, a person may go between two locations, spending some nights at one house and other nights at a second house, etc. Using a time window in which a single home base (whichever or wherever that base is) is used ensures that sleeping and resting time spent at different nests, second home location, etc. are correctly identified as inactive states. A spatial filter is applied to smooth out small movements that did not remove the animal from the location of the home base, e.g., a person rolling over in bed, a mouse changing positions in the nest, etc. The optimal combination of time window and spatial filter is selected by minimizing a state classification error.

Figure 11:
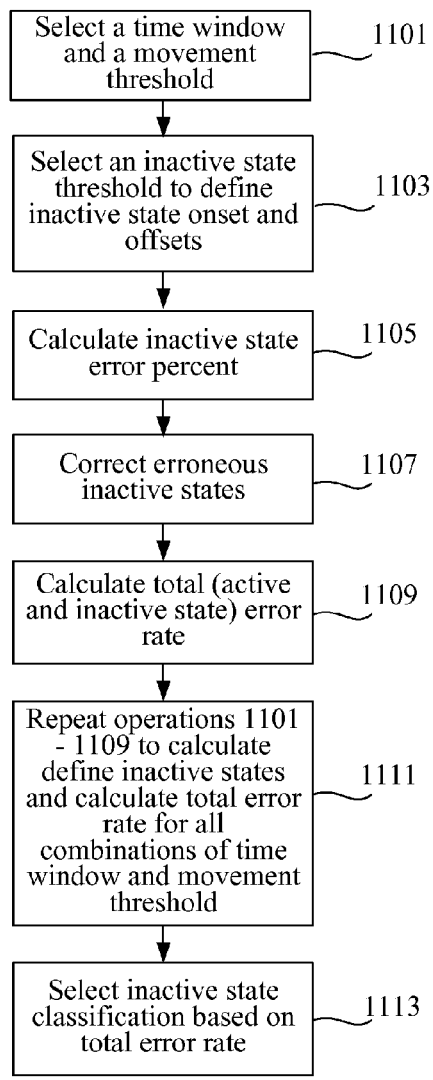
FIGS. 11 and 12 are flow diagrams presenting certain operation employed in a method of classifying active and inactive states of animal subject(s) from movement and device event data collected from a behavioral monitoring system in accordance with various embodiments of the present invention.

FIG. 11 is a process flow sheet showing operations in a process of classifying active and inactive states. The process begins by selecting a time window and a movement threshold (1101). Raw data in a dataset typically includes movement (position vs. time) information over a measurement period, e.g., 12 hours, 24 hours, 36 hours. As described above, movement data in a raw dataset is recorded at a threshold change in position. For example, for a threshold of 1 cm, movement information is collected and stored in the raw dataset when the animal moves at least 1 cm. Time windows may range from 0 to the measurement period, e.g., for a measurement period of 24 hours, from 0 to 24 hours, 1, 2, 4, 6, 12, 24, etc. A spatial filter can be applied by choosing a movement threshold, which may range from the data collection threshold, e.g., 1 cm, 2 cm, 3 cm, etc.

An inactive state threshold is then selected to define inactive state onsets and offsets (1103). As indicated above, the inactive state threshold is a threshold duration of classifying a position as inactive. Determining the inactive state threshold is discussed further below with respect to FIG. 12. It should be noted though that depending on the movement threshold under consideration, the inactive state threshold results in different inactive states. For example, if the inactive state threshold is 1 hour, the classification of a state as inactive depends on the movement threshold: if an animal moves 10 cm in one hour, the state is classified as inactive if the movement threshold is 15 cm, but not if the movement threshold is 5 cm. Thus, once the inactive state onsets and offsets are defined using the inactive state threshold for the time window and movement threshold combination under consideration, an inactive state error percent is calculated (1105). This is discussed further below as well, but in certain embodiments, involves checking for device events occurring during states classified as inactive (during which no such events should occur). States erroneously classified as inactive are then corrected, i.e., reclassified (1107). A total error rate, i.e., one that includes erroneously classified active states may then be calculated (1109). The entire classification and error rate process (operations 1101-1109) is then repeated for all combinations of time window and movement threshold (1111). An inactive state classification (i.e., the classification of inactive states performed in operation 1103 as corrected by operation 1107) is selected based on the total error rate (1113).

Figure 12:
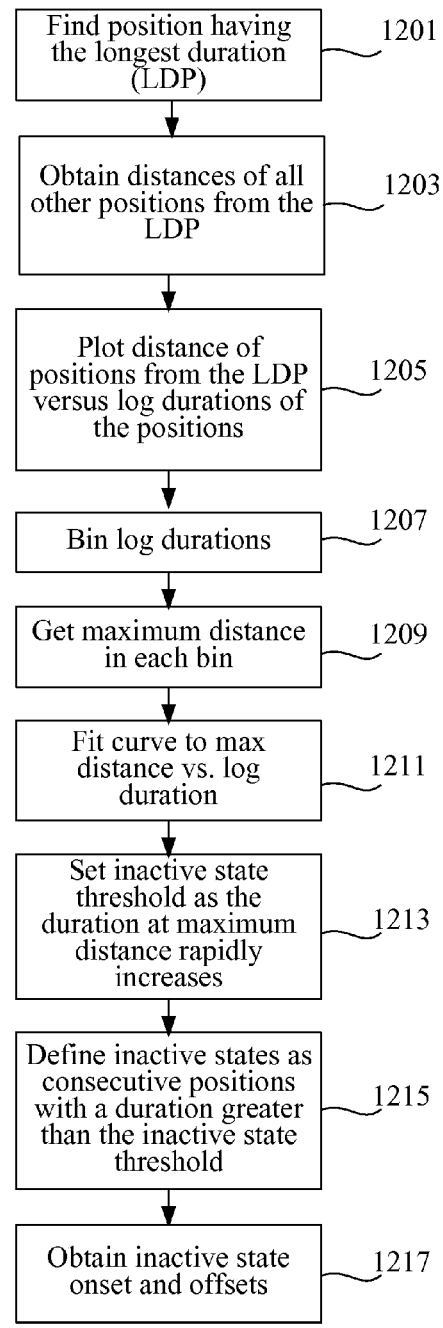

A. Determining an Inactive State Threshold Duration to Define Inactive State Onsets and Offsets FIG. 12 is a process flow sheet illustrating operations in determining an inactive state threshold. This is the minimum duration for an inactive state, i.e., the minimum duration during which the animal does not move (with a "move" being determined by the movement threshold as described above). As described above (see operation 1103 of FIG. 11), the inactive state threshold duration defines the inactive state onsets and offsets, thus providing higher order temporal classification of the animal's behavior during the measurement period.

Figure 13:
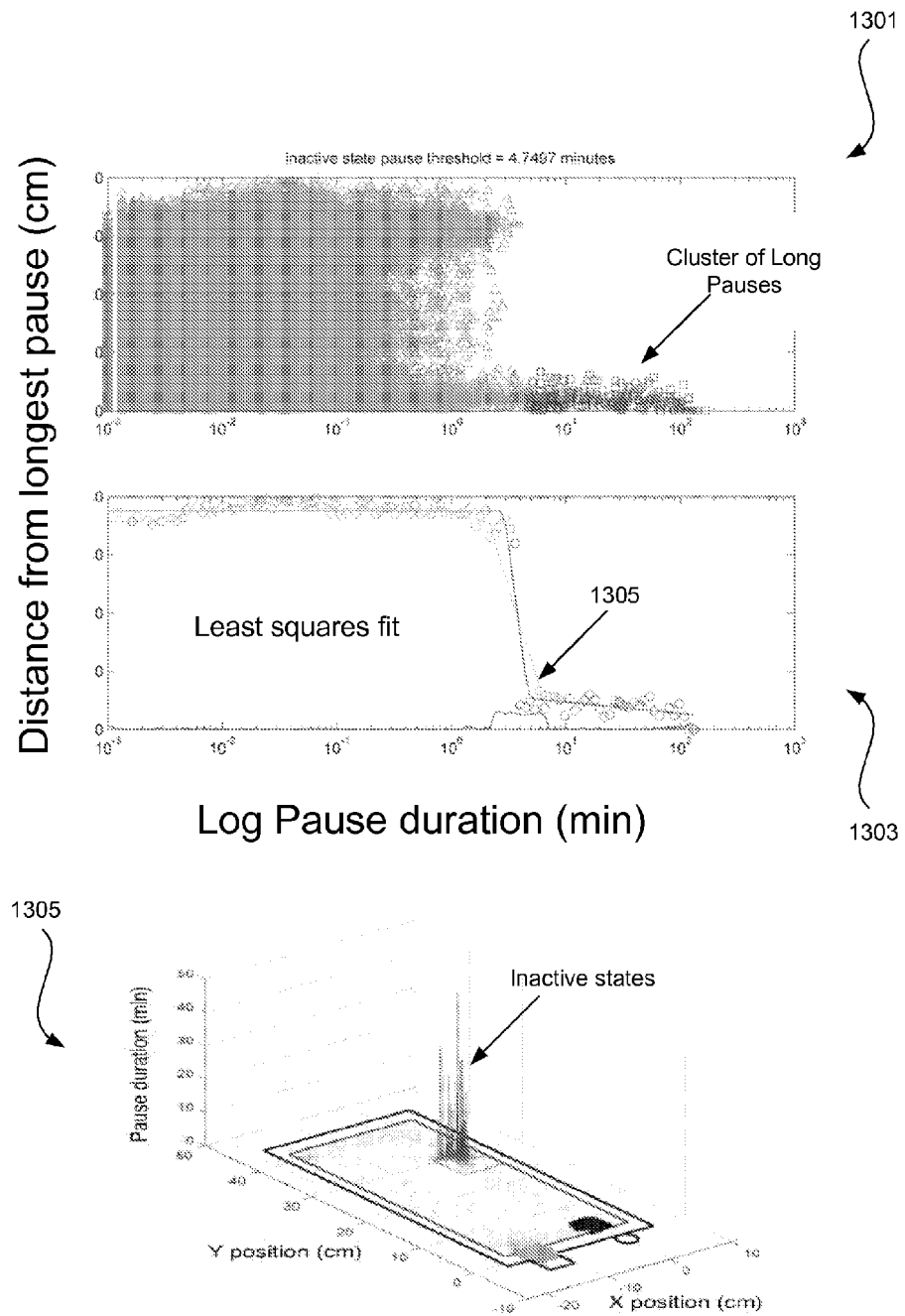
FIG. 13 shows examples of 1) a plot 1301 of distance from the longest pause vs. pause duration at a device, 2) a 3-line curve fit (1303) to determine the inactive state pause threshold, and 3) a graphical depiction (1305) of the location of inactive state positions as determined using the inactive state pause threshold.

The process of determining an inactive state threshold begins by finding the position during the time window/movement threshold under consideration that has the longest duration or LDP (1201). The LDP will vary according to the time window and the movement threshold. Then, the distances of all other positions from the LDP are obtained (1203). These distances are plotted against the logs of the durations of these positions. An example of such at plot is shown at 1301 in FIG. 13. As can be seen from FIG. 13, this plot reveals a class or cluster of long pauses that are relatively close to the longest pause in that time window. The inactive state threshold duration is the duration at which the maximum distance from the LDP dramatically increases. In certain embodiments, this duration is found by binning the pause durations (1207) and determining the maximum distance from the longest pause for each bin (1209). A least squares curve-fitting routine is then used to fit three lines to the maximum pause distance versus log pause duration (1211). See plot 1303 in FIG. 13. The intersection 1305 of the second and third lines (i.e., where the maximum distance from the LDP dramatically increases) can be used to define the pause threshold for the immobile state (1213). An inactive state can then be defined as consecutive positions (or a single position) having a duration greater than the inactive state threshold (1215). From this criterion, the inactive state onset and offsets can be obtained (1217). Plot 1305 in FIG. 13 shows a group of inactive periods (red) in a cage revealed from application of the inactive state pause threshold. These states are restricted to the animal's nest location. Obtaining inactive state onsets and offsets gives the active state onset and offsets, as well.

B. Calculating State Classification Error

Figure 14:
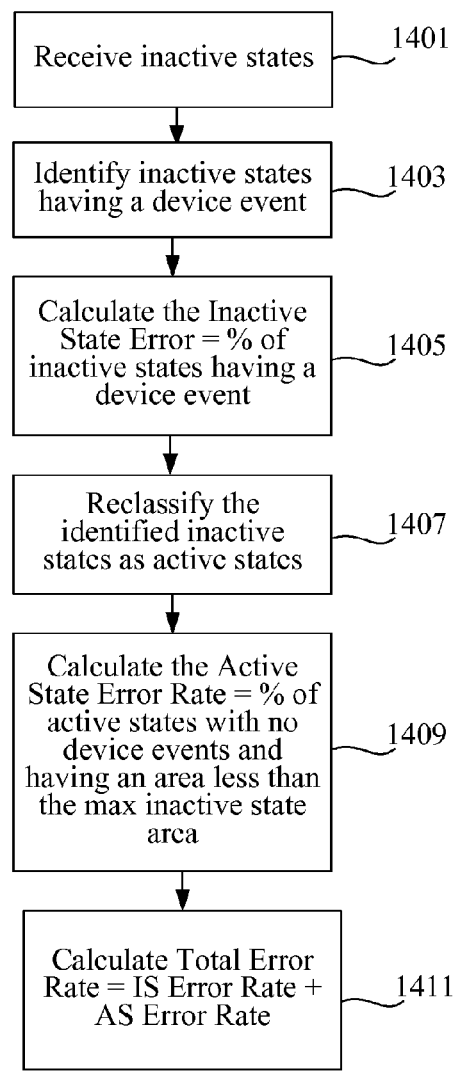
FIG. 14 is a flow diagram presenting certain operations employed in a method of calculating state classification error to optimize the time window/movement threshold in accordance with various embodiments of the present invention.

As described above, finding the optimum time window/movement threshold involves classification error rates. If the above method is accurate at classifying inactive states, no device events should occur during the inactive states. In certain embodiments, determining intake classification error involves calculating the percent of inactive states that contain device events. Active state classification error can be determined, e.g., as the percent of active states that lack a device event and during which the area covered by the animal is not greater than the maximum of all areas covered during inactive states. The state classification error can then be determined from both inactive and active state classification errors, e.g., by summing the inactive and active state classification errors. FIG. 14 is a process flow sheet showing operations in one method of calculating state classification error. The process begins by receiving the inactive state onsets and offsets (1401). Inactive states, i.e., the periods between the onsets and offsets, that contain a device event are identified (1403). The inactive state error rate is then calculated based on the number of inactive states identified; in the example depicted in FIG. 14, the error rate is the percentage of inactive states that contain a device event (1405). This inactive state error is stored for use in calculating the total error rate, and thus the fitness of the movement threshold. The classification is then corrected such that no inactive states contain a device event (1407). Correction of the inactive states is based on the criteria used to define an inactive state, e.g., consecutive positions having a duration greater than the inactive state threshold; thus an inactive state having a device event may be reclassified into a single active state that is continuous with surrounding active states, may be broken up into active and inactive states, etc. After the corrections are implemented, the active state error rate is calculated, based on the updated classification (1409). According to certain embodiments, the active state error rate is calculated by looking at active states in which there are no device events (e.g., the animal does not eat, drink, interact with stimuli, etc.) and in which the animal does not cover a large area. In the flow sheet of FIG. 14, for example, the active state error rate is the percentage of active states in which there are no device events and during which the area covered by the animal is not greater than the maximum inactive state area. The areas of each active and inactive state may be found by fitting convex hulls to the position data for each inactive and active state. The total error rate may then be calculated based on the inactive and active state error rates.

4. Bout Classification

Behaviors within the active state are organized using the concept of a bout as a behavioral element. A bout is the repetition of a behavior clustered together in time and without the intervention of a different behavior. Automated algorithms for bout identification, incorporating information regarding both temporal and spatial properties of the behavior are presented for the quantification of feeding, drinking and other behaviors. As described above, the data from which bouts are identified includes device event information, e.g., photobeam breaks indicating the presence of a mouse at a feeder, etc. The processes of the invention allow, in an automated fashion, classification of the behavior of into bouts of behavior and movement and in addition, a higher level of organization-clusters of bouts.

For the identification of bouts, spatial information may be incorporated into the classification scheme by assessing the locations occupied by the animals between the end of each device event and the onset of the subsequent event at that device (inter-event intervals, IEIs). In certain embodiments, if the animal left the device during an IEI, then an intervening behavior had occurred. So, for example, the probability that the animal remained at the device during an WI is estimated: if the probability of remaining at the device is greater than 0.5, the IEI is classified as being "at the device." Temporal patterns of behavior are also incorporated into the classification scheme: if events group in time to form bouts, then the IEI durations, IDs, should exhibit at least two distinct types: IDs that are likely to occur within feeding bouts and IDs that are likely to occur between feeding bouts. (See, e.g., Langton, S. D., Collett, D., and Sibly, R. M. (1995). Splitting Behavior Into Bouts; A Maximum Likelihood Approach Behaviour 132, 781-799 and Tolkamp, B. J., Allcroft, D. J., Austin, E. J., Nielsen, B. L., and Kyriazakis, I. (1998). Satiety splits feeding behavior into bouts. Journal of theoretical biology 194, 235-250, both of which are incorporated herein by reference.) In certain embodiments, the ID distributions are split into two groups (short and long) and the probability that an IEI is short is estimated. The designation of each IEI as either a within-bout interval (WBI) or an inter-bout interval (IBI) can then be made based on both the probability that the IEI occurred at the device and the probability that it was short.

Figure 15:
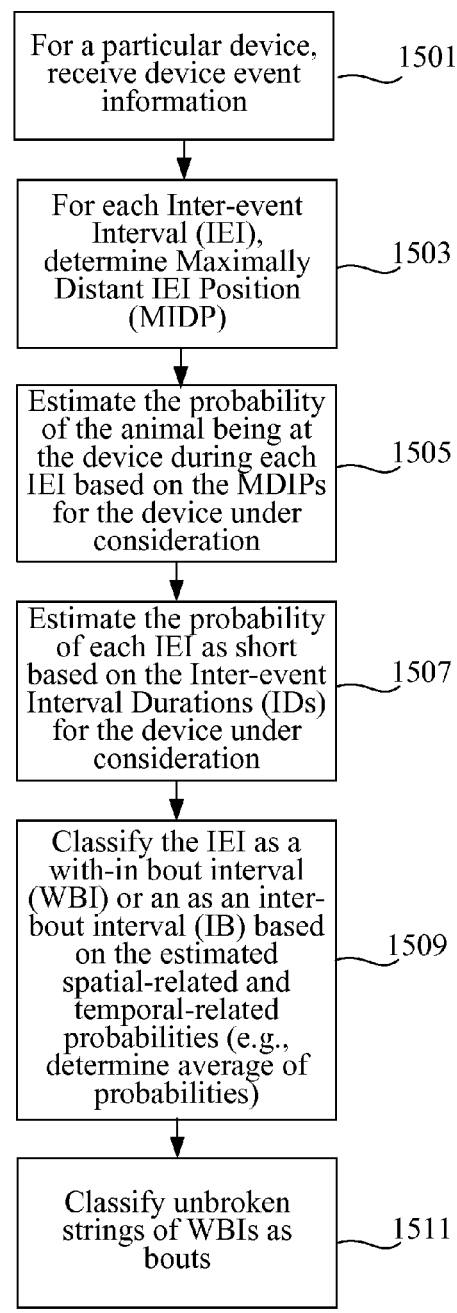
FIG. 15 is a flow diagram presenting certain operations employed in a method of classifying bouts of animal behavior from movement and device event data collected from a behavioral monitoring system in accordance with various embodiments of the present invention.

FIG. 15 is a process flow sheet showing high-level operations in a method of organizing behavioral event information into bouts that uses both spatial and temporal information. The process begins by receiving device event and movement information (1501). This information includes spatial information including the spatial position of the animal during events and inter-event intervals (IEIs). As indicated above, an IEI is the interval between the onset of a device event and the onset of the subsequent event at that device. The information received also includes temporal information including the duration of inter-event intervals. For the identification of bouts, spatial information is incorporated into the classification scheme by assessing the locations occupied by the animal for each IEI. For each IEI, the position at which the animal was furthest from the device (the maximally distant IEI position or MDIP) under consideration is determined (1503). The probability that the animal remained at the device during an IEI is then estimated based on the MDIPs for the device under consideration (1505). Temporal information is incorporated into the classification scheme by estimating the probability that the IEI is short (vs. long) based on the inter-event interval durations (IDs) for the device under consideration (1507). The IEI is then classified as being a with-in bout interval (WBI) or as an inter-bout interval (IB) based on the estimated spatial-related and temporal-related probabilities, for example by averaging the probabilities (1509). Unbroken strings of WBIs are then classified as being bouts (1511).

Figure 22:
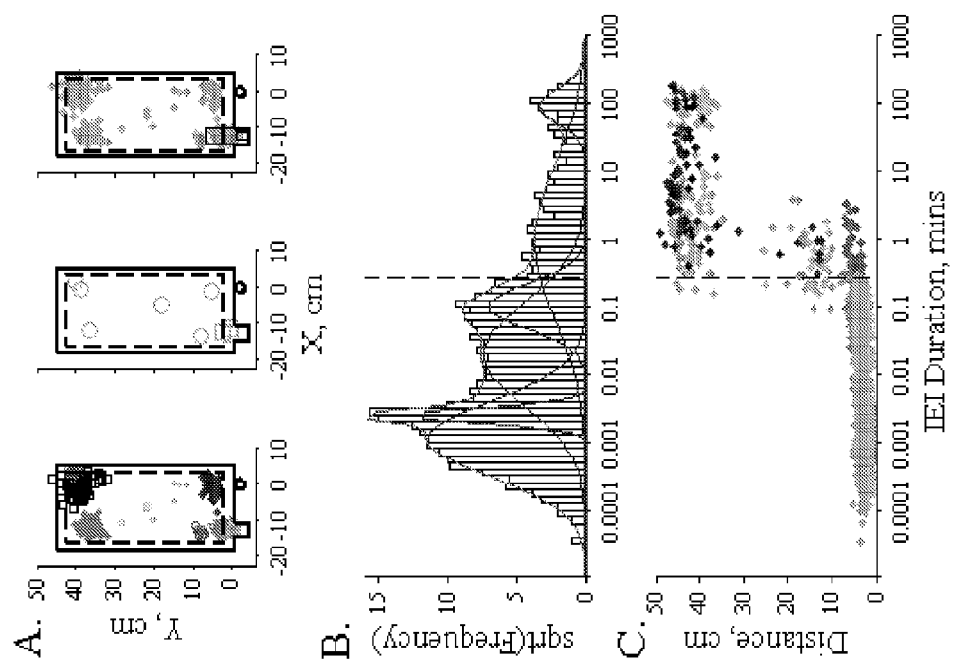
FIG. 22A relates to at device classification. A mixture of bivariate normal distributions was fit to the positions of a WT mouse when it was maximally distant from the feeder during iei occurring during the light cycle on all days. In the left hand panel, all positions assigned to the nine bivariate normal distributions in the final fit are displayed with different colors and symbols. In the middle panel, only the centers of the bivariate normal distributions are displayed with the bivariate normal distributions classified as occurring at the device displayed in orange and all other bivariate normal distributions displayed in green. In the right hand panel, the maximally distant IEI positions that were classified as occurring at the feeder are displayed in orange and all other positions are displayed in green indicating that locomotion away from the feeder occurred during the WI. The right hand panel also displays the location of the ramp that provided access to the feeder as a black rectangle protruding into the cage.
FIG. 22B shows results of IEI duration classification. A mixture of univariate normals was fit to the log transformed IEI durations occurring during the light cycle on all days for the same WT mouse. The histogram displays the square root of the number of IEI of a given duration. The blue lines display the predicted individual univariate normal distributions while the red line displays the predicted fit to the data from the sum of the individual univariate normal distributions. The dashed line indicates the short IEI duration threshold for this mouse of 16 seconds for feeding occurring during the light cycle.
FIG. 22C shows results of IEI classification. The classification of all light cycle IEI for this mouse as either WBI (within bout interval) or IBI (inter-bout interval) was determined from the mean of the probabilities that an IEI maximum distance position occurred at the device and that the IEI duration was short. For each WI, the log transformed duration is displayed on the x axis and the distance from the feeder is displayed on the y axis. Within bout IEI are orange. Interbout intervals are red if the mouse remained at the feeder but for a duration exceeding a short IEI threshold, green if the mouse engaged in locomotion, and blue if the mouse engaged in locomotion and drinking.

Evidence that this approach distinguishes populations of IEIs with distinct spatial and temporal properties is depicted in FIG. 22C. For each IEI, the maximum distance from the feeder is indicated on the Y-axis and the logarithm of its duration is indicated on the X-axis. IEIs designated as WBIs are shown in orange, and all occur in the vicinity of the feeder. During the vast majority of IBIs, animals stray from the feeder (green), with water intake occurring in a subset of these (blue). A small cluster of IEIs occur in the vicinity of the feeder (red), but are classified as IBIs due to their long durations. Thus, using both spatial and temporal information for bout classification produces different classification than using spatial or temporal information alone.

A. Classifying the IEI as being at or Away from the Device

As described above, in certain embodiments, spatial information is incorporated into the bout classification scheme by estimating the probability, or classifying, the WI as either being at or away from the device. In certain embodiments, this is accomplished by fitting a mixture of bivariate normals to the MDIPs under consideration during the WI. The centroids of the fitted bivariate normals are clustered using a rapid nearest neighbor clustering algorithm. The cluster of bivariate normals whose centroid is nearest to the device is classified as "at the device" (AD). The bivariate normals in this cluster are assigned as AD bivariate normals (with the exception that diffuse bivariate normals may be excluded.) The posterior probabilities for the AD bivariate normals may be summed to yield an estimate of the probability that each maximally distant JET position (MDIP) is at the device. In certain embodiments, the IEI is classified as occurring "at the device" if the probability is 0.5 or higher. In certain embodiments, the probability is then used, along with the temporal-related probability, to classify the IEI as being a within bout interval or an inter-bout interval, as described above.

FIG. 22A shows an example of the results of fitting bivariate normals to MDIPs for a mouse in a cage. In the left hand panel, all positions assigned to the nine bivariate normal distributions in the final fit are displayed with different colors and symbols. In the middle panel, only the centroids of the bivariate normal distributions are displayed with the bivariate normal distributions classified as occurring at the device displayed in orange and all other bivariate normal distributions displayed in green. In the right hand panel, the MDIPs that were classified as occurring at the feeder are displayed in orange and all other positions are displayed in green indicating that locomotion away from the feeder occurred during the IEI.

B. Classifying the IEI as Short or Long

To distinguish between IDs that are likely to occur within feeding bouts and IDs that are likely to occur between feeding bouts ID distributions for each animal are fit with mixtures of log normal distributions. It has been found that the ID distributions are best fit by a mixture of 3 or more log normal distributions consistent with the presence of distinct types of IDs. The probability that an JET was short is then determined by splitting the log normal distributions into two groups (e.g., short and long) based on the probability that the animal remained at the device.

In certain embodiments, the probability that an ID is short relative to the overall distribution determined by fitting univariate normals to the log transformed IDs. An example is shown in FIG. 22B, which shows five univariate normals fitted to log transformed IDs. In FIG. 22B, the log normal ID (min) is shown on the x-axis, with an unnormalized probability (the square root of the frequency of the ID) on the y-axis.

The duration data is then partitioned, by finding the posterior probability for each ID for each of the normal distributions. To partition the data, the IDs are then sorted from shortest to longest. Each ID is hard clustered, i.e., the ID is indexed according to the normal distribution it has the highest posterior probability of belonging to: in the example shown in FIG. 22B, each duration data point would have an index of 1, 2, 3, 4 or 5. The data is partitioned each time there is a change in the index, i.e., when the hard clustered identity changed from one cluster to another.

Figure 33:
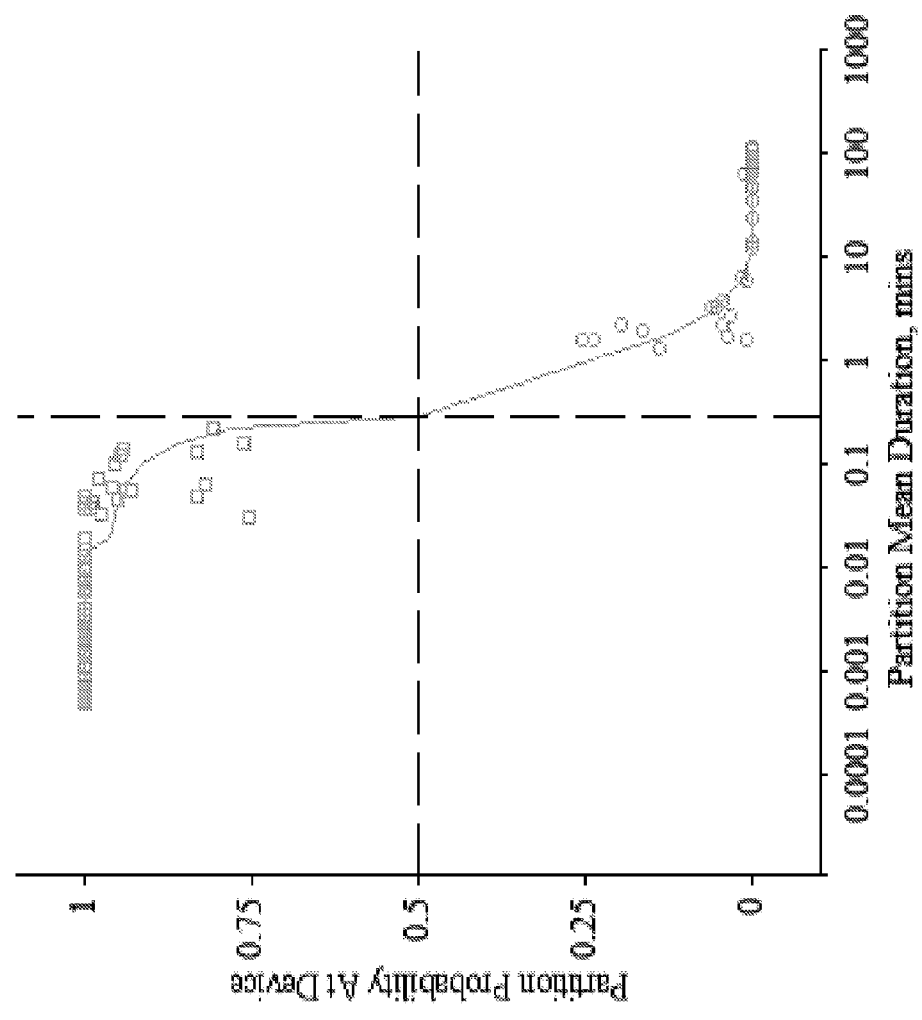
FIG. 33 shows the classification of short and long duration partitions. The mean durations and at device probability for all IEI partitions for all WT mice from the WT2C comparison are displayed. The IEI are for photobeam event data occurring during the light cycle. Short duration partitions were identified by fitting a line to the data using local interpolation (lowess smoother) in order to estimate the mean partition duration at which mice in this group where equally like to remain at or leave the feeder.
Figure 34:
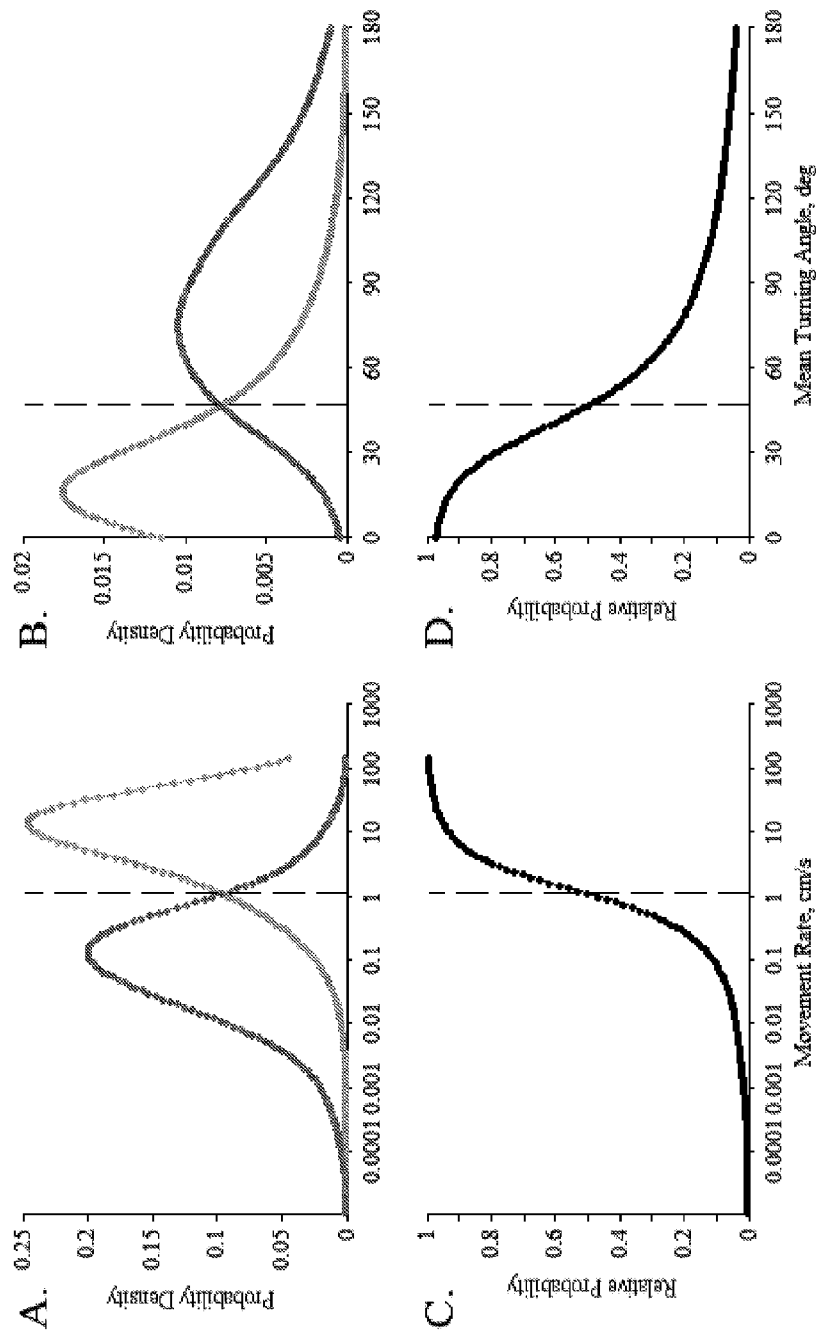
FIGS. 34A-34D shows locomotion bout classification plots. The probability density estimates for a single mouse for movement rate (FIG. 34A) and turning angle (FIG. 34B) are displayed. The densities for movement events in the training set (MIP) are shown in red. The densities for movements to be classified ($M_{AS \notin IB}$) are shown in green. The dashed lines indicate the intersection of the MIP and $M_{AS \notin IB}$ densities. The relative probabilities that a movement rate (FIG. 34C) or turning angle (FIG. 34D) of the $M_{AS \notin IB}$ positions were distinct from the MIP positions are plotted versus movement rates or turning angles. The probability density for movement rate and turning angle was estimated using a kernel density estimator with a normal kernel function for movements occurring during inactive states and bouts of feeding or drinking (red) and for all other movements (green). The intersection of the two probability densities was set as the threshold for classifying a movement as occurring within a locomotion bout or during a bout of other behavior (stop moving in place).
Figure 35:
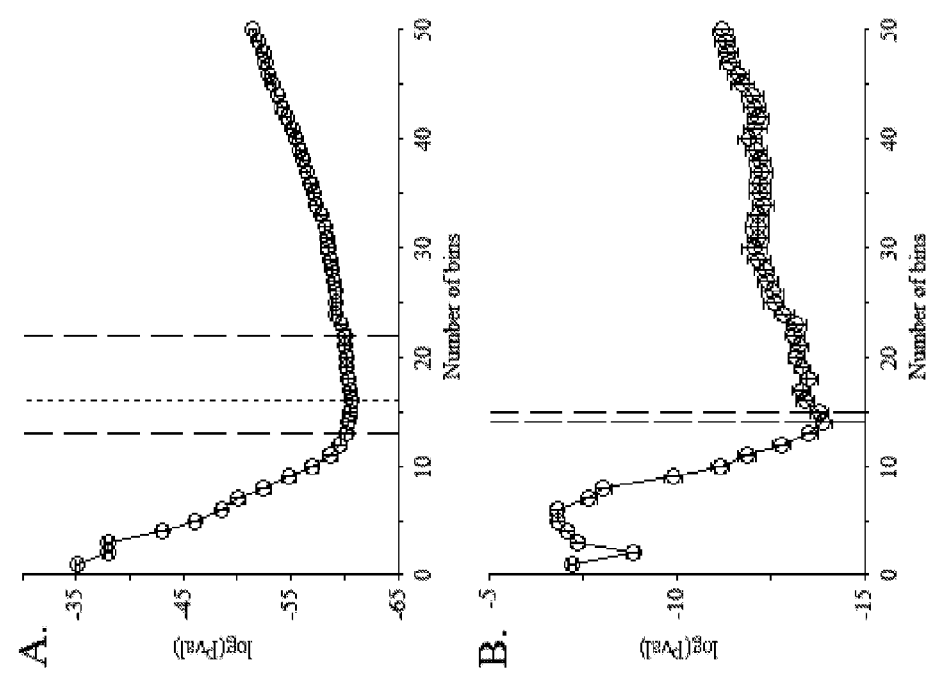
FIGS. 35A-35B shows plots related to cluster number selection in a method of comparison clustering. The log p values calculated from the chi square distribution for the delta chi square sums are plotted versus the number of clusters for the WTOB comparison (FIG. 35A) and the WT2C comparison (FIG. 35B). The dashed line shows the location of the minimum p value and the dotted lines show the range over which the p values are not significantly different from the minimum p value. The number of bins selected is 13 for the WTOB comparison and 14 for the WT2C comparison.
Figure 36:
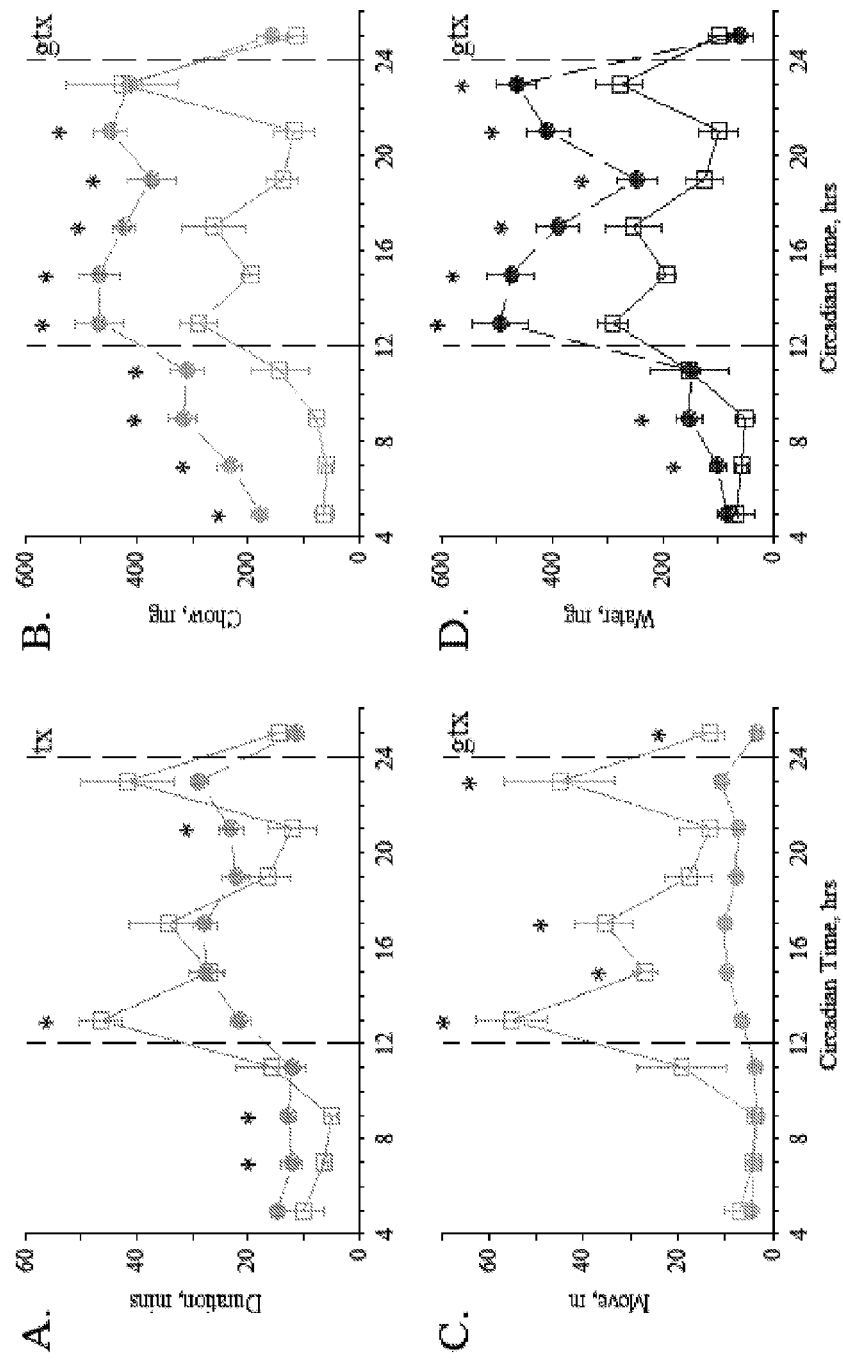
FIGS. 36A-36D shows active state amounts for WT and OB mice. The variation with time of day is shown as follows.
Figure 37:
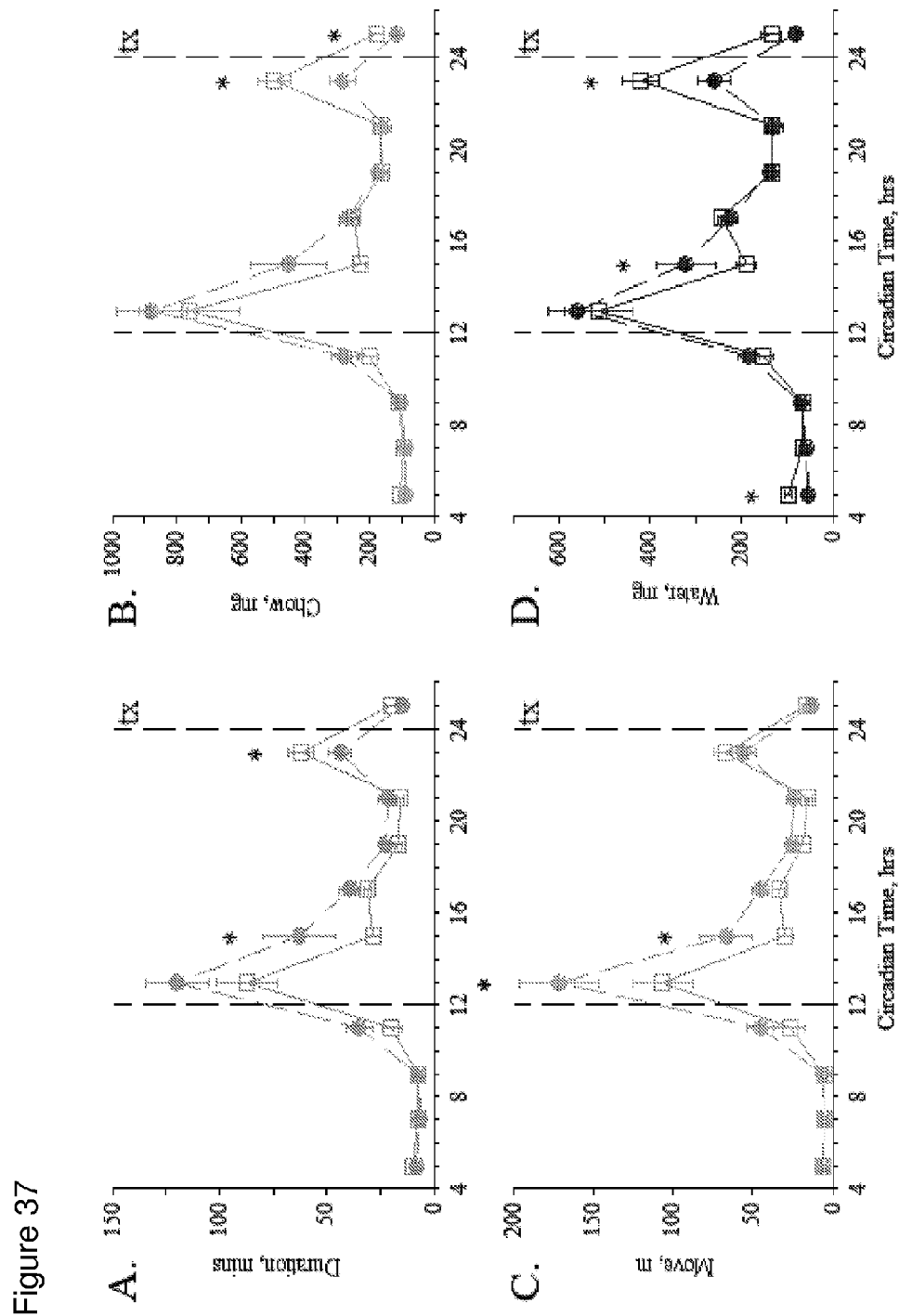
FIGS. 37A-37D shows active state amounts for WT and 2C mice. The variation with time of day is shown as follows.

Spatial information is then used to classify partitions as having either a short or long duration with short durations consistent with a high probability of an IEI being a WBI (calculated as described above). To classify partition durations as short or long, all partitions for a given group (e.g. OB mice) were combined to reduce the effects of individual variability. A smoothing line was then fit to the partition AD (at device) probability as a function of the mean of the log transformed partition durations. An example is shown in FIG. 33. For the WBI, a group duration criteria, $ID_{WBI\text{-}group}$, was then set as the duration at which the animals were equally likely to remain at or leave the device. All partitions with mean durations less than this criteria whose partition AD probability is greater than 0.5 are classified as short interval partitions. Similarly, all partitions with mean durations greater than the group duration criteria whose partition AD probability is less than 0.5 can be classified as long interval partitions.

For each animal, the transition between the short and long partitions can be used as the short IEI duration criteria. Then the posterior probabilities for univariate normals whose mean duration is less than the duration criteria are summed to yield estimates of the probability that each IEI was short.

5. Movement Bout Classification

Another aspect of the invention relates to methods for classifying movements during active states (AS) but not during other device event bouts into locomotor movement (LM) or non-locomotor movement (NLM). This is done using a supervised learning algorithm that used the movements occurring during inactive states or during intake bouts as the training set. Because these movements take place in a limited area, they represent "moving in place" (MIP) behavior and should reflect the properties of NLM events. Thus, the MIP movements should be distinct from movements occurring during bouts of locomotion when the animal moves around the cage or other measurement area. In one embodiment, to parameterize the training set of MIP events, the movement rate and turning angle (dot product angle of two movement vectors) for each position are used. Uninterrupted strings of movement events that were most likely to occur during locomotion are then used to define the onset and offset times of locomotion bouts. Finally, time within the active states during which the animals are not engaged in behavioral bouts associated with certain devices (e.g., intake) or locomotor bouts can be classified as bouts of "other" behavior (e.g., scanning, rearing, grooming, digging, etc).

Further discussion of specific embodiments incorporating the movement bout classification are included below in the examples.

6. Comparison Clustering

Another aspect of the invention provides methods of using information collected from individual subjects to make comparisons among groups of animals to study influences of genes, drugs and environmental factors on the neural regulation of behavior. Detailed quantitative assessment of temporal patterns of behavior may provide a highly sensitive indicator of the influence of such experimental manipulations on brain function. This requires analytical methods for detecting behavioral pattern differences among experimental groups while accounting for the variability in behavioral patterns occurring among individuals.

Novel methods for comparing behavioral patterns between two groups or populations (e.g., WT mice and OB mice) are provided. The comparison clustering methods determines if patterns differ between two groups and identifies aspects of the patterns that contribute most to any observed differences. An example of the algorithm is discussed with reference to active state (AS) onset times and durations, though one of skill in the art will understand to apply it to other behavioral data.

The method involves testing the null hypothesis that two groups had the same pattern, e.g., of AS onset times and durations. This is accomplished by combining the AS onset times and durations for all days in the two groups (which is appropriate under the null hypothesis) and assigning each AS in the combined data to one of a number of clusters. For each cluster, a chi-square statistic is then calculated based on the null hypothesis that control and test group contributed an equal proportion of ASs to the cluster. The sum of the chi-squares over all clusters is used as the measure of difference in the daily pattern. The significance of any difference can be determined by permuting the animals between the two groups to obtain the percentile rank of the original sum of chi-squares relative to the permuted sum of chi-squares. If there is a significant difference in the overall pattern, the parts of the pattern that contributed most to this difference are found by obtaining a p value for each cluster adjusted for multiple comparisons using stepwise resampling algorithm 3. See Troendle, J. F. (2000). Stepwise normal theory multiple test procedures controlling the false discovery rate. Journal of Statistical Planning and Inference 84, 139-158, which is incorporated by reference herein.

Figure 18:
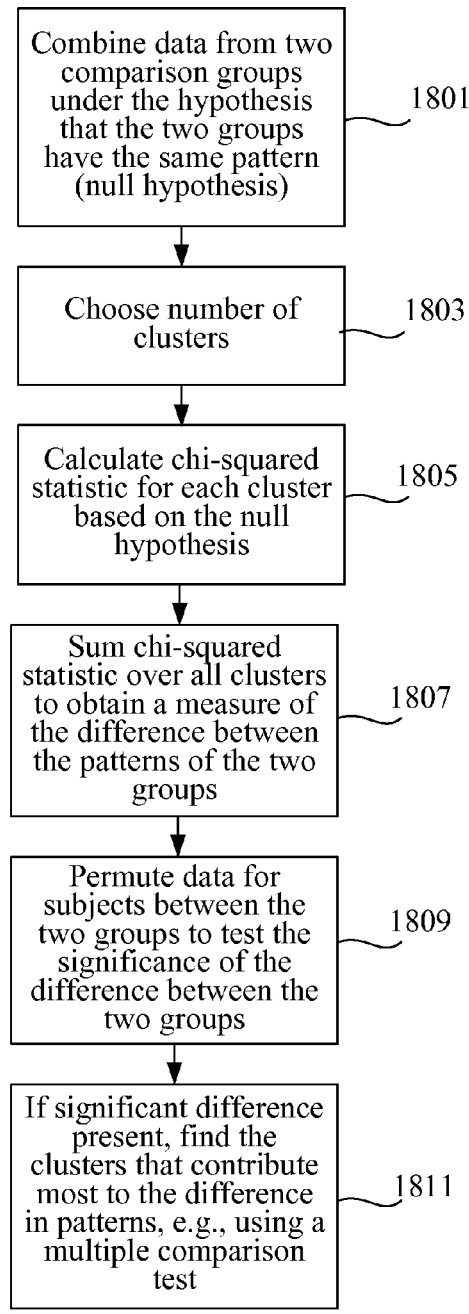
FIG. 18 is a flow diagram presenting certain operations employed in a method of comparing behavioral patterns of a test and control groups in accordance with various embodiments of the present invention.

FIG. 18 is a process flow diagram showing operations in a method of comparing two groups according to the certain embodiments. First, the data from two comparison groups are combined under the null hypothesis (1801). Typically, a test group and a control group are the two groups, with the data the behavioral measurement or data under consideration for subjects in each group. A number of clusters is selected (1803). A process for choosing the optimal number of clusters is discussed further below. Then, each data point in the combined dataset is assigned to one of clusters (1805). The chi-square statistic is calculated for each cluster based on the null hypothesis (1807). The chi-squares are summed overall all clusters (1809). As indicated above, this is a measure of the difference between the patterns of the two groups. The animal subjects are then permuted between the two groups (1811). This is done to test the difference between the two groups. If a significant difference is present, the multiple comparison test is performed to find the clusters that contribute to the difference in patterns (1813).

Figure 19:
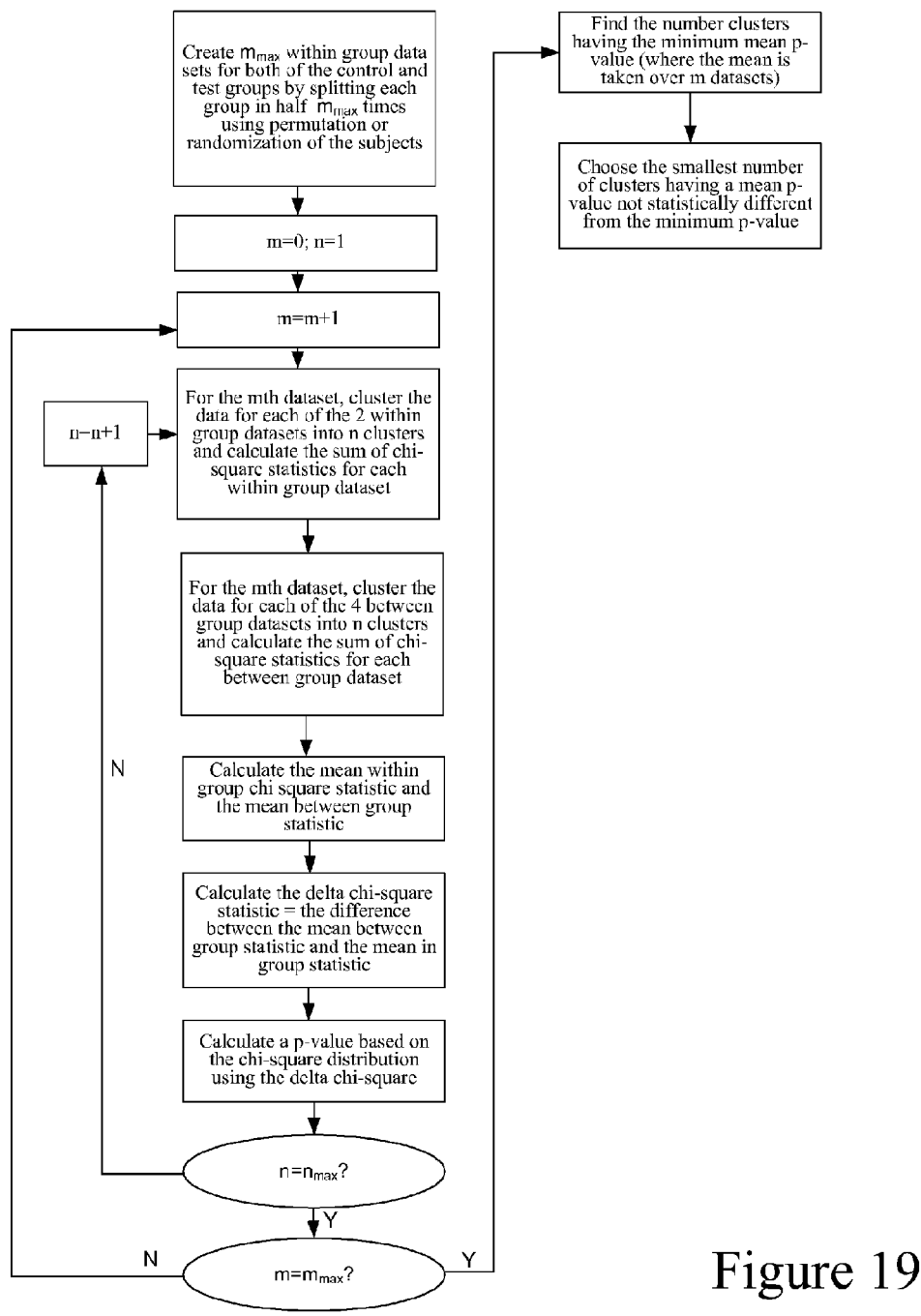
FIG. 19 is a flow diagram presenting certain operations employed in a method of selecting an optimal number of clusters to be used in a comparison clustering method in accordance with various embodiments of the present invention.

FIG. 19 is process flow diagram showing operations in a method of choosing the optimal number of clusters. As can be seen, it involves minimizing the p value of the delta chi square between within and between group comparisons. The process shown in FIG. 19 is an example; one of skill in the art will understand variations and optimizations may be made.

7. Computer Hardware

As should be apparent, certain embodiments of the invention employ processes acting under control of instructions and/or data stored in or transferred through one or more computer systems. Certain embodiments also relate to an apparatus for performing these operations. This apparatus may be specially designed and/or constructed for the required purposes, or it may be a general-purpose computer selectively configured by one or more computer programs and/or data structures stored in or otherwise made available to the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines is shown and described below.

In addition, certain embodiments relate to computer readable media or computer program products that include program instructions and/or data (including data structures) for performing various computer-implemented operations associated with at least the following tasks: (1) obtaining raw data from instrumentation, (2) performing automated and user-interface data quality control, (3) classifying active and inactive states, (4) analyzing and characterizing temporal variations in these states, (5) classifying behavioral bouts, (6) classifying movement bouts, (7) performing comparison clustering across groups. The invention also pertains to computational apparatus executing instructions to perform any or all of these tasks. It also pertains to computational apparatus including computer readable media encoded with instructions for performing such tasks.

Examples of tangible computer-readable media suitable for use computer program products and computational apparatus of this invention include, but are not limited to, magnetic media such as hard disks, floppy disks, and magnetic tape; optical media such as CD-ROM disks; magneto-optical media; semiconductor memory devices (e.g., flash memory), and hardware devices that are specially configured to store and perform program instructions, such as read-only memory devices (ROM) and random access memory (RAM). The data and program instructions provided herein may also be embodied on a carrier wave or other transport medium (including electronic or optically conductive pathways).

Examples of program instructions include low-level code, such as that produced by a compiler, as well as higher-level code that may be executed by the computer using an interpreter. Further, the program instructions may be machine code, source code and/or any other code that directly or indirectly controls operation of a computing machine. The code may specify input, output, calculations, conditionals, branches, iterative loops, etc.

Figure 20A:
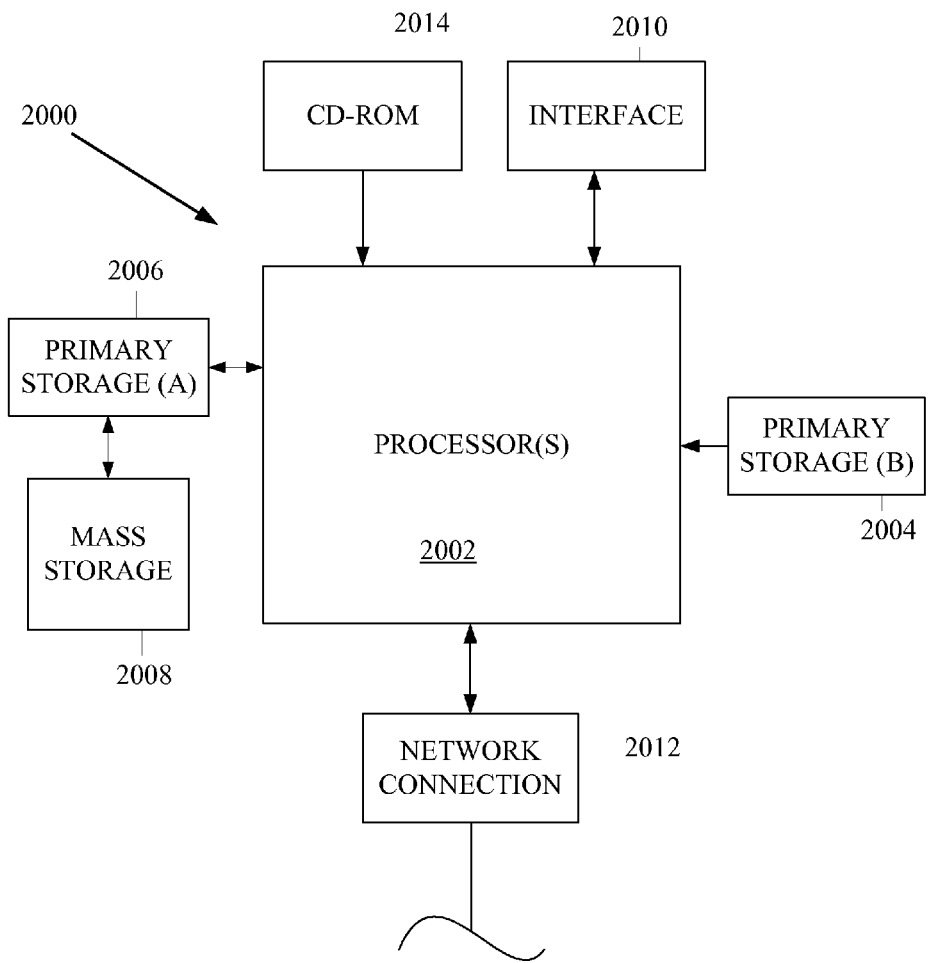
FIGS. 20A and 20B are diagrammatic representations computer systems that can be used with the methods and apparatus described herein.

FIG. 20A illustrates, in simple block format, a typical computer system that, when appropriately configured or designed, can serve as a computational apparatus according to certain embodiments. The computer system 2000 includes any number of processors 2002 (also referred to as central processing units, or CPUs) that are coupled to storage devices including primary storage 1906 (typically a random access memory, or RAM), primary storage 2004 (typically a read only memory, or ROM). CPU 2002 may be of various types including microcontrollers and microprocessors such as programmable devices (e.g., CPLDs and FPGAs) and non-programmable devices such as gate array ASICs or general-purpose microprocessors. In the depicted embodiment, primary storage 2004 acts to transfer data and instructions uni-directionally to the CPU and primary storage 2006 is used typically to transfer data and instructions in a bi-directional manner. Both of these primary storage devices may include any suitable computer-readable media such as those described above. A mass storage device 2008 is also coupled bi-directionally to primary storage 2006 and provides additional data storage capacity and may include any of the computer-readable media described above. Mass storage device 2008 may be used to store programs, data and the like and is typically a secondary storage medium such as a hard disk. Frequently, such programs, data and the like are temporarily copied to primary memory 2006 for execution on CPU 2002. It will be appreciated that the information retained within the mass storage device 2008, may, in appropriate cases, be incorporated in standard fashion as part of primary storage 2004. A specific mass storage device such as a CD-ROM 2014 may also pass data uni-directionally to the CPU or primary storage.

CPU 2002 is also coupled to an interface 2010 that connects to one or more input/output devices such as such as video monitors, track balls, mice, keyboards, microphones, touch-sensitive displays, transducer card readers, magnetic or paper tape readers, tablets, styluses, voice or handwriting recognition peripherals, USB ports, or other well-known input devices such as, of course, other computers. Finally, CPU 2002 optionally may be coupled to an external device such as a database or a computer or telecommunications network using an external connection as shown generally at 2012. With such a connection, it is contemplated that the CPU might receive information from the network, or might output information to the network in the course of performing the method steps described herein.

In one embodiment, a system such as computer system 2000 is used as a data import, data correlation, and querying system capable of performing some or all of the tasks described herein. Information and programs, including data files can be provided via a network connection 2012 for downloading by a researcher. Alternatively, such information, programs and files can be provided to the researcher on a storage device.

In a specific embodiment, the computer system 2000 is directly coupled to a data acquisition system such as a microarray or high-throughput screening system that captures data from samples. Data from such systems are provided via interface 2012 for analysis by system 2000. Alternatively, the data processed by system 2000 are provided from a data storage source such as a database or other repository of relevant data. Once in apparatus 2000, a memory device such as primary storage 2006 or mass storage 2008 buffers or stores, at least temporarily, relevant data. The memory may also store various routines and/or programs for importing, analyzing and presenting the data.

The invention may be embodied in a fixed media or transmissible program component containing logic instructions and/or data that when loaded into an appropriately configured computing device cause that device to perform one or more of the analytical operations described above on a dataset (e.g. classify behavior into bouts, identify circadian patterns to behavioral bouts, classify within cluster behaviors, compare groups, etc.) according to the methods of this invention.

Figure 20B:
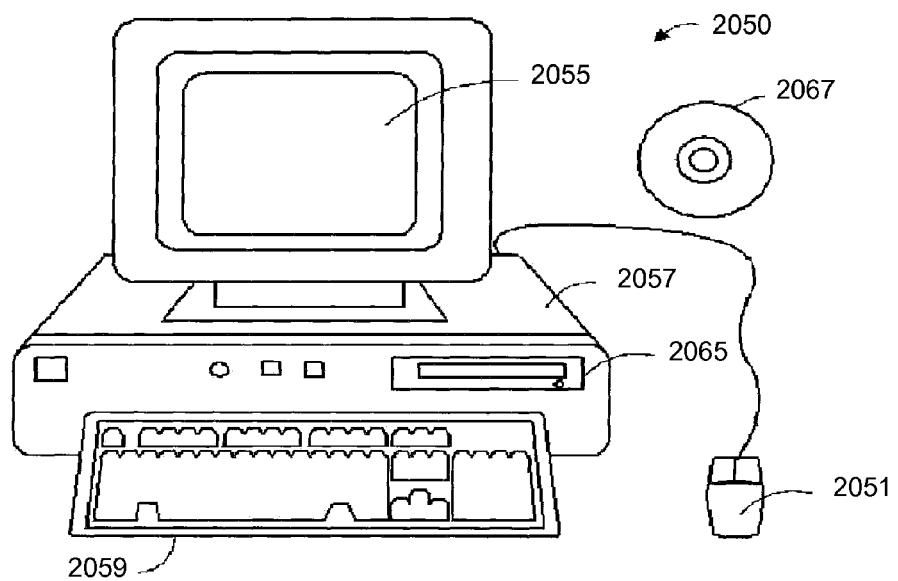

FIG. 20B shows digital device that may be understood as a logical apparatus that can read instructions from media 2067 and/or network port 2069. Apparatus 2050 can thereafter use those instructions to direct analysis of behavioral data, create, sort, search, and read behavioral database, and the like. In certain embodiments, the digital device can be directly connected to one or more cage behavioral systems according to this invention and, optionally function in realtime. In certain embodiments, the digital device can simply access, analyze, and/or manipulate previously collected data.

One type of logical apparatus that may embody the invention is a computer system as illustrated in 2050, containing CPU 2057, optional input devices 2059 and 2061, disk drives 2065 and optional monitor 2055. Fixed media 2067 can be used to program such a system and could can represent disk-type optical and/or magnetic media, and/or a memory or the like. Communication port 2069 can also be used to program such a system and can represent any type of communication connection (e.g. a connection to a data acquisition system).

The invention also may be embodied within the circuitry of an application specific integrated circuit (ASIC) or a programmable logic device (PLD). In such a case, the invention may be embodied in a computer understandable descriptor language that can be used to create an ASIC or PLD that operates as herein described.

The methods of this invention can be implemented in a localized or distributed computing environment. In a distributed environment, the methods can be implemented on a single computer comprising multiple processors or on a multiplicity of computers. The computers can be linked, e.g. through a common bus, but more preferably the computer(s) are nodes on a network. The network can be a generalized or a dedicated local or wide-area network and, in certain preferred embodiments, the computers may be components of an intra-net or an internet.

In certain internet embodiments, a client system typically executes a Web browser and is coupled to a server computer executing a Web server. The Web browser is typically a program such as Microsoft's Internet Explorer, or NetScape or Opera. The Web server is typically, but not necessarily, a program such as IBM's HTTP Daemon or other WWW daemon. The client computer can be bi-directionally coupled with the server computer over a line or via a wireless system. In turn, the server computer can be bi-directionally coupled with a website (server hosting the website) providing access to software implementing the methods of this invention.

A user of a client connected to the Intranet or Internet can cause the client to request resources that are part of the web site(s) hosting the application(s) providing an implementation of the methods of this invention. Server program(s) then process the request to return the specified resources (assuming they are currently available). A standard naming convention has been adopted, known as a Uniform Resource Locator ("URL"). This convention encompasses several types of location names, presently including subclasses such as Hypertext Transport Protocol ("http"), File Transport Protocol ("ftp"), gopher, and Wide Area Information Service ("WAIS"). When a resource is downloaded, it may include the URLs of additional resources. Thus, the user of the client can easily learn of the existence of new resources that he or she had not specifically requested.

The software implementing the method(s) of this invention can run locally on a server hosting the website in a true client-server architecture. Thus, the client computer posts requests to the host server which runs the requested process(es) locally and then downloads the results back to the client. Alternatively, the methods of this invention can be implemented in a "multi-tier" format wherein a component of the method(s) are performed locally by the client. This can be implemented by software downloaded from the server on request by the client (e.g. a Java application) or it can be implemented by software "permanently" installed on the client.

In one embodiment the application(s) implementing the methods of this invention are divided into frames. In this paradigm, it is helpful to view an application not so much as a collection of features or functionality but, instead, as a collection of discrete frames or views. A typical application, for instance, generally includes a set of menu items, each of with invokes a particular frame—that is, a form which manifest certain functionality of the application. With this perspective, an application is viewed not as a monolithic body of code but as a collection of applets, or bundles of functionality. In this manner from within a browser, a user would select a Web page link which would, in turn, invoke a particular frame of the application (i.e., subapplication). Thus, for example, one or more frames may provide functionality for inputting and/or accessing ethograms for particular animals or strains, while another frame provides tools for identifying bouts, clusters, circadian patterns, and the like.

In addition to expressing an application as a collection of frames, an application can also be expressed as a location on the Intranet and/or Internet; a URL (Universal Resource Locator) address pointing the application. Each URL preferably includes two characteristics: content data for the URL (i.e., whatever data is stored on the server) together with a data type or MIME (Multipurpose Internet Mail Extension) type. The data type allows a Web browser to determine how it should interpret data received from a server (e.g., such as interpreting a .gif file as a bitmap image). In effect, this serves as a description of what to do with the data once it is received at the browser. If a stream of binary data is received as type HTML, the browser renders it as an HTML page. If instead it is received type bitmap, on the other hand, the browser renders it as a bitmap image, and so forth.

In Microsoft Windows, different techniques exist for allowing a host application to register an interest in a data object (i.e., data of a particular type). One technique is for the application to register with Windows an interest in a particular file extension for an (e.g., .doc—"Microsoft Word Document"); this is the most common technique employed by Window applications. Another approach, employed in Microsoft Object Linking and Embedded (OLE), is the use of a class Globally Unique Identifier or GUID—a 16-byte identifier for indicating a particular server application to invoke (for hosting the document having the GUID). The class ID is registered on a particular machine as being connected to a particular DLL (Dynamic Link Library) or application server.

In one embodiment of particular interest, a technique for associating a host application with a document is through a use of MIME types. MIME provides a standardized technique for packaging a document object. It includes a MIME header for indicating which application is appropriate for hosting the document, all contained in a format suitable for transmission across the Internet.

In one preferred embodiment, the methods of the present invention are implemented, in part, with the use of a MIME type specific to the use of the methods of this invention. The MIME type contains information necessary to create a document (e.g., Microsoft ActiveX Document) locally but, in addition, also includes information necessary to find and download the program code for rendering the view of the document, if necessary. If the program code is already present locally, it need only be downloaded for purpose of updating the local copy. This defines a new document type which includes information supporting downloadable program code for rendering a view of the document.

The MIME type may be associated with a file extension of .APP. A file with the .APP extension is an OLE Document, implemented by an OLE DocObject. Because the .APP file is a file, it can be placed on a server and linked to using an HTML HREF. The .APP file preferably contains the following pieces of data: (1) the CLSID of an ActiveX object, which is an OLE Document Viewer implemented as one or more forms appropriate to the use of the methods of this invention; (2) the URL of the codebase where the object's code can be found, and (3) (optionally) a requested version number. Once the APP DocObject handler code is installed and registers the APP MIME type, it can be used to download an .APP file into the user's Web browser.

On the server side, since the .APP file is really a file, the Web server simply receives the request and returns the file to the client. When the APP file is downloaded, the .APP DocObject handler asks the operating system to download the codebase for the object specified in the .APP file. This system functionality is available in Windows through the CoGetClassObjectFromURL function. After the ActiveX object's codebase is downloaded, the .APP DocObject handler asks the browser to create a view on itself, for instance, by calling the ActivateMe method on the Explorer document site. The Internet Explorer then calls the DocObject back to instantiate a view, which it does by creating an instance of the ActiveX view object from the code that was downloaded. Once created, the ActiveX view object gets in-place activated in the Internet Explorer, which creates the appropriate form and all its child controls.

Once the form is created, it can establish connections back to any remote server objects it needs to perform its functions. At this point, the user can interact with the form, which will appear embedded in the Internet Explorer frame. When the user changes to a different page, the browser assumes responsibility for eventually closing and destroying the form (and relinquishing any outstanding connections to the remote servers).

In one preferred embodiment, from an end-user's desktop, the entry point to the system is the corporate home or the home page of another particular web-site. The page can, optionally, include, in a conventional manner, a number of links. In response to the user clicking on a particular link to an application page (e.g. a page providing the functionality of the methods of this invention), the web browser connects to the application page (file) residing on the server.

In one embodiment, where the user requests access to the methods of this invention, the user is directed to a particular page type, e.g., an application (appdoc) page for in-place execution of an application (implementing one or more elements of the methods of this invention) in the Web browser. Since each application page is located using an URL, other pages can have hyperlinks to it. Multiple application pages can be grouped together by making a catalog page that contains hyperlinks to the application pages. When the user selects a hyperlink that points to an application page, the Web browser downloads the application code and executes the page inside the browser.

Upon the browser downloading the application page, the browser (based on the defined MIME type) invokes a local handler, a handler for documents of a type. ore particularly, the application page preferably includes a Globally Unique Identifier (GUID) and a codebase URL for identifying a remote (downloadable) application to invoke for hosting the document. Given the document object and the GUID which arrive with the application page, the local handler looks to the client machine to see if the hosting application already resides locally (e.g., by examining Windows 95/NT registry). At this point the local handler can choose to invoke a local copy (if any) or download the latest version of the host application.

Different models of downloading code are commonly available. When code is downloaded, a "code base" specification (file) is initially requested from the server. The code base itself can range from a simple DLL file to a Cabinet file (Microsoft .cab file) containing multiple compressed files. Still further, an information (e.g., Microsoft.inf) file can be employed for instructing the client system how to install the downloaded application. These mechanisms afford great flexibility in choosing which component of an application gets downloaded and when.

In certain embodiments, the machinery employed for actually downloading program code itself relies on standard Microsoft ActiveX API (Application Programming Interface)—calls. Although the ActiveX API does not provide native support for Web-delivered applications, its API can be invoked for locating the correct version of the program code, copying it to the local machine, verifying its integrity, and registering it with the clients operating system. Once the code has been downloaded, the handler can proceed to invoke the now-present application host for rendering the document object (in a manner similar to invoking the hosting application through the registry if it were already installed).

Once the hosting application (OLE server) is loaded at the client, the client system can employ the OLE document view architecture to render the application correctly within the browser, including using conventional OLE methodology for adding the application's menu to that of the browser and for correctly re-sizing the application upon a re-size of the browser (as oppose to requiring the application to execute within a single Active X control rectangle—the limitation previously noted). Once the application is executing at the client, it can execute remote logic such as using RPC (Remote Procedure Call) methodology. In this manner logic which is preferably implemented as remote procedure(s) can still be used.

In certain preferred embodiments, the methods of this invention are implemented as one or more frames providing the following functionality. Function(s) to organize, search, save, and retrieve raw behavioral data or reduced/processed behavioral data (e.g. data produced by the devices of this invention), functions to identify and/or classify bouts, functions to identify/classify clusters of bouts, functions to identify/classify circadian patterns, functions to classify/identify within bout behaviors, functions to compare and contrast ethograms, functions to graphically represent ethograms, and the like.

In addition, the functions can also, optionally, provides access to private and/or public databases accessible through a local network and/or the intranet whereby one or more ethograms contained in the databases can be input into the methods of this invention.

Methods of implementing Intranet and/or Intranet embodiments of computational and/or data access processes are well known to those of skill in the art and are documented in great detail (see, e.g., Cluer et al. (1992) A General Framework for the Optimization of Object-Oriented Queries, Proc SIGMOD International Conference on Management of Data, San Diego, Calif., Jun. 25, 1992, SIGMOD Record, vol. 21, Issue 2, June, 1992; Stonebraker, M., Editor; ACM Press, pp. 383 392; ISO-ANSI, Working Draft, "Information Technology-Database Language SQL", Jim Melton, Editor, International Organization for Standardization and American National Standards Institute, July 1992; Microsoft Corporation, "ODBC 2.0 Programmer's Reference and SDK Guide. The Microsoft Open Database Standard for Microsoft Windows™ and Windows NT™, Microsoft Open Database Connectivity™ Software Development Kit", 1992, 1993, 1994 Microsoft Press, pp. 3 30 and 41 56; ISO Working Draft, "Database Language SQL-Part 2: Foundation (SQL/Foundation)", CD9075 2:199. chi. SQL, Sep. 11, 1997, and the like).

Those skilled in the art will recognize many modifications can be made to this configuration without departing from the scope of the present invention. For example, in a two-tier configuration, the server system executing the functions of the WWW gateway may also execute the functions of the Web server. For example, any one of the above described embodiments could be modified to accept requests from users/user terminals that are in a format other than a URL. Yet another modification would involve the adaptation to a multi-manager environment.

EXAMPLE

For the analysis of home cage behavioral patterns, mice were individually housed in home cage monitoring (HCM) cages for 14 days. The initial 4-days were considered an acclimation period, and the following 10 days of data were used for the derivation and analysis of behavioral elements and their patterns. Obtaining multiple days of data for each mouse allowed us to develop a detailed description of the average daily behavior of each mouse and to assess the reproducibility of the underlying behavioral elements and their patterns from day to day.

1. Experimental Procedures

A. Animals

Mice homozygous for the obese spontaneous mutation ($Lep^{ob}$, B6.V-$Lep^{ob}$/J: OB) and control C57BL/6J mice (WT) were obtained from The Jackson Laboratory (Bar Harbor, Me.). Serotonin 2C receptor hemizygous mutant males (2C) bearing a null mutation of the X-linked htr2c gene (Tecott et al., 1995) and control WT litter mates were bred at UCSF by mating females heterozygous for the htr2c⁻ allele (congenic on a C57BL/6J background) with C57BL/6J males obtained from The Jackson Laboratory. Genotyping for the htr2c⁻ allele was performed by PCR analysis. Animals were housed at room temperature (18-23° C.) on a 12-hr light/dark cycle (lights on at 7 am) with free access to water and a standard chow diet (PicoLab Mouse Diet 20, Purina Mills, Richmond, Ind.). Experiments were performed in accordance with the guidelines of the National Institutes of Health *Guide for Care and Use of Laboratory Animals* and the University of California Committee on Animal Research.

B. Data Collection

Male mice were individually housed for 14 days in home cage behavioral monitoring systems (HCM) consisting of 45×24×17 cm plexiglass enclosures with feeders and water bottles mounted at one end. A wire ramp enabled entry into a 4×4 cm feeder, where animals could access powdered chow by dipping their heads through a 2.5×2.5 cm aperture into a food drawer. To detect feeding, head dips interrupted a photobeam located below the opening in the ramp (DiLog Instruments, Tallahassee, Fla.). To detect drinking, animals licked from a metal spout attached to a water bottle located behind a metal plate with a 0.5×2.5 cm aperture. The metal spout allowed changes in capacitance from lick contacts to be detected (DiLog Instruments, Tallahassee, Fla.). To monitor the position of an animal's center of gravity, we placed the plexiglass enclosures on an activity-monitoring platform with a central pivot point and two load beams at the front, (DiLog Instruments, Tallahassee, Fla.). Data was collected to personal computers located in an adjacent room (DiLog Instruments, Tallahassee, Fla.). Intake event files recorded onsets and the offsets of photobeam breaks and lick contacts, sampled every millisecond. Movement events were defined as a change in an animal's center of gravity beyond a radius of 1 cm (calculated online from the animal's body weight and the forces on two load beams after filtering with a 500 millisecond moving average window). Movement event files recorded the onset of movement events sampled every 20 milliseconds as well as the distance moved in x and y.

To determine food and water intake, data collection was stopped to weigh food and water after which data collection was re-started. This period of daily maintenance occurred between 9 and 11 am and took less than 2 hours. Each day, we recorded the animal's nest location in one of 21 sectors defined by 3 divisions of the cage in x and 7 divisions in y. We collected data from 11-14 week old male mice: WT (n=8) and OB (n=8); WT (n=16) and 2C (n=16).

To validate the use of photobeam break time and lick contact number as measures of daily food and water intake, we weighed the food and water for a subset of mice at 7 am for 3 days, at 7 am and 7 pm for 3 days, and at 7 am, 1 pm, 7 pm, and 10 pm for 3 days after the initial data collection. The strong correlation of intake with device measurements across different times of day confirm that these device measurements can be used to estimate intake at any time of day (feeding $R^2$ (mean±sd, number of mice): WT 0.95±0.04 N=8, 2C 0.97±0.01 N=6; drinking $R^2$: WT 0.98±0.01, N=8, 2C 0.98±0.01 N=8; p<0.0001 for all mice both intake devices). To estimate intake across time, we calculated a feeding coefficient (mg/s) by dividing total chow intake by total photobeam break time, and a licking coefficient (mg/lick) by dividing total water intake by total lick contact number. By multiplying the feeding coefficient by the duration of photobeam breaks or the licking coefficient by the number of lick contacts, we estimated intake across time.

C. Data Processing and Quality Control

The large volumes of behavioral data required the establishment of methods for efficiently assessing and maximizing data quality. To achieve this, we used the output of each data collection device to cross-check the performance of the other devices in the cage. The data quality control algorithms developed in-house in the MATLAB programming language automatically detected errors and flagged the data for exclusion or for review by an experimenter using a graphical user interface built in-house. For ease of analysis, only mouse days with error free data for all devices were used in the analysis.

i. Detection of Intake Event Onset Errors

We estimated the overall drift in positions (see movement position correction below) and compared this with the drift in the positions of the animal during intake event onsets. To estimate the overall position drift, we calculated a position envelope (separately for x and y) that followed how the minimum and maximum animal positions changed with time during daily data collection.

For example in x, this was accomplished by using the time series consisting of positions in x and calculating multiple convex hulls whose vertices defined the envelope of the x positions with respect to time. Initially, we fit the first convex hull to x data in the first 15 minutes of the day. Then this hull was expanded (in time) until the maximal distance that the animal traveled was at least 15 cm in x (or 35 cm in y), indicating that the animal had traversed most of the cage (in x or y). Then we fitted the next convex hull encompassing the data in the next 15 minutes after the end of the previous convex hull. This hull was expanded in the same way as the first. We continued fitting hulls to the x data until the whole daily data collection period was covered.

This produced a position envelope which defined the boundaries of the animal's movement in the cage, providing estimates of how drift in the minimum and maximum x positions varied with time. The estimates of the drift in maximum and minimum position were averaged to estimate the drift in x position. If this drift differed from the apparent drift in intake device position by more than 10 cm in x or 15 cm in y, the intake and movement device events were flagged for subsequent review. Event onset errors led to the exclusion of photobeam break data for 3 mouse days and lick contact data for 4 mouse days.

ii. Movement Position Correction

Because we estimate positions using the forces on the activity platform load beams, errors could be introduced into these estimates by changes in the distribution of mass within the cage (due to removal of food and water from the front of the cage, shifting of bedding, urination, and defecation). To correct these errors, we first used the known locations of the feeding and licking detection devices to set the expected position of the animal's center of gravity when at the device. This expected position was set during the first device detection of the day since this position will have a minimum amount of drift. Comparisons were then made between subsequent intake event positions predicted from movement data and the expected positions based on the location of the intake device (after excluding false intake event onsets as above). If the predicted and expected positions differed by more than 2 cm in x or y (mean±sd: 33±9% of the movement events), we corrected positions occurring between the current and preceding intake event as follows: 1) the position drift was determined separately for x and y, 2) the total drift was apportioned among the positions weighted by the distance moved during each movement event.

iii. Detection of Intake Event Offset Errors

Failure to detect the offset of intake events could occur when feeder photobeams became blocked by food particles. To detect such errors, all positions across all days that a mouse assumed during photobeam breaks were clustered using a rapid nearest neighbor clustering algorithm termed Ameoba. To identify distinct clusters occurring during photobeam breaks, we used a 5 cm cluster criterion. The presence of only one cluster, centered at the device, indicated that all the intake event offset times were accurate because the mouse was near the device during all intake events. When more than one cluster was present, we assumed that the largest cluster centered closest to the intake device contained valid events. We excluded events in the other clusters since the animal was far from the device during these events. This resulted in exclusion of photobeam break data from 68 mouse days out of 480 total mouse days (14%). The same algorithm was used to test for detection of lick event offset errors, but no such errors were detected.

vi. Detection of Other Errors

Data were also excluded for several idiosyncratic errors in data collection. Photobeam break data were excluded for days 13-14 for one mouse that was observed sleeping in the feeder. All data were excluded for days 12-14 for one mouse because it emptied the food hopper on day 12 and may have been food deprived. All data were excluded for days 8-9 for all mice in the WTOB cohort due to a loss of temperature control to 31° C. in the monitoring room on day 8 for several hours.

D. Inactive State Classification

For each mouse, behavior was classified into two states: an inactive state (IS) during which the mouse spent prolonged periods of time near a single location, and an active state (AS) during which the animal moved around the cage. This classification was accomplished by deriving an inactive position duration threshold as described above. Positions with durations longer than the inactive threshold were classified as inactive. Because over some period of time animals may relocate their home base, we varied a time window to capture epochs during which a single home base was used. A spatial filter was applied to smooth out small movements that did not remove the animal from the location of the home base. To select the appropriate time window and spatial filter, we minimized a state classification error, as described above with reference to FIG. 11.

The time window was varied from 2-24 hours (2, 3, 4, 6 12, 24 hrs starting at circadian time zero, (lights on)). As the spatial filter, we used a movement threshold that varied from 1 cm to 8 cm (1, 2, 3, 4, 5, 6, 8 cm) which is close to the body length of these mice (ref). For each combination of time window length and movement threshold, we calculated the distance of all positions from the position having the longest duration in each window. Associated with each position was a duration and a distance to the longest duration position in that window. These positions were then binned with respect to the log of their durations (bin width 0.1 log ms with empty bins excluded). Using non-linear least squares regression, we fit three lines to the maximum distance in each bin. The intersection of the second and third lines was set as the inactive threshold for the mouse. We then defined IS onsets and offsets by grouping adjacent inactive positions.

To determine the IS classification error, we calculated the percent of ISs that contained intake events. To determine the AS classification error, we identified ASs without intake events in which the area covered by the mouse was not greater than the maximum of all areas covered during ISs. The state classification error was then calculated by summing the IS and AS classification errors. We then selected the movement threshold that yielded the lowest state classification error using a 1×7 repeated measures ANOVA difference contrast (WTOB 2 cm; WT2C 3 cm). The window duration did not significantly alter the error rate and was set to the largest window with the minimum number of inactive positions greater than 10 centimeters from the longest pause (WTOB 12 hrs; WT2C 4 hrs). Using these movement thresholds and time windows, the state classification error rates for the cohorts were (mean±sd): WTOB 7±10%; WT2C 5±10% and the inactive thresholds (mean±sd): WTOB WT 5±1 OB 13±4; WT2C WT 8±2 2C 8±2, minutes. States classified in error were corrected prior to further analysis.

E. Intake Bout Classification

For each mouse, we classified bouts separately for feeding and drinking by examining the properties of all intervals between the offset of one intake event and the onset of the next intake event (inter-event intervals, IEIs). To classify each IEI into a within-bout interval (WBI) or an inter-bout interval (IBI), we examined two IEI properties: 1) the probability that the mouse remained at the device during the IEI and 2) the duration of the IEI relative to the overall distribution of IEI durations. After IEI classification, bout onsets and offsets were identified as unbroken strings of within-bout intervals between intake events. Classification of IEIs occurring during the light cycle was performed separately from classification of IEIs occurring during the dark cycle.

The probability that an animal was at the device during an IEI was estimated by fitting bivariate normals (details of fitting procedure discussed below) to the positions (x,y) that were the farthest away from the device during an IEI (FIG. 22A). The centroids of the fitted bivariate normals were clustered using a rapid nearest neighbor clustering algorithm called amoeba. Ameoba allows a cluster to grow, in any direction, as long as any point in the cluster has a nearest neighbor closer than a user set distance criterion. The distance criterion was varied from 1 to 2.4 cm yielding clusters of bivariate normals. The cluster of bivariate normals whose centroid was nearest to the device was classified as "at the device" (AD). The bivariate normals in this cluster were assigned as AD bivariate normals with the exception that diffuse bivariate normals (sd greater than 2 in x or y) were excluded. We then summed the posterior probabilities for the AD bivariate normals to yield an estimate of the probability that each maximally distant IEI position (MDIP) was at the device. The final distance criterion for amoeba was chosen to minimize the overlap between the two groups by minimizing the classification entropy, $$E_c = -\sum_{k=1}^{N_c} \sum_{i=1}^{N_d} z_{ik} \log(p_{ik}),$$

$$z_{ik} = \begin{cases} 0 & p_{ik} < 0.5 \\ 1 & p_{ik} \geq 0.5 \end{cases}$$

where $p_{ik}$ is the at device posterior probability for position i and cluster k, $N_C$ is the number of clusters and $N_d$ is the number of positions (Biernacki et al., 2000; Celeux and Soromenho, 1996).

The probability that an IEI was short relative to the overall distribution was determined by fitting univariate normals (details of fitting procedure below) to the log transformed IEIs (FIG. 22B). We then sorted the IEIs from shortest to longest and defined partition boundaries between consecutive IEIs where the hard clustered identity ($z_{ik}$) changed from one cluster to another. For individual mice, this resulted in 3 to 9 partitions of the feeding IEIs and 4 to 15 partitions of the drinking IEIs. The variation in the number of partitions resulted mainly from the variable number of peaks less than one minute for feeding and less than one second for drinking. For feeding, the variation across mice in the number of peaks may reflect differences in how the mice handle the food (eg: head dipping vs paw feeding). For drinking, the variation across mice reflects differences in the number of missed licks during bursts of licking with some mice frequently missing one or two lick contacts in a stream of highly stereotyped licks. This produces one to three peaks that are narrower than expected for a normal distribution (kurtotic) such that each of these peaks may require more than one normal distribution to provide an adequate fit to the IEI distribution.

Because of the variation in the number of partitions, we utilized spatial information to classify partitions as having either a short or long duration with short durations consistent with a high probability of an IEI being a WBI. Since we expected that intervals with short durations would be characterized by an increased probability of remaining at the device, we examined the relationship between the mean duration in each partition and the probability that the animal was at an intake device (FIG. 33). The partition durations were then classified as long or short in the following way. To classify partition durations as short or long, we combined all partitions for a given group (e.g. OB mice) to reduce the effects of individual variability. We then fit a smoothing line (lowess, span 20% total number of data points) to the partition AD probability as a function of the mean of the log transformed partition durations (FIG. 33). For the WBI, a group duration criteria, $ID_{WBI\text{-}group}$, was then set as the duration at which the mice were equally likely to remain at or leave the device. All partitions with mean durations less than this criteria whose partition AD probability was greater than 0.5 were classified as short interval partitions. Similarly, all partitions with mean durations greater than the group duration criteria whose partition AD probability was less than 0.5 were classified as long interval partitions. Some partitions (<1%) fit neither of these criteria and were given the classification of their nearest neighbor partition.

For each mouse, the transition between the short and long partitions was used as the short IEI duration criteria, $ID_{WBIm}$. Then the posterior probabilities for univariate normals whose mean duration was less than the duration criteria were summed to yield estimates of the probability that each IEI was short. For exceptionally diffuse univariate normals (sd greater than 1.5) the posteriors for IEI shorter than the criteria were added to the short group and the posteriors for IEI greater than the criteria were added to the long group.

Finally, the probability that an IEI was a within-bout interval was determined by averaging the probability that a mouse was at the device during an IEI and that the IEI was short. We then classified an IEI as within-bout if this probability estimate was greater than a criteria given by $$\text{probability criteria} = \begin{cases} 0.5 + 0.001 * d_{IEI}^{max}, & d_{IEI}^{max} \leq 5 \text{ cm}, \\ & ID_{IEI} < ID_{WBIm} \\ 0.505 + 0.005 * \\ d_{IEI}^{max} / \max_{IEI}(d_{IEI}^{max}), & \text{otherwise} \end{cases}$$

where $d_{IEI}^{max}$ is the maximum distance from the initial position for the IEI and $ID_{IEI}$ is the duration of the IEI. This scaling of the probability criteria places a greater weight on the at device probability as the mouse moves farther from the initial position between intake events. The weighting was chose because the overlap of the position bivariate normals was generally less than the overlap of the duration univariate normals. An upper limit for the amount of time that can be spent at the device between intake events was also set by classifying as IBIs all IEIs whose duration was greater than the group WBI duration criteria even if the animal had a high probability of remaining at the device.

We further examined the properties of the intake bouts by fitting univariate normal distributions to the log transformed bout sizes for each mouse. These fits revealed that the bout size distribution was better modeled by two or more log normal distributions. This was true across all mice. We therefore classified the bout sizes into large and small for each mouse by placing partition boundaries at the zeros of the first derivative of the univariate normal mixture fit. Bouts occurring in partitions that accounted for less than 15% of the total daily intake were classified as small, and bouts occurring in partitions that accounted for greater than or equal to 15% of the total daily intake were classified as large. The small intake bouts contributed little to total daily intake (feeding bouts: WTOB WT 4±2% OB 3±2%, WT2C WT 8±6% 2C 10±5%; drinking bouts: WTOB WT 3±2% OB 1±1%, WT2C WT 5±4% 2C 8±9%, (mean±sd)), and were therefore not included in the analysis of intake bout properties (such as mean bout size and bout onset rate). However, the small bouts were included in the analysis of total time spent feeding and drinking.

i. Univariate and Bivariate Normal Fitting:

Fitting of univariate and bivariate normal mixture distributions was carried out using a regularized expectation maximization (rEM) algorithm with regularization weight, lambda, set to 0.5 (Ormoneit and Tresp, 1998; Ueda et al., 2000). To select the minimum number of normal distributions that best fit the data, we started by fitting one normal distribution to the data. We then tested the improvement in the fit to the data resulting from the addition of each subsequent normal distribution using the likelihood ratio (LR) between the two fits (LR=2*(log($L_{n+1}$)−log($L_n$))) as the test statistic. The fitting of additional normal distributions continued until the estimated p value (calculated from a chi square distribution) for the comparison was greater than 0.01 for WBI and IBI classification and greater than 0.05 for bout size splitting and comparison clustering. For the WBI and IBI classification, the Wolfe correction for the estimate of the p value calculated from the chi square distribution was also used to decrease the occurrence of overfitting (McLachlan, 2000).

The selection of the initial values used to initiate the rEM algorithm varied with the number of normal distributions to be fit. For a single distribution, fitting was initiated using the mean and variance of the data as the initial parameter estimates. For a mixture of two distributions, fitting was initiated using k-means clustering to provide initial estimates of the mixture parameters. The k-means procedure was initialized from a uniform distribution covering the range of the data. For each rEM initialization, the k-means algorithm was run 1000-10,000 times to increase the probability of finding the global minimum.

For a mixture of three or more distributions, fitting was initiated using a modification of the split and merge expectation maximization algorithm (Ueda et al., 2000). From the mixture distribution of the prior fit, each normal distribution was split into two normal distributions. All combinations of splitting one normal distribution and retaining the remaining distributions from the prior fit were then used to initialize fitting with rEM. The split that minimized the LR was retained. Splitting of individual normal distributions was carried out by creating a local data set for each normal distribution and fitting each local data set with two normal distributions using rEM initialized by k-means. Local data sets were created by estimating the local data density centered around each normal distribution in the mixture calculated according to Ueda et al 2000 (equation 3.14). We then divided this density estimate by its maximum density to provide an approximate cumulative probability estimate for each data point. We then used this distribution to simulate the local data.

F. Movement Bout Classification

For each mouse, we classified movements occurring during the active state but not during intake bouts, ($M_{AS\notin IB}$), into locomotor movement (LM) or non-locomotor movement (NLM). We did this using a supervised learning algorithm that used the movements occurring during inactive states or during intake bouts as the training set. Because these movements take place in a limited area, they represent "moving in place" (MIP) behavior (Drai et al., 2000) and should reflect the properties of NLM events. Thus, the MIP movements should be distinct from movements occurring during bouts of locomotion when the animal moves around the cage. To parameterize the training set of MIP events we used the movement rate (cm/s) and turning angle (dot product angle of two movement vectors) for each position (described below.)

For each mouse we defined the template for our supervised algorithm using a kernel density estimator to assess the distributions of the movement rate and mean turning angle for MIP positions. The same kernel density estimator was used to assess these distributions for the $M_{As\notin IB}$ positions (FIGS. 34A-34D). The intersection of the two movement rate probability densities, (MIP and $M_{AS\notin IB}$ represents the point where the $M_{AS\notin B}$ movement rate is equally likely to be similar or distinct from the MIP movement rate (cm/s (mean±sd): WTOB WT 1.1±0.2 OB 0.23±0.03; WT2C WT 1.1±0.3 2C 1.5±0.3). The intersection of the two turning angle probability densities, (MIP and $M_{As\notin IB})_5$ represents the point where the $M_{As\notin IB}$ turning angle is equally likely to be similar or distinct from the MIP turning angle (deg (mean±sd): WTOB WT 47±5 OB 65±6; WT2C WT 47±4 2C 45±3). The relative probability that the movement rate or turning angle of the $M_{As\notin IB}$ was distinct from the MIP positions was estimated by dividing the probability density estimate for the $M_{As\notin IB}$ by the sum of the probability density estimates for both the MIP positions and the $M_{As\notin IB}$ positions. These relative distributions (FIGS. 34A-34D) represent the probability that $M_{As\notin IB}$ movement rates or turning angles were distinct from the template rates or angles. The relative probability estimates for movement rate and turning angle were averaged so that both movement rate and turning angle were considered in the classification of each position. A position was classified as being within a LM bout if this averaged relative probability estimate was greater than 0.5. Finally, locomotion bout onsets and offsets were identified as uninterrupted sequences of positions with locomotion movements between them. If a locomotion bout contained only a single position, the position was reclassified as MIP (<3% for all groups).

i. Determination of Position Movement Rate and Turning Angle

In general to estimate movement rate, at least two positions must be sampled. We calculated movement rate for each position using a window five positions long because this is approximately half the body length for these mice. To choose the best window, we compared 8 windows created by shifting along a span of 9 positions, 4 on each side of the position of interest. The window containing positions whose durations and turning angles were most similar to those of the position of interest was selected as follows. For each of the comparison windows, we calculated the mean duration and mean turning angle by averaging the position durations and turning angles of each position in the window. The window used to estimate the movement rate and turning angle of the position of interest was selected to minimize the distance between the duration and turning angle of this position and those assigned to the 8 windows. The movement rate for this position was then calculated by dividing the distance traveled from the first to the last position in the selected window by the duration spent moving between these positions. Similarly, the turning angle for this position was calculated as the mean of the turning angles in the selected window.

Because data were collected using a 1 cm threshold, mice can stay at an individual position for a prolonged period and move rapidly before and after stopping at this position. Pauses of this type may be surrounded by rapid movements and misclassified as a locomotion positions using the sliding window described above. To detect such errors, we set a duration threshold above which a single position was defined as a stop. To define this threshold, we identified all intake bouts and inactive states that contained only a single position. The duration threshold was then set such that 95% of these positions were longer than the threshold. In addition, the threshold was not allowed to drop below 500 ms or to go above 1000 ms for any individual mouse to prevent large variation in this correction across groups (duration threshold, ms (mean±sd): WTOB WT 593±113 OB 1000±0; WT2C WT 519±40 2C 664±156).

G. Comparison Clustering

Because the AS durations exhibit a complex pattern of variation with time of day, a technique termed comparison clustering was developed to test if this daily pattern of AS onsets and durations differed between two groups. In addition, if a difference was present, the comparison clustering technique identified the parts of the daily pattern, defined by the AS onset times and durations, that contributed most to the difference between the two groups.

Clustering of AS onset times and durations was carried out by fitting mixtures of bivariate normals to the combined data for two groups. Mixtures of bivariate normals were used to capture features of the daily pattern such as the grouping of AS onsets with long durations at the beginning and end of the dark cycle. Because the AS durations range over several orders of magnitude, the durations were log transformed prior to bivariate normal fitting. In addition, the onset times and durations were normalized to zero mean and unit standard deviation. After fitting of bivariate normals, distinct clusters were created by assigning each AS to the bivariate normal with highest posterior probability (hard clustered). The chi-square statistic for each cluster was given by:

$$\chi^2 = \frac{(c_o - c_e)^2}{c_e} + \frac{(t_o - t_e)^2}{t_e},$$

where $c_o$=observed number of control data points, $t_o$=observed number of test data points, $c_e$=expected number of control data points, and $t_e$=expected number of test data points. The expected values $c_e$ and $t_e$ were calculated by weighting the total number of points in a cluster by the relative number of mouse days in the control and test data sets respectively (e.g.

$$w_c = \frac{N_c}{N_c + N_t}$$

where $N_c$=control number of mouse days and $N_t$=test number of mouse days).

Increasing the number of clusters increases the resolution of the patterns obtained, however it also decreases the sensitivity of the chi square test statistic. To determine the number of clusters that optimizes the trade off between these two quantities, the control and test groups were split in half multiple times by permuting the mice within each group. The variation in the chi square statistic both within and between groups was then examined in the following way. For each permuted data set, the sum of chi squares was calculated for within-group comparisons (control group 1 (cg1) vs control group 2 (cg2), test group 1 (tg1) vs test group 2 (tg2)) and for between group comparisons (cg1 vs tg1, cg1 vs tg2, cg2 vs tg1, cg2 vs tg2) with the data clustered into 1-50 clusters. The difference between the mean between-group and within-group chi-square statistics (delta chi-square) was used to calculate a p value based on the chi square distribution. The use of the delta chi-square in calculating the p values helps to account for the natural p-value variation within groups. The number of clusters to use in comparing the full data sets was then chosen as the smallest number of clusters with a delta chi-square p-value that was not statistically significantly different by paired t-test from the minimum delta chi-square p value.

H. Multiple Test Correction

Comparisons between groups were made for a number of different variables using t-tests or repeated measures ANOVA (Matlab). For a given level of analysis, a Bonferroni correction for multiple comparisons was used. For instance, in comparing the daily amount of food, water, and movement a correction was made for three tests.

2. Results

A. Inactive State Classification

Figure 21:
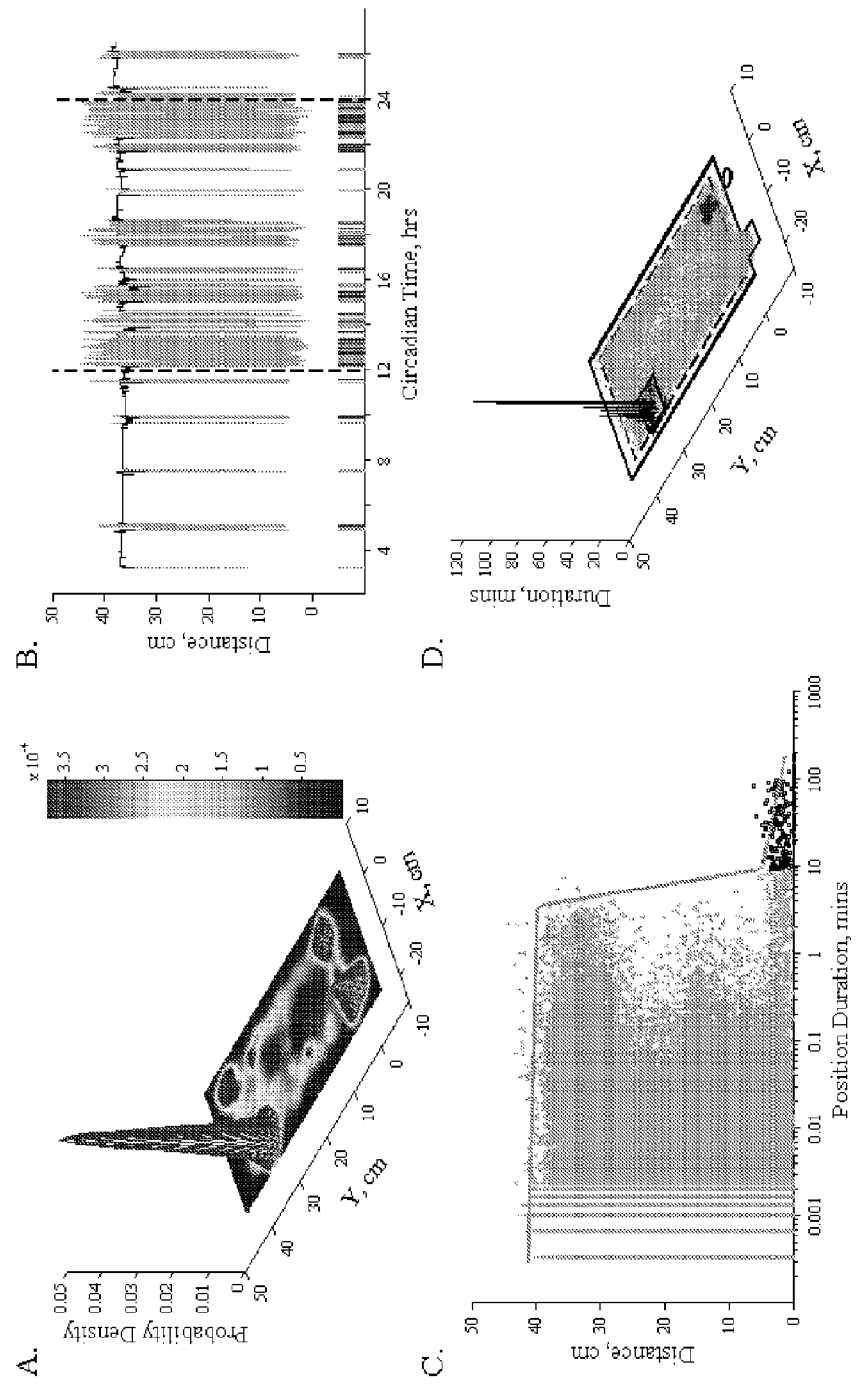
FIG. 21A shows position probability density for a wild type (WT) mouse during one day. The position probability density was calculated using a kernel density estimator with a normal kernel function, a bandwidth of 1 cm, and all positions of the mouse during a single day weighted by the time spent at each position. For this mouse and day, the peak of the maximum position probability was 0.8 cm from the center of the observed location of the nest which was in the left rear of the cage at x=−13 cm and y=34 cm. In addition, smaller peaks were present in the left front of the cage corresponding to the location of the feeder at x=−12.5 cm and y=−2.6 cm and in the right front of the cage corresponding to the location of the lick spout at x=0 cm and y=0 cm.
FIG. 21B shows the variation in position and occurrence of intake and movement events for the same wild type mouse and day as in FIG. 21A. Circadian time is displayed on the x axis with the onset and offset of the dark cycle denoted by dashed lines at 12 and 24 hours. The position of the mouse is displayed on the y axis as the distance from the tip of the lick spout whose xy coordinates were set to x=0 and y=0. Black lines indicate positions occurring during the inactive state and green lines indicate positions occurring during the active state. At the bottom of the plot, feeding events are displayed as orange rasters and drinking events are displayed as blue rasters.
FIG. 21C shows identification of inactive state pause threshold for the same wild type mouse as in FIGS. 21A and 21C. Position durations for all days are shown on the logarithmic x axis and the corresponding distances from the longest position duration in a six hour window are displayed on the y axis. The inactive state position duration threshold for this mouse was 9.3 minutes indicating the duration at which a rapid increase in the distance from the longest position duration was observed. Inactive state positions are displayed in black and active state positions are displayed in green.
FIG. 21D shows the location of inactive state positions and intake events for the same wild type mouse and day. Inactive state positions classified using the position duration threshold cluster in the vicinity of the observed nest which is displayed as a small black box. For this mouse and day, the center of the inactive state positions was 0.3 cm from the center of the observed location of the nest. The dashed black lines correspond to the floor of the cage and the solid black lines to the lip of the cage. The feeder is represented by a small box at the left front of the cage, and the water bottle is represented by a circle at the right front of the cage. The position of the mouse during feeding events is displayed in orange and during drinking events in blue.

The spatial structure of mouse home cage behavior was examined by estimating the position probability density for individual animals (FIG. 21A). Peaks in this distribution indicate positions where animals were most likely to spend time each day. The probability density estimates typically revealed a single prominent peak corresponding to the location of the nest: the average distance from this peak to the observed location of the nest was 3±1 cm (mean±sd). Additional, smaller peaks at the food hopper, water spout, and occasionally at other locations were also observed. Thus, the data reveal a robust spatial structure of home cage behavior, with animals spending more time at the nest than at any other location.

These findings suggested that the temporal structure of behavior in the home cage may be organized around episodes of inactivity at the nest. To investigate this possibility, we examined variation in the position of individual mice with time of day (FIG. 21B). Mice exhibited prolonged episodes of time spent near a single location in the cage interspersed with episodes of movement around the cage that were typically accompanied by feeding and drinking. The location where mice spent prolonged episodes of time consisted of positions with long durations between movements. To determine the extent to which these long position durations were spatially clustered, the relationship between position duration and distance from the longest position duration (LPD) was examined (FIG. 21C). As position duration increased above several minutes, there was a very rapid decline in the number of positions farther than about 5 cm from the LPD. An inactive position duration threshold was identified as the position duration at which the distance from the LPD began to increase rapidly as described above with reference to FIG. 12. Thus defined, the inactive position duration threshold identified positions which are clustered together in space and have longer position durations than at any other location in the cage.

Using the inactive position duration threshold, inactive state (IS) onset and offset times were identified in an automated and reproducible manner. In addition, the location at which the IS positions clustered was identified and designated as the home base. As expected, the location of the home base typically corresponded to the location of the nest (FIG. 21D) with an average distance from the center of the home base to the observed nest location of 2±1 cm (mean±sd). Finally, actives states (AS) were classified as the temporal intervals between the ISs during which animals engaged in locomotion, feeding, drinking, and other behaviors.

B. Bout classification

The organization of feeding and drinking within the active state was investigated utilizing the concept of a bout as a behavioral element. A bout was defined as the repetition of a behavior clustered together in time and without the intervention of a different behavior. Automated algorithms for intake bout identification (such as those described above with reference to FIG. 15) incorporating information regarding both temporal and spatial properties of ingestion, were used for quantification of feeding and drinking behavior. The application of the algorithm to classify feeding bouts in particular is described below.

For the identification of feeding bouts, spatial information was incorporated into the classification scheme by assessing the locations occupied by mice between the end of each feeding event and the onset of the subsequent feeding event (inter-event intervals, IEIs). For each IEI, the position at which the mouse was farthest from the feeder was determined (FIG. 22A). These maximally distant IEI positions (MDIPs) appeared to cluster either in the vicinity of the feeder or at other locations in the cage (middle panel of FIG. 22A). This suggested a criterion for designating the termination of a feeding bout: if a mouse left the feeder during an WI, then an intervening behavior had occurred. The probability that the mouse remained at the feeder during an IEI was therefore estimated by fitting a mixture of bivariate normals to the MDIPs. If the probability of remaining at the feeder was greater than 0.5, the IEI was classified as being "at the feeder" (right panel of FIG. 22A, which shows orange IEIs classified as being at the feeder and green IEIs as being away from the feeder).

The next step in the identification of feeding bouts took into account the temporal patterns of ingestive behavior. If feeding events cluster in time to form bouts, then the IEI durations, ID, should exhibit at least two distinct types: ID that are likely to occur within feeding bouts and ID that are likely to occur between feeding bouts. To distinguish these distinct types, ID distributions for each mouse were first fit with mixtures of log normal distributions (FIG. 22B). For all mice, the ID distributions were best fit by a mixture of 3 or more log normal distributions consistent with the presence of distinct types of IDs. For log normal distributions with means less than about one minute, the probability that the animal remained at the feeder appeared to be very high. This probability dropped rapidly for log normal distributions with means greater than one minute (See FIGS. 22C and 33). The probability that an IEI was short was thus determined by splitting the log normal distributions into two groups (short and long) based on the probability that the mouse remained at the feeder.

Finally, the designation of each IEI as either a within-bout interval (WBI) or an inter-bout interval (IBI) was made by averaging the probability that the IEI occurred at the feeder with the probability that it was short. Evidence that this approach distinguishes populations of IEIs with distinct spatial and temporal properties is depicted in FIG. 22C. For each WI, the maximum distance from the feeder is indicated on the Y-axis and the logarithm of its duration is indicated on the X-axis. IEIs designated as WBIs are shown in orange, and all occur in the vicinity of the feeder. During the vast majority of IBIs, animals stray from the feeder (green), with water intake occurring in a subset of these (blue). A small cluster of IEIs occur in the vicinity of the feeder (red), but are classified as IBIs due to their long durations.

A further step in characterizing the behavior of the mice during ASs was the derivation of a method for distinguishing between locomotor movement (LM) and nonlocomotor movement (NLM) events. A supervised learning algorithm was developed using "moving in place" (MIP) behavior (Drai et al., 2000) occurring during ISs or during bouts of feeding and drinking as the NLM template. Uninterrupted strings of movement events that were most likely to occur during locomotion were then used to define the onset and offset times of locomotion bouts. Finally, time within the active states when mice where not engaged in intake or locomotor bouts where classified as bouts of "other" behavior (e.g. scanning, rearing, grooming, digging, etc).

Figure 23:
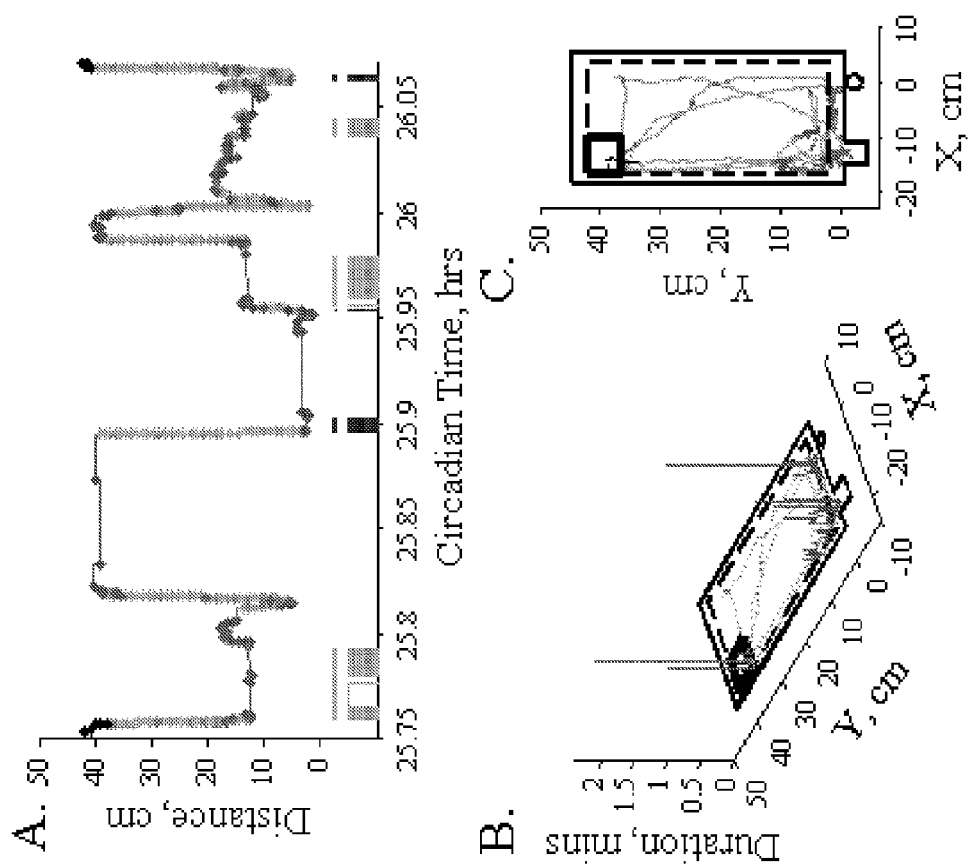
FIG. 23A shows a single light cycle active state. The left hand panel shows the distance of the mouse from the tip of the lick spout versus circadian time. Green dots indicate positions occurring during locomotion bouts and red dots indicate positions moved to during feeding and drinking bouts or during bouts of other behavior. Red lines show the time spent at a given position. At the bottom of the plot, vertical orange lines depict the onset and duration of feeding events, and vertical blue lines depict the onset and duration of drinking events. (At the time resolution depicted, most of the events are not resolved into individual lines but appear together). Above the lines depicting the feeding and drinking events, thick orange or blue lines indicate the onset and offset of the feeding and drinking bouts.
FIG. 23B shows the location and duration of positions occupied by the mouse during the active state depicted in FIG. 23A.
FIG. 23C shows the paths taken within the cage during the active state depicted in FIG. 23A and TDE. Green symbols again indicate positions occurring during locomotion bouts and red symbols indicate positions occurring bouts of feeding, drinking, and other behaviors.

An example of bout classification during a single AS is shown for a WT mouse in FIG. 23A. Here, AS positions are plotted as in FIG. 21B, but with an expanded time scale that permits the resolution of individual movements between positions. In addition, bars above the feeding and drinking event rasters at the bottom of the plot indicate the onset and offset of feeding (orange) and drinking (blue) bouts. Positions occurring during locomotor bouts are indicated in green and revealed clear episodes of rapid movement between locations. By contrast bouts of "other" behavior (red) are frequently associated with NLMs in local areas such as at the feeder, lickometer and nest. This is highlighted in FIG. 23B, which displays the locations and durations of LM and NLM positions, and in FIG. 23C, which displays the animal's locomotor paths during this active state.

C. Daily Amounts, Intensities, and Time Budgets

Figure 24:
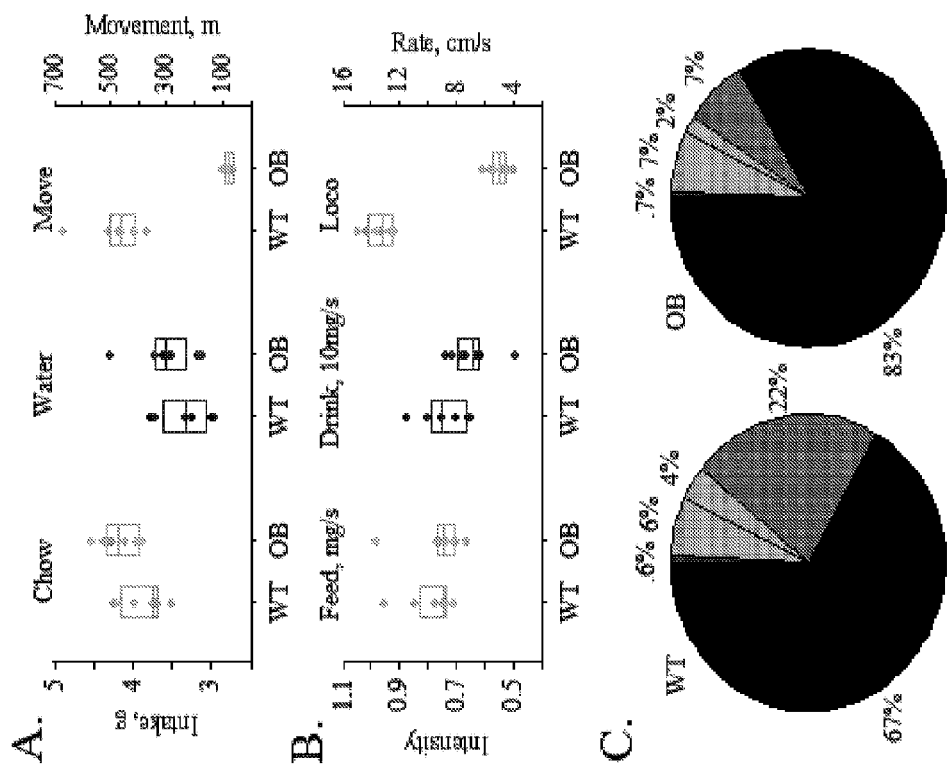
FIGS. 24A-C show daily amounts, intensities, and time budgets for WT and OB mice.
Figure 25:
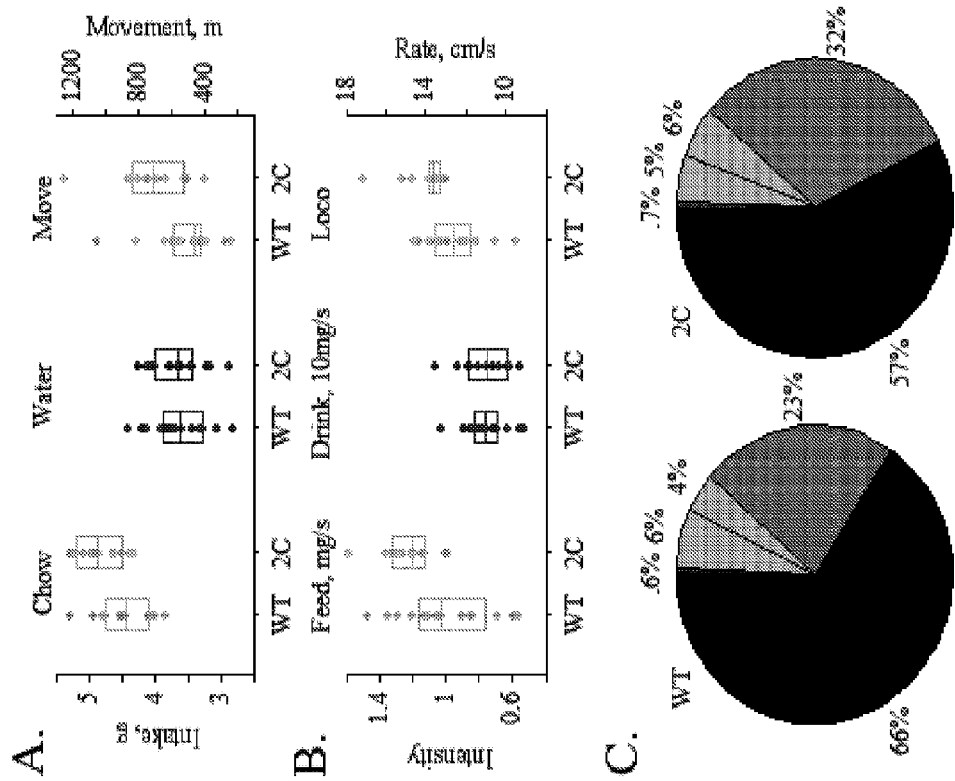
FIGS. 25A-C show daily amounts, intensities, and time budgets for WT and 2C mice.

The classification of mouse behavior into ISs and into feeding, drinking, locomotor, and "other" bouts allows a detailed examination of mouse behavioral organization in the home cage. At a general level, animals control their daily food and water intake as well as distance moved by modulating the intensity of feeding, drinking, and locomotor bouts, as well as the amount of time spent in these bouts. (See FIGS. 24 and 25). We anticipated that genetic perturbations of energy balance regulation would impact daily amounts, times, and intensities of these behaviors. Relative to WT mice, OB mice exhibited a dramatic decrease in daily movement, accompanied by significant decreases in both the intensity of locomotor bouts and in the time spent engaged in these bouts (FIG. 24). Although the chow intake of OB mice was significantly elevated on the initial day of home cage monitoring (mean±se: WT 3.0±0.2 g, OB 3.8±0.1 g, p=0.007), intake levels of WT mice subsequently increased to levels that did not significantly differ from those of OB mice (FIG. 24A).

Perhaps the most striking perturbation of behavior in OB mice was an alteration of their time budgets. These animals preserved the amounts of time they spent feeding and drinking while significantly increasing the amount of time spent in the IS at the expense of time spent engaged in locomotion and "other" behaviors (See FIGS. 24C and 25C, which present time budgets for WT, OB and 2C mice in the form of pie charts.) The preservation of time spent feeding and drinking, coupled with the marked increase in IS time, led to substantial alterations in the proportions of AS time spent feeding and drinking. During the active state, OB mice spent 41±2% of their time feeding and 4.3±0.2% of their time drinking compared with WT mice, which spent 19±1% and 1.9±0.1% of their time feeding and drinking (mean±se, p<0.0001 for feeding and drinking).

Relative to WT mice, 2C mice exhibited significant increases in daily intake and movement, accompanied by significant increases in feeding and locomotion bout intensities (FIG. 25A) without significant changes in the amount of time spent in feeding and locomotion bouts (FIG. 25B). Unlike the OB mice, 2C mice significantly decreased the amount of time spent in the IS and significantly increased the amount of time spent engaged in "other" behavior. In addition, the 2C mice exhibited a trend toward decreased time spent feeding, and as a result, the 2C mice spent only 12±1% of the AS feeding compared with 19±1% of the AS spend feeding by WT mice (mean±se, p=0.00008).

D. Daily State Patterns

Figure 26:
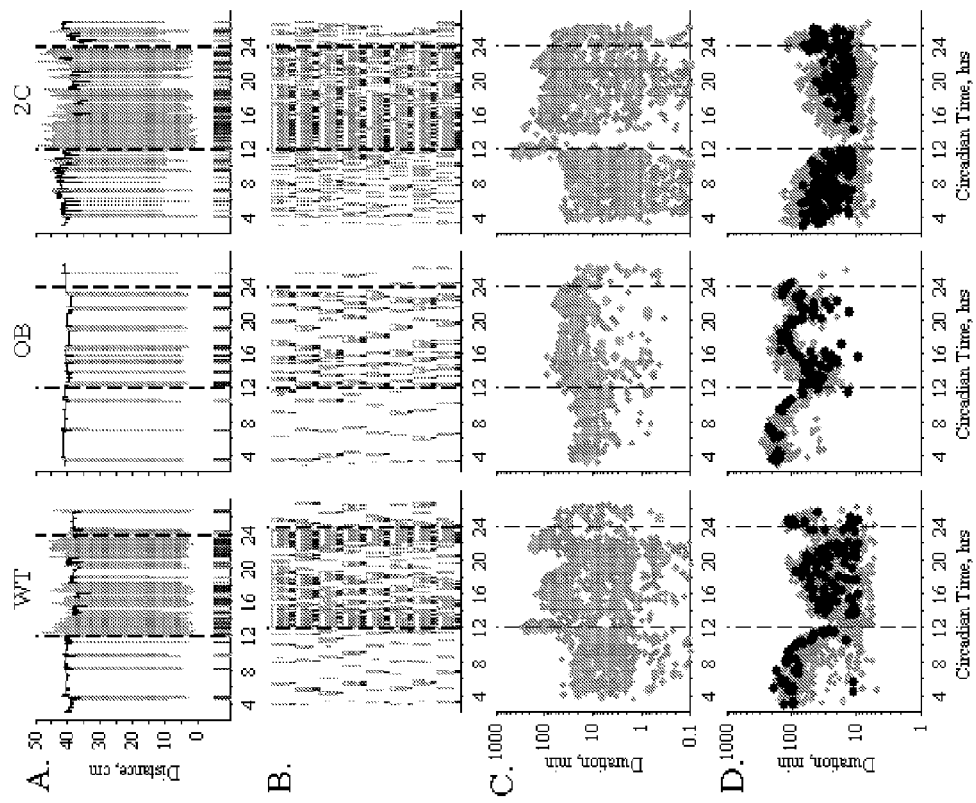
FIG. 26A displays the distance from the lick spout for a single day for a WT, OB, and a 2C mouse. Forest green lines indicate AS positions and black lines indicate IS positions. At the bottom of the each plot, feeding (orange) and drinking (blue) events are displayed.
FIG. 26B display eight days of data for the same three mice for feeding (orange), drinking (blue), and locomotion (neon green) events. ASs onsets and offsets are indicated by open bars (forest green) above the events.
FIG. 26C displays all AS onsets and durations for the same days and mice as green dots.
FIG. 26D displays all IS onsets and durations for the same days and mice as black dots. For FIGS. 26C and 26D circadian time of onset is on the x axis and the log duration is on the y axis. In order to compare the pattern of state onsets and durations for each mouse with its group all state onsets and durations for 64 randomly selected mouse days in each group are displayed as grey dots in the background.

To determine how behavioral organization varies with time of day, we examined the variation in IS and AS properties with circadian time. In FIG. 26A, representative patterns of ASs and ISs for single mice of each genotype for a 24 hr period are displayed. To illustrate the reproducibility of these daily patterns for individual mice, rasters displaying movement, feeding, and drinking events are displayed for 8 days with AS classifications shown above each day (FIG. 26B). To illustrate the reproducibility of these daily patterns across mice, the durations of ASs (FIG. 26C) and ISs (FIG. 26D) versus time of day are also displayed for these individual mice, and superimposed on data from the other animals in their cohorts.

Examination of these records reveals that AS durations in WT mice exhibited marked circadian variation with the longest durations occurring at dark cycle (DC) onset and offset. The IS durations also vary markedly with time of day with the longest durations occurring in the middle of the light cycle (LC) and DC. Qualitative comparison suggests that OB mice had greatly reduced numbers of short ASs and exhibited less circadian variation in AS durations. Strikingly, the long ASs at DC onset and offset appear to be absent in OB mice. In contrast, circadian variation in IS duration in OB mice seems relatively similar to that of WT mice but with an overall increase in IS duration. Unlike the OB mice, the overall pattern of AS durations in the 2C mice appear relatively similar to the WT pattern except for an apparent increase in the number of LC ASs. The overall pattern of IS durations in the 2C mice also appears relatively similar to the WT pattern except for an increase in the number of LC ISs.

Figure 27:
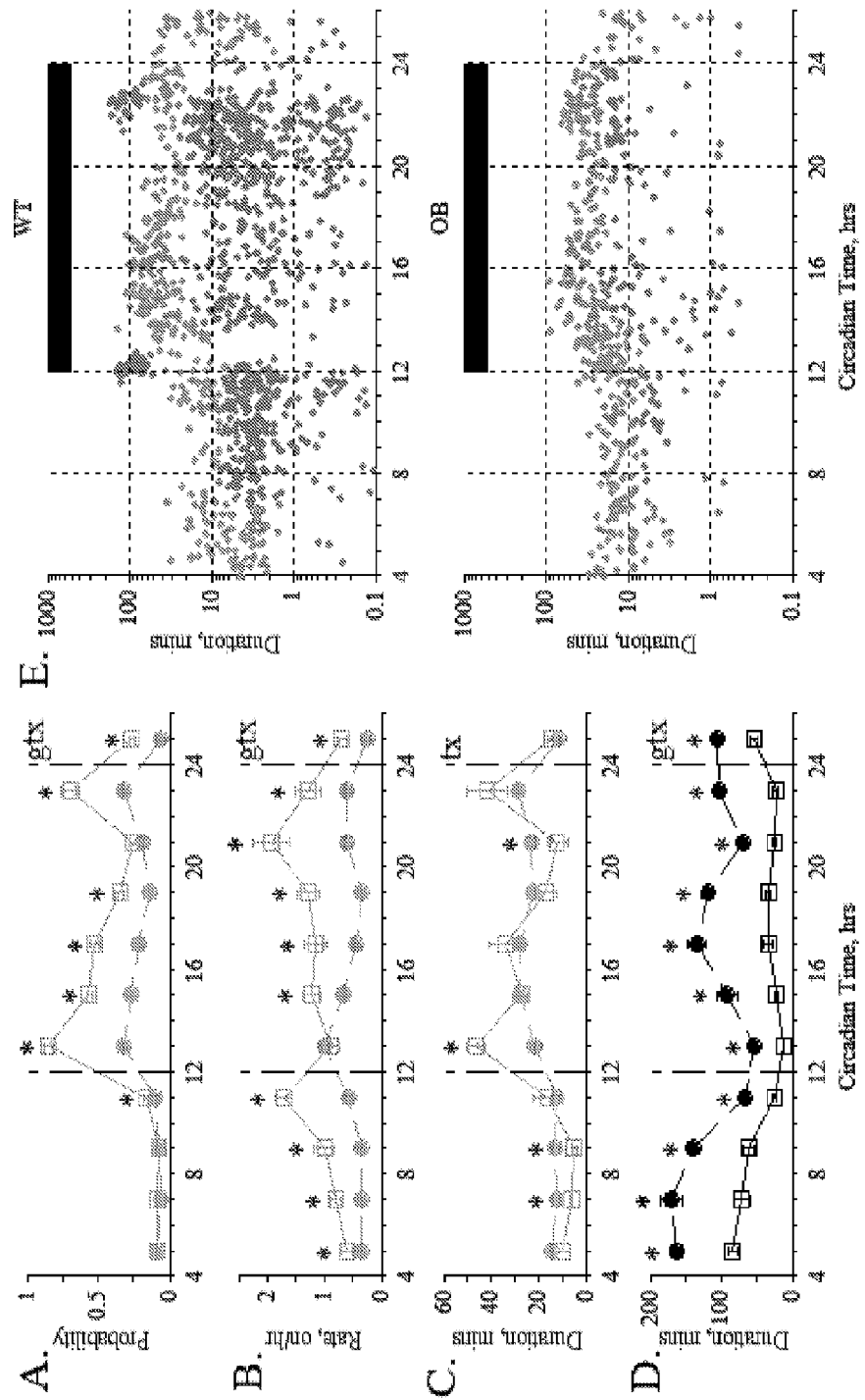
FIGS. 27A-27D show daily state patterns for WT and OB mice. Effects of genotype (G), time (T), and genotype by time interactions (G×T) were tested using 2×11 repeated measures ANOVA. In the upper right hand corner of each plot for this and subsequent figures, g indicates a significant effect of genotype, t indicates a significant effect of time of day, and x indicates a significant interaction of genotype with time of day. For this and subsequent figures, if a significant genotype by time interaction was present, post-hoc t-tests were carried out to compare state properties for each time bin. An asterisk is displayed at the center of each bin if a significant difference was detected ($p<=0.05$). Variation with time of day is displayed in 2 hour bins for WT (open squares) and OB (filled circles) mice.
FIG. 27E shows comparison clustering plots. Comparison clustering reveals a significant difference in the circadian time variation of AS number and duration between WT and OB mice ($\Sigma\chi^2=703$, $p<1.6\times10-4$). In the upper plot (WT) and lower plot (OB) each dot indicates the onset time (x axis) and log duration (y axis) of an AS. Magenta dots indicate regions where the WT mice contribute significantly more active states than the OB mice. Grey dots indicate regions where the number of active states contributed by the two groups is not significantly different. The regions with significant differences account for 91.2% of the $\Sigma\chi^2$ indicating that these regions account for most of the difference in the AS patterns.
Figure 28:
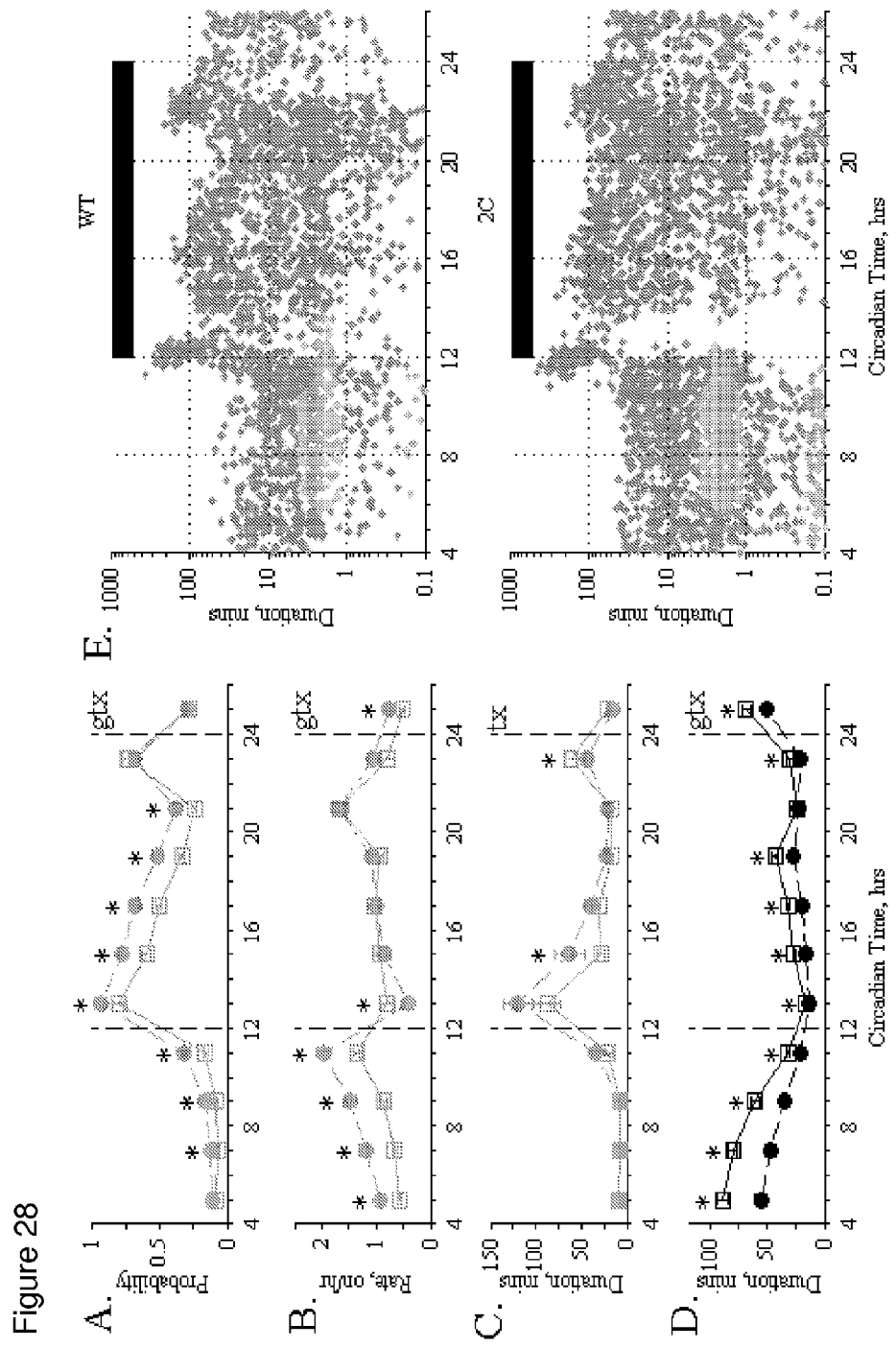
FIGS. 28A-28D show daily state patterns for WT and 2C mice. Variation with time of day is displayed in 2 hour bins for WT (open squares) and 2C (filled circles) mice.
FIG. 28E shows IS duration (G $p=5.0\times10^{-8}$, T $p=p=9.6\times10^{-81}$, G×T $p=6.7\times10^{-15}$).

To quantify these apparent differences in the circadian organization of AS and IS patterns, phenotypic comparisons were made using repeated measures ANOVA for AS probability, onset rate, and duration as well as IS duration. For all the state properties, there were highly significant effects of circadian time (FIGS. 27 and 28). The AS probabilities for all groups exhibited clear peaks at DC onset and offset, indicative of a crepuscular pattern (most active at dusk and dawn), rather than a simple nocturnal pattern (FIGS. 27A and 28A).

The WTOB comparison revealed the OB mice to exhibit decreased AS probabilities (FIG. 27A), decreased AS onsets (FIG. 27B), and increased IS durations (FIG. 27D). A significant effect of genotype on AS durations was not detected (FIG. 27C). However, the interaction of genotype with time was significant for all the state properties. Thus, the marked increase in AS probability at DC onset and offset exhibited by WT mice was greatly diminished in OB mice. In contrast, the nadirs in AS probability during both the DC and LC were similar, at which times, OB mice exhibit increased AS durations with low AS onset rates relative to WT mice.

Because the AS durations exhibited a complex pattern of circadian variation, we developed a novel algorithm for comparing these patterns between groups which we call comparison clustering. Comparison clustering determines if patterns of variation in state duration with circadian time differ between two groups and identifies aspects of the patterns that contribute most to any observed differences (details given above). Comparison clustering analysis identified several features accounting for distinct phenotypic differences in the circadian patterns of AS durations in WT and OB mice (FIG. 27E). For example, the long AS durations initiated around DC onset and offset in WT mice were demonstrated to be absent in OB mice. In addition, throughout the day short duration ASs were found to be markedly decreased in OB mice.

The WT2C comparison also revealed a marked phenotypic effect on circadian patterns of ASs and ISs. FIG. 28 reveals significant effects of the mutation: AS probability (increased; FIG. 28A)), AS onset rate (increased; FIG. 28B) and IS duration (reduced; FIG. 28D). A significant effect of genotype on AS durations (FIG. 28C) was not detected. However, interactions between genotype and time were significant for all state properties. For AS probability, 2C mice increase the probability of being in the AS in anticipation of the DC to a greater extent than WT mice, and continue to exhibit increased AS probability across the DC (FIG. 28A). The increase in AS probability during the LC is accompanied by a marked increase in the rate of AS onsets (FIG. 28B) along with a decrease in IS duration (FIG. 28D). In contrast, the increase in AS probability during the DC is primarily accompanied by a decrease in IS duration. Comparison clustering reveals that the increase in LC AS onsets is predominantly attributable to an increase in ASs of about 1-5 minutes in duration in the six hours preceding the DC (FIG. 28E).

In addition to examining the impact of the energy balance mutations on AS durations, we also determined their impact on the amount of food and water consumed and movement occurring during the ASs. This revealed marked differences in the effect of the lep and 5htcr gene mutations on the composition of the ASs. While the WTOB comparison did not reveal a significant effect of genotype on AS durations, there were significant effects of genotype on AS food (mean±se: WT 148±14 OB 361±20 mg) and water (WT 126±8 OB 310±15 mg) intake with both being dramatically increased as well as a on AS movement (WT 18±2 OB 6.7±0.6 m) which was markedly decreased (FIGS. 36A-36D). In contrast, the WT2C comparison did not reveal a significant effect of genotype on AS durations, AS food and water intake, nor on AS movement (FIGS. 37A-37D).

E. Daily Bout Patterns

Figure 3:
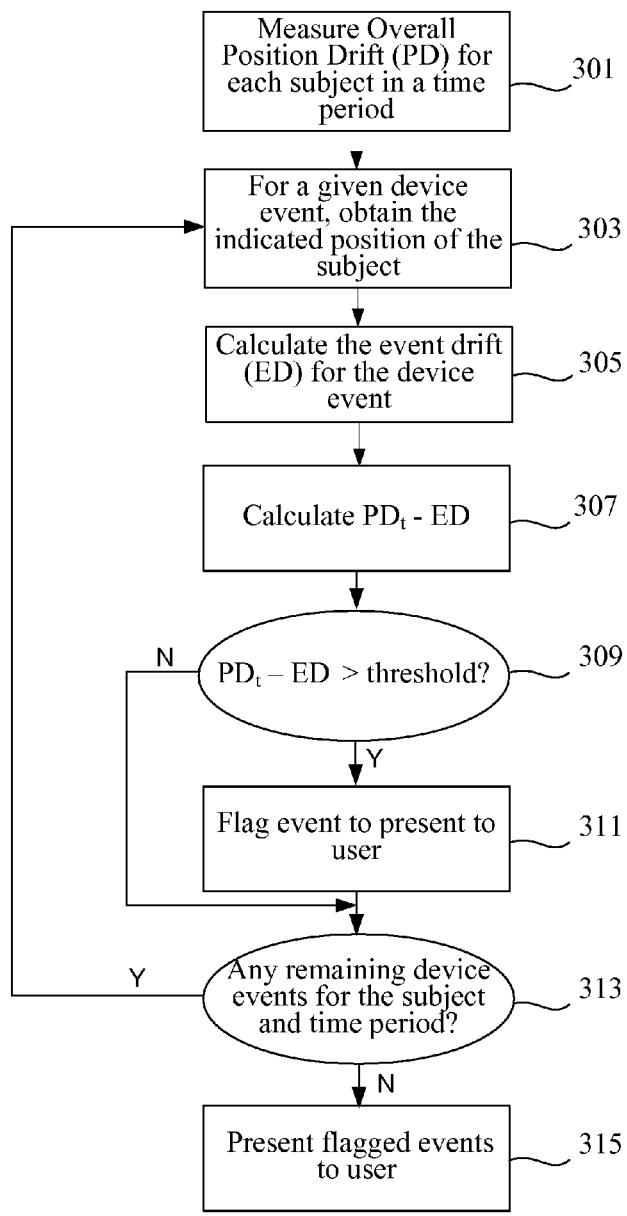
FIG. 3 is a flow diagram presenting certain operations employed in a method of detecting false device events (event onset errors) in accordance with various embodiments of the present invention.
Figure 29:
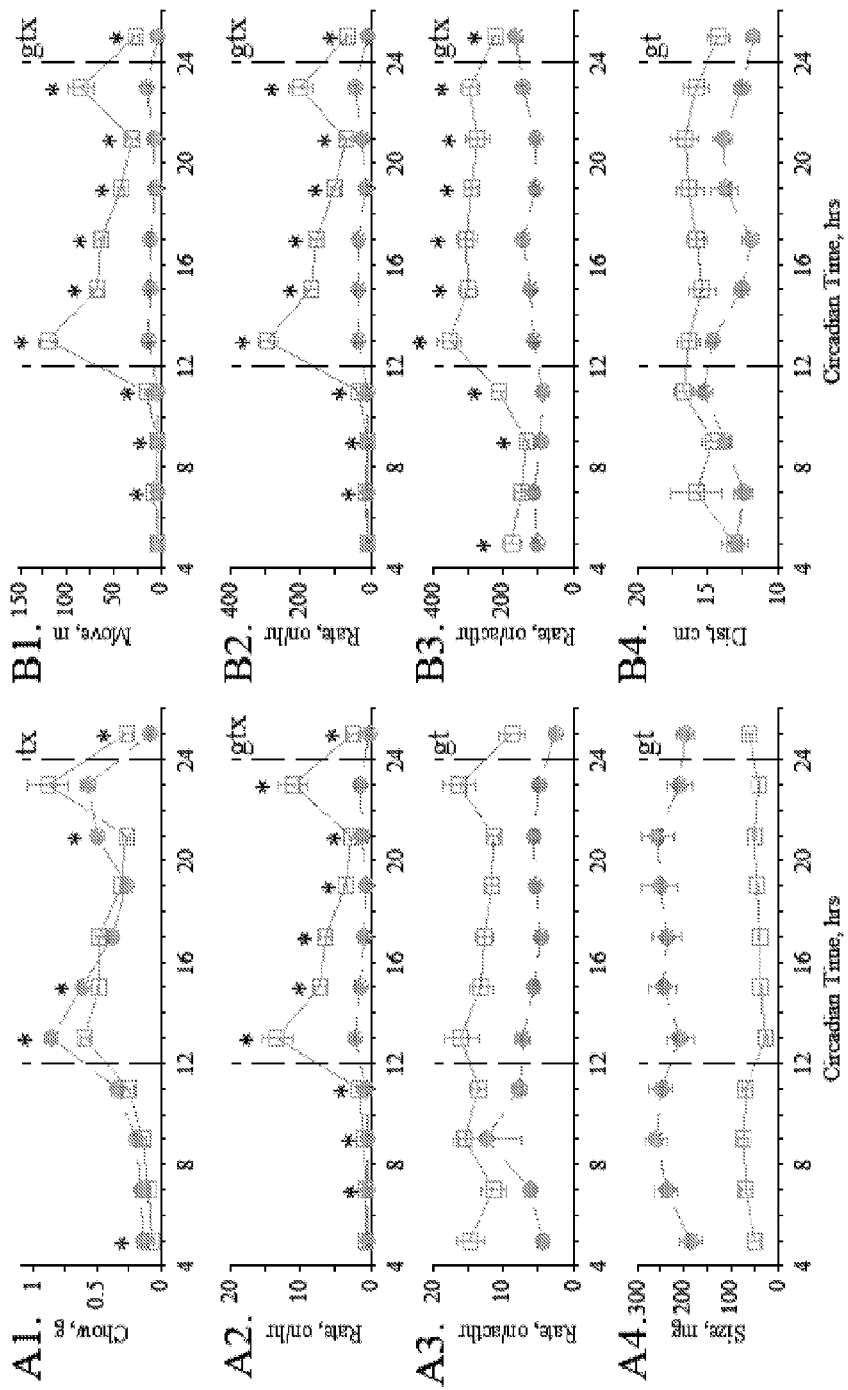
Figure 30:
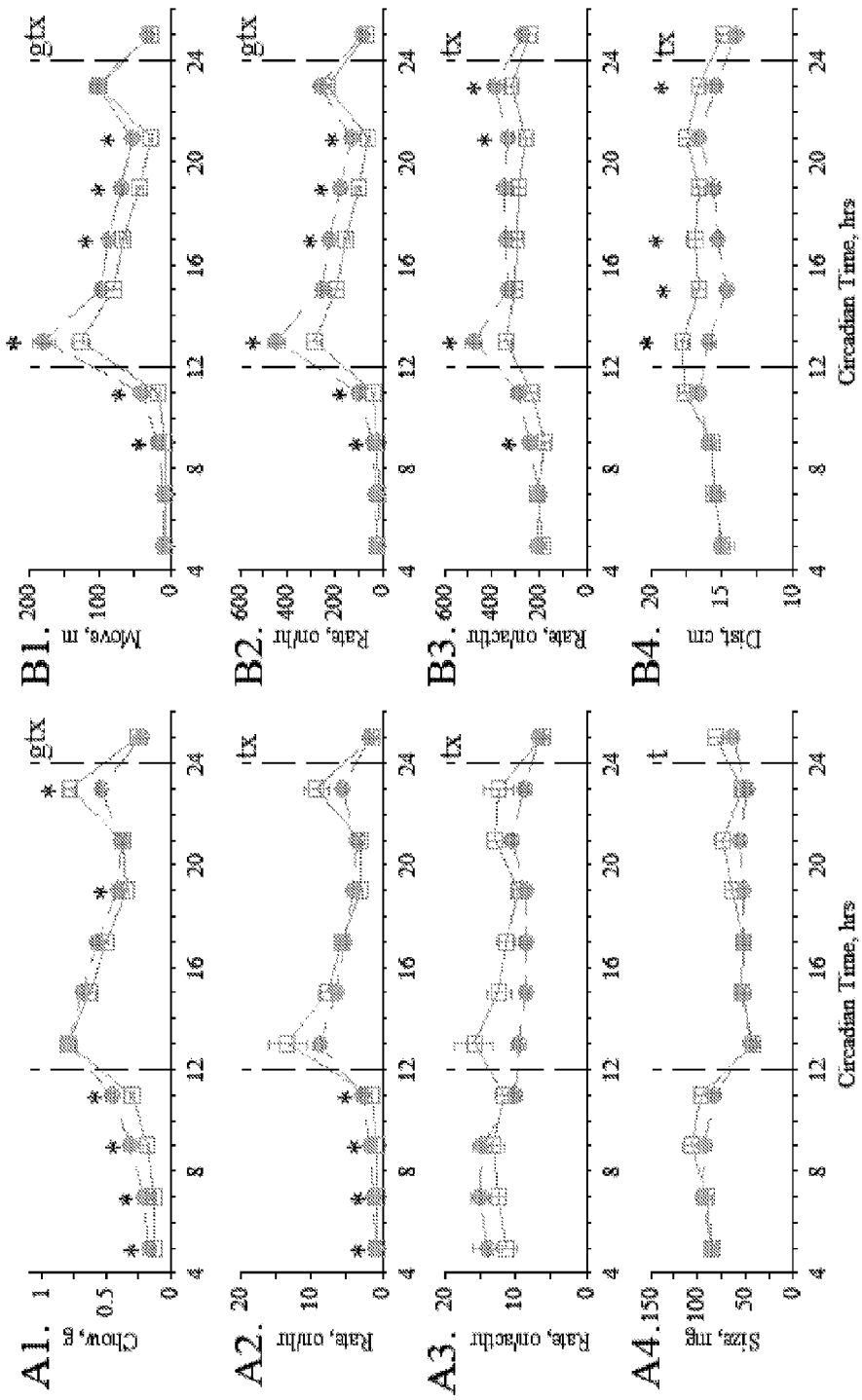

Phenotypic influences on circadian patterns of intake and locomotor bout properties were examined using repeated measures ANOVA. Across all groups, the daily patterns of intake and movement as well as the number of bouts per hour exhibited a crepuscular pattern (FIGS. 29A1-29A2, 29B1-29B2, 30A1, 30A2, and 30B1-30B2) similar to that of AS probability (FIGS. 27A, 28A). In contrast, such a pattern is not observed for bout size (FIGS. 29A4, 30A4), or when numbers of bouts are expressed as a function of time spent in the AS (FIGS. 29A3, 30A3). This suggested that circadian influences on intake and movement largely result from circadian variations in the probability of being in AS, rather than circadian effects on bout size or AS bout rate.

To test this possibility, we used multiple linear regression with dominance analysis (Azen and Budescu, 2003; Budescu, 1993) to determine the extent to which circadian patterns of intake and movement were attributable to the predictor variables: AS probability, AS bout rate, and bout size. For feeding and drinking, the predictor variables accounted for 72-92% of the circadian variation in intake. Notably, AS probability accounted for the majority of the circadian variation (65-88%) while AS bout rate and bout size accounted for a smaller proportion of the variance (0.3-18%). The predictor variables also accounted for a large proportion of the circadian variation in movement (92-96%). The AS probability accounted for most of the circadian variation in movement (49-60%) for both WT groups and the 2C mice. However, compared with intake, the AS bout rate accounted for a larger proportion of variance in movement (33-40%). In contrast, for OB mice, the AS probability accounted for 90% of the circadian variation in movement while the AS bout rate accounted for only 5% of the variance. Altogether, these findings suggest that circadian influences on AS onset rate and duration play a larger role in shaping circadian variation in intake and movement than do circadian influences on bout properties.

Figure 38:
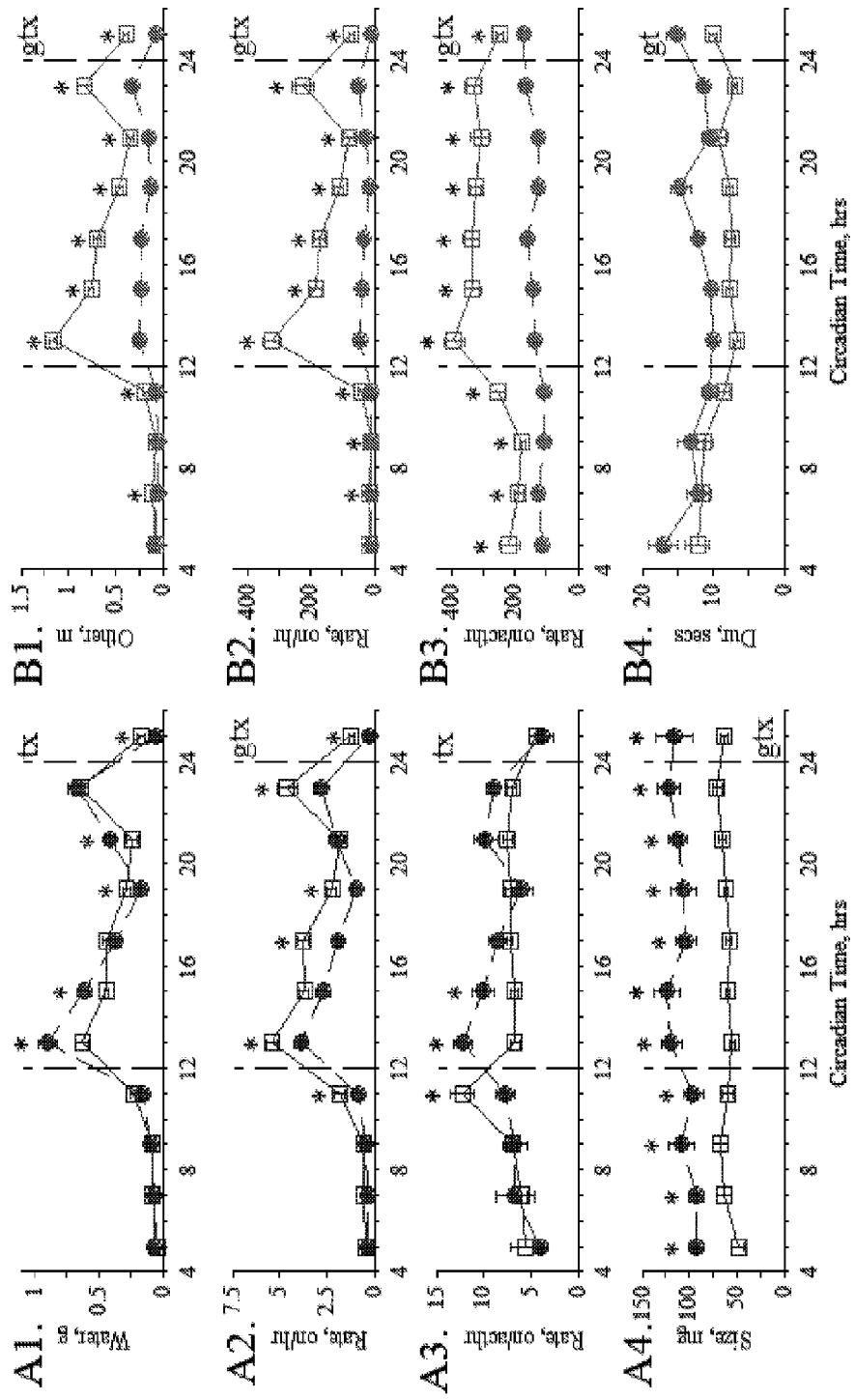
Figure 39:
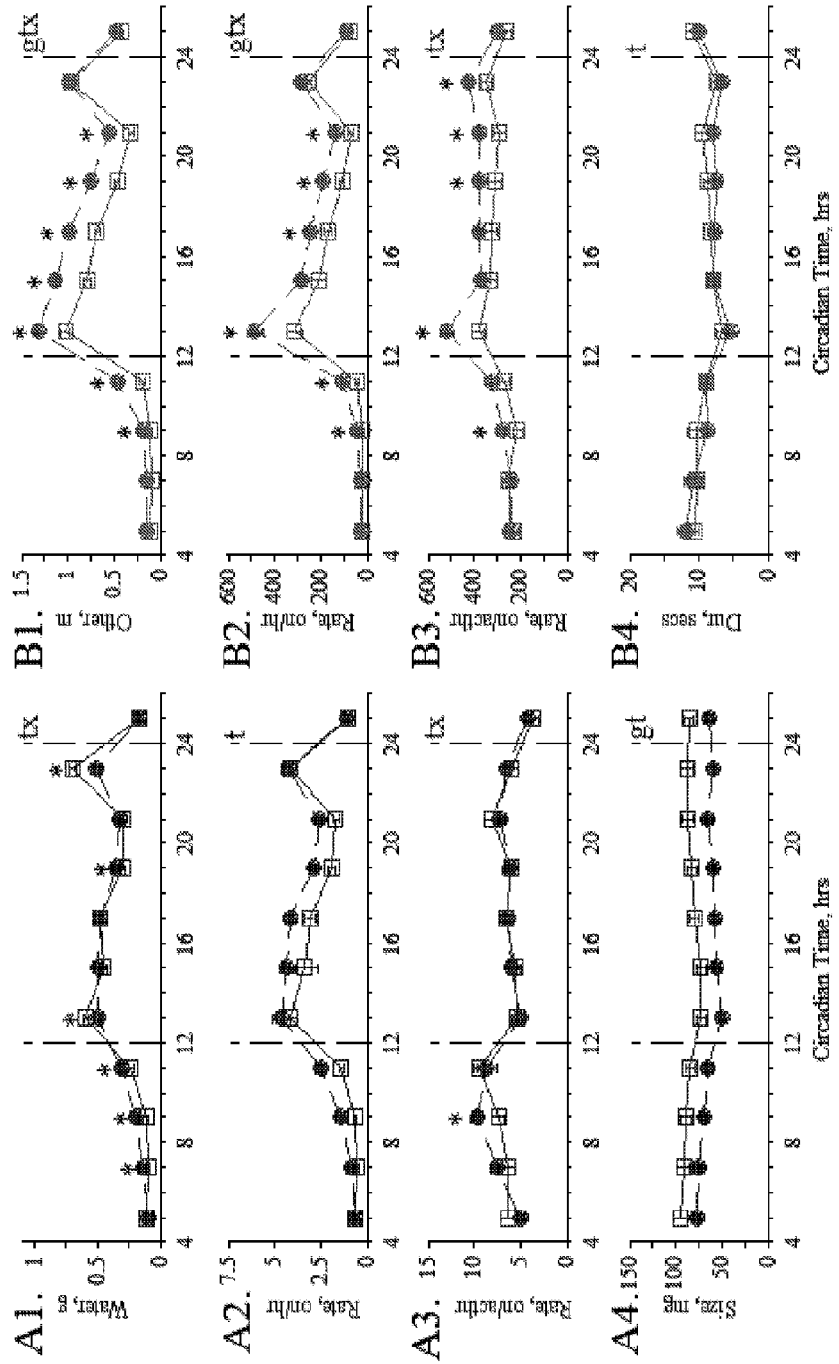

Comparison of the daily pattern of chow intake for WT and OB mice revealed a significant interaction of genotype and time (FIG. 29A1). However, the circadian influences on amounts of food consumed appear relatively small compared to the large phenotypic differences observed in feeding bout properties. OB mice displayed a large and significant decrease in bout rate that was most striking during the DC (FIG. 29A2). The OB AS bout rate was also significantly decreased throughout the day (FIG. 29A3) accompanied by a marked increase in bout size (FIG. 29A4). Drinking bout properties also exhibited significant effects of genotype with the OB mice exhibiting a decrease in drinking bout rate accompanied by a compensatory increase in drinking bout size (FIGS. 38A2 and 38A4). Similarly, FIGS. 39A1-39B4 show drinking and "other" bout properties for WT and 2C mice in each panel.

The large and significant decrease in daily movement exhibited by the OB mice also demonstrated a significant interaction of genotype with time of day; differences were largest during the DC (FIG. 29B1). This was reflected in a similar pattern in the bout rate (FIG. 29B2). In addition, the AS locomotion bout rate was substantially decreased, particularly during the DC (FIG. 29B3). By contrast, the average locomotor bout distance was only slightly decreased in OB mice (FIG. 9B4). These results indicate that the hypolocomotor phenotype of OB mice results both from a decrease in AS probability and in AS bout rate.

Comparison of the WT and 2C daily chow intake patterns revealed a significant effect of genotype as well as an interaction of genotype and time. The increased intake exhibited by 2C mice occurred predominantly in the 8 hours preceeding the DC (FIG. 30A1). Interestingly, 2C mice exhibited an increase in feeding bout rate during this time (FIG. 30A2) but did not exhibit increased bout sizes (FIG. 30A4) or increased AS bout rates (FIG. 30A3). This suggests that the increased AS probability in 2C mice contributes substantially to the increase in chow intake preceding the DC. Consistent with this, comparison clustering revealed that 2C mice exhibited an increase in the number of ASs of 5-10 minute duration over approximately 6 hours prior to DC onset (FIG. 28E). Notably, a large proportion of the ASs in this region contain feeding bouts without drinking bouts (WT 71% 2C 81%). This proportion was markedly enhanced compared to the proportion of all ASs containing feeding without drinking bouts (WT 29% 2C 39%). A selective increase in 2C mice of ASs with a high priority for feeding thus appears to occur preceeding the DC when these mice exhibit increased food intake.

A significant increase in daily movement was also observed in 2C mutants (FIG. 30B1), accompanied by a significant increase in the rate of LM bouts (FIG. 30B2). By contrast, there was not a significant effect of genotype on AS LM bout rate (FIG. 30B3) or on LM bout distance (FIG. 30B4). These results indicate that the hyperlocomotor phenotype of 2C mice results predominantly from an increase in AS probability.

While neither LM nor feeding bout sizes were altered in 2C mice, we did find that the durations of both LM (mean±se: WT1.62±0.07 2C 1.30±0.03 sec) and feeding (mean±se: WT 58±4 2C 46±4 sec) bouts were decreased compared with WT mice (RM ANOVA: LM G 0.0007 T $1.5 \times 10^{-21}$ G×T 0.3; Chow G 0.004 T $2.8 \times 10^{-55}$ G×T 0.2). It seems likely that the conservation of LM and feeding bout sizes results from the increased LM and feeding bout intensities observed in 2C mice (FIG. 25B).

F. Within Active State Structure

Figure 31:
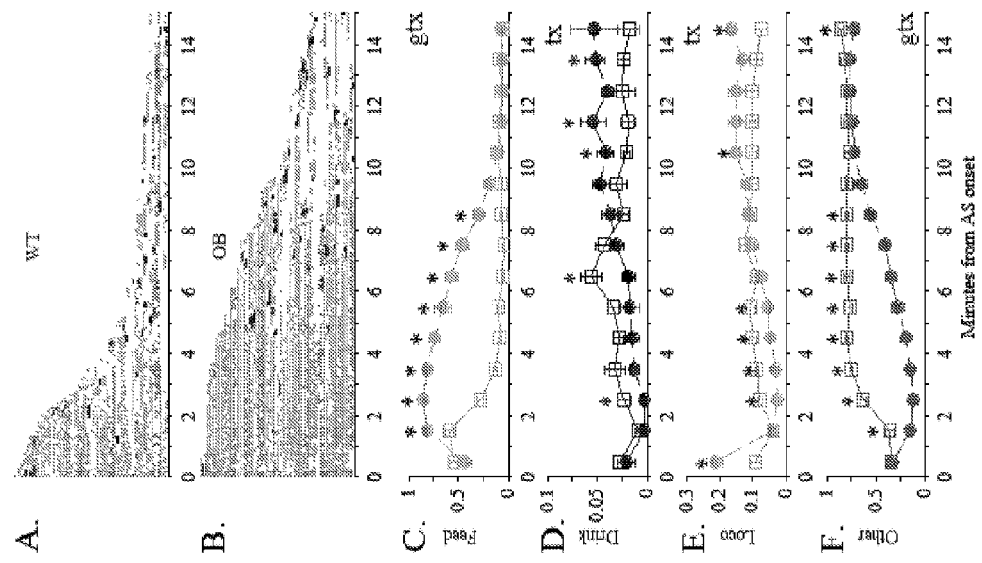
FIGS. 31A-31F show plots related to the Within Active State Structure for WT and OB mice. For WT (FIG. 31A) and OB (FIG. 31B) mice, the onsets and offsets of feeding (orange), drinking, and locomotion events occurring during 50 randomly selected ASs beginning and ending during the light cycle are displayed as open bars. Each line on the y axis displays the data for a single active state. Time during ASs is shown in minutes on the x axis with time zero indicating the onset of the ASs.
Figure 32:
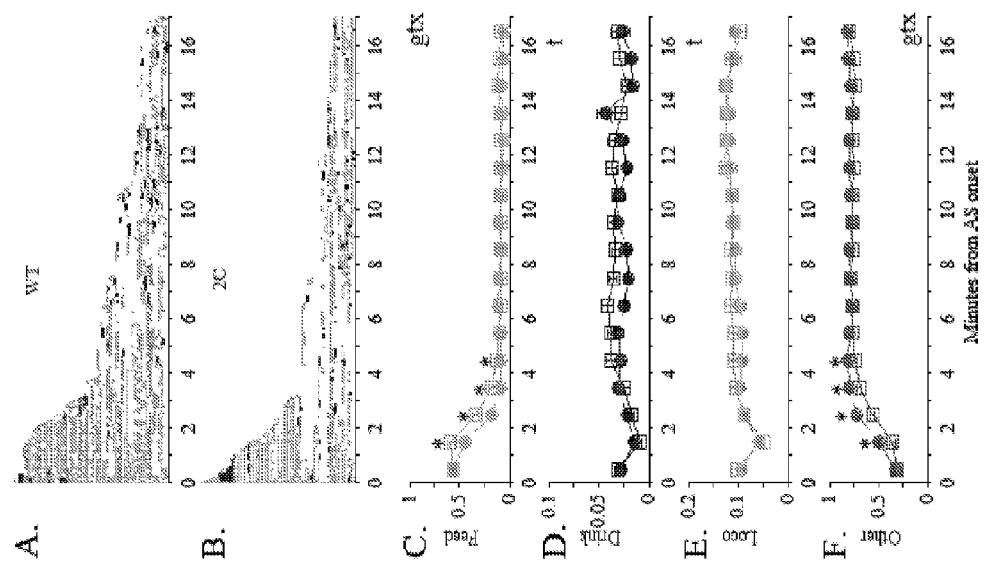
FIGS. 32A-32F show plots related to the Within Active State Structure for WT and 2C mice. For WT (FIG. 32A) and 2C (FIG. 32B) mice, the onsets and offsets of feeding (orange), drinking (blue), and locomotion (green) events occurring during 50 randomly selected ASs beginning and ending during the light cycle are displayed as open bars. For FIGS. 32C-32F, variation in bout probability with time since the onset of the ASs for WT (open squares) and 2C (filled circles) mice is displayed in one minute bins.

To examine the temporal organization of behavior within the active state, we aligned all LC AS onsets for each mouse and then determined the probabilities of feeding and drinking, LM and "other" behaviors. Peri-event histograms displaying feeding, drinking, and movement events within the aligned ASs revealed a striking regularity in structure (FIGS. 11 and 12). Mice were most likely to feed early in the ASs at which time there was a decrease in the probability of drinking, locomotion, and "other" behavior. Later in the ASs, mice were most likely to engage in bouts of "other" behavior. In accord with this observation, the effect of within-AS time on the probability of all behaviors was highly significant for both WTOB and WT2C comparisons. In addition, OB mice maintained a high probability of feeding at the beginning of the AS for much longer than the WT mice (FIG. 31B1). This was likely the result of the much longer feeding bouts exhibited by the OB mice. Moreover, OB mice exhibited delayed increases in probabilities of drinking, locomotion, and "other" behaviors within the AS (FIGS. 31A-31F). The WT2C comparison also revealed phenotypic influences on within-AS patterns, with the mutants exhibiting a more rapid decline in the probability of feeding accompanied by an early increase in the probability of engaging in "other" behaviors (FIGS. 31A-31F). Examination of within-AS patterns during the DC revealed a similar pattern of transitions in the probability of feeding, drinking, locomotion, and "other" bouts across all groups as well as similar differences between groups (data not shown).

3. Discussion

In a freely acting animal, behavioral organization results from the function and interaction of multiple physiological and behavioral systems. To quantitatively examine this organization in the mouse, we have developed an automated and reproducible method for describing the spatial and temporal structure of mouse home cage behavior. This description includes the identification of basic units of behavior (bouts of feeding, drinking, and locomotion) and a characterization of the temporal organization of these bouts into ASs. The ability to quantitatively describe home cage behavioral patterns provides an opportunity to uncover fundamental characteristics of behavioral organization and a powerful approach for assessing the roles of neural circuits in behavioral regulation. The utility of this approach is highlighted by its application to two mouse lines bearing genetic mutations that alter energy balance. Profound phenotypic influences on state and bout properties provide new insights into the manner in which these mutations impact behavioral regulation.

A. State Classification

An initial step in quantifying the organization of home cage behavior made use of the key observation that the behavior of mice alternated between two discrete states: active and inactive. This was revealed by qualitative examination of home cage behavioral records which showed movement around the cage clustering with feeding and drinking. The onsets and offsets of clusters of these behaviors were defined by prolonged episodes in which animals exhibited minimal movement in the vicinity of their nests. This is reminiscent of behavioral patterns observed in natural environments (Adams and Davis, 1967; Brown, 1966; Gray et al., 1998; Halle and Stenseth, 2000b; Herbers, 1981). Many animals exhibit a characteristic use of space in which they regularly forage and patrol within their home range and return to a refuge for rest or sleep. Animals thus appear to make transitions between ASs and ISs which are distinct not only in terms of the location of the animal and the behaviors in which animals engage but also in terms of marked differences in energetic costs and risks of predation (Lima and Dill, 1990). Transitions between ASs and ISs thus reveal prominent changes in the state of the animal and represent a basic feature of the behavioral organization of freely acting animals.

To quantify the occurrence of ASs and ISs, we utilized our ability to characterize the spatial structure of home cage behavior to identify ISs as episodes in which mice spent more time near their nest than at any other location in the cage. In turn, this allowed us to quantify the clustering of feeding, drinking, and locomotion into ASs. Individual mice exhibited AS onsets and durations with a complex yet stable pattern of circadian variation. In addition, single gene mutations disrupting energy balance produced consistent and dramatic alterations in AS patterns allowing us to assess the extent to which state properties contributed to phenotypic differences. The development and automation of a principled method for detecting ASs and ISs in the laboratory mouse thus enables the use of a broad array of experimental manipulations (genetic, environmental, pharmacological, lesions, etc) for examining the regulation of this fundamental unit of behavioral organization.

B. Bout Classification

Within ASs, we observe that occurrences of particular behavioral events, such as feeding, appeared to cluster together in time. Such clustering of behavioral events has long been recognized in both natural and laboratory settings and defines a basic unit of behavior called a bout (Berdoy, 1993; Collier and Johnson, 1997; Machlis, 1977; Mayes and Duncan, 1986; Morgan et al., 2000; Mori et al., 2001; Shull et al., 2001; Waggoner et al., 1998). The ability to quantitatively identify bouts enables the examination of this basic unit of behavior and the organization of behavioral events within the AS.

Commonly, the identification of a bout has involved the division of IEI durations into 2 types: short within bout intervals (WBIs) and longer interbout intervals (IBIs) (Langton et al., 1995; Tolkamp et al., 1998). However, when more than one behavior is being observed, then a bout of one behavior may also be defined to end when a different behavior begins (Machlis, 1977). If that intervening behavior is brief, then a bout criteria based on WI duration alone may fail to properly detect termination of a bout. Here, we developed a novel approach utilizing both the WI duration distribution and the location of the animal to improve bout classification. This approach allowed us to correctly identify short IBIs during which the animal left an intake device. These would have been misclassified as WBIs using a duration criteria alone (28% of IBIs).

In addition, the use of spatial information was essential to developing a robust automated algorithm for the accurate identification of ingestive bouts. We used spatial information to capture common features of the IEIs overcoming the common problem of variability in duration distributions of individual animals (Berdoy, 1993; Davison, 2004; Tolkamp and Kyriazakis, 1999). Spatial information allowed us to clearly divide the IEI duration distributions into two groups (short IEIs and long IEIs) without making assumptions regarding the number of log normal distributions required to fit the data for each mouse (FIG. 33).

During the ASs, mice moved around the cage between bouts of feeding and drinking with a characteristic pattern in which rapid movement between locations alternated with long pauses and small movements in local areas. A similar pattern of movement has also been observed in rodents exploring novel environments (Eilam and Golani, 1989; Golani et al., 1993), and quantification of this movement pattern has provided insights into the organization of exploratory behavior (Drai et al., 2000; Drai and Golani, 2001; Tchernichovski and Benjamini, 1998; Tchernichovski et al., 1998; Tchernichovski and Golani, 1995). In fact, this type of intermittent locomotion occurs in a wide variety animals and behavioral contexts such as foraging and patrolling in natural environments (Kramer and McLaughlin, 2001). It is thought that pauses may increase endurance and the capacity of the animal to detect relevant stimuli. This pattern thus appears to reflect a general feature of the organization of movement in multiple contexts. To quantify this pattern of movement, we took advantage of the character of movements occurring during ingestive bouts and ISs to develop a supervised learning algorithm. This classified movement during the ASs into bouts of locomotion and non-locomotor movement. One intriguing observation resulting from this classification was that while locomotor bouts only account for 4% of daily time they account for 76% of the total distance moved each day.

C. Levels of Behavioral Organization

Having devised procedures for defining ASs and the bouts of behavioral events that occur within them, we considered relationships between these levels of behavioral organization. Prior studies on the temporal structure of ingestive events described not only the existence of bouts, but also a higher level of organization in which bouts are clustered together in time (Berdoy, 1993; Machlis, 1977; Tolkamp and Kyriazakis, 1999; Yeates et al., 2001; Zorrilla et al., 2005). Whereas such studies primarily focused on the organization of particular behaviors in isolation, we observed that bouts of feeding, drinking and locomotion are all clustered together within ASs. This suggests that the mechanisms responsible for this clustering are not unique to particular behaviors. The classification of ASs and ISs thus appears to capture a fundamental transition in the state of the animal characterized by the higher order coordinated organization of bouts into clusters of multiple behaviors.

Subsequent analyses revealed a characteristic pattern of temporal interrelationships among the diverse behaviors that occur within the AS. Using the AS onsets as time zero, we calculated the time variation in the probability of engaging in particular behaviors during ASs. This revealed a clear sequential structure. The probability of feeding was high early in the AS, associated with a decreased probability of drinking, locomotion, and "other" behaviors. As the feeding probability declined, the probability of engaging in bouts of "other" behavior increased and eventually the AS ended. This suggests that there are orderly transitions in an animal's behavioral priorities during an AS. Interestingly, this temporal structure is reminiscent of the behavioral satiety sequence (BSS): a sequence of behaviors observed in animals with access to highly palatable foods or after food deprivation (Antin et al., 1975; Ishii et al., 2003). In these instances, animals initially engage in feeding followed by grooming, sniffing, rearing, locomotion and then rest. The similarity of within AS structure to the BSS suggests that the transitions between behavioral priorities occurring in both cases are similar. This is also suggests that the goal of obtaining food may be a primary determinant of AS initiation in the home cage.

The ability to characterize the properties of states and bouts enables us to determine the level(s) of organization through which biological processes and experimental manipulations shape behavioral patterns. An illustrative example relates to the manner in which circadian influences produce the characteristic crepuscular pattern of ingestive behavior in C57BL/6 mice. One means by which animals could vary intake with time of day would be to vary behavior at the level of bout properties such as duration, intensity, and resultant bout size. Another means would be to vary the rate of bout onsets within the AS (AS bout rate) or at a higher level of organization by varying the transition rates and durations of the ASs and ISs. Examination of behavior at these levels of organization revealed that while AS intake bout rate and bout size varied significantly with time of day, variation in AS probability explained most of the circadian variation in intake. These results suggest that the crepuscular pattern of intake in C57BL/6 mice results primarily from circadian influences at the level of state transitions and durations, rather than from changes in intrinsic properties of ASs or from changes in bout properties.

D. Energy Balance Mutants

The utility of a system enabling the continuous quantitative assessment of diverse behaviors across multiple levels of organization is highlighted by new phenotypic insights into OB mice, a line that has been extensively investigated for nearly 60 years. One striking finding was the large increase in IS time in OB mice and the manner in which this was achieved. This increase was achieved at the expense of time spent in bouts of locomotion and "other" behavior. By contrast the amounts of time spent feeding and drinking were preserved. As a result, a doubling of the percent of time devoted to feeding and drinking during the AS was observed in OB mice. This shift in the use of time reveals a dramatic rearrangement in the behavioral priorities of OB mice with an increased priority placed on remaining in the IS at the expense of time spent engaged in locomotion and "other" behaviors.

These time budget alterations were accompanied by marked changes in the organization of behavior at the levels of both bout and state properties. The circadian variation in AS probability and the underlying patterns of ASs and ISs were strikingly different in the WT and OB mice. Although their AS probabilities were similar during a large portion of the light cycle (LC), OB mice spent much less time in the AS during the DC than the WT mice. This difference in AS probability was particularly marked at the beginning and end of the DC. Circadian variation in AS probability and duration was thus substantially diminished in the OB mice, raising the possibility that their entrainment to the environment was impaired. However, OB mice exhibited marked circadian variation in IS duration, suggesting that their capacity to entrain to their environment remained intact but that circadian variation of particular behaviors was altered.

Consistent with this possibility, OB mice exhibited a crepuscular pattern of food and water intake, with peaks in intake at DC onset and offset that were similar to those of WT mice. In contrast, circadian variation in the magnitude of locomotion and "other" behaviors was strikingly diminished in OB mice. We found this to result from phenotypic abnormalities at two levels of behavioral organization: 1) patterns of ASs and 2) within-AS bout rates. With regard to AS patterns, comparison clustering revealed OB mice to have lost the long duration ASs normally seen at DC onset and offset. These reductions in AS durations likely result from selective decreases in locomotion and "other" behaviors at these times. Additionally, OB mice did not exhibit the marked increases in within-AS bout rates of locomotion and "other" behaviors observed during the DC in WT mice. This suggests that a time-of-day-dependent signal that increases locomotion and "other" behaviors may be reduced in OB mice, or that a competing process inhibits locomotion and "other" behavior without decreasing overall food and water intake.

Simply examining OB food and water intake at the level of circadian variation as revealed by changes in amount consumed during two hours bins indicated that the OB pattern of intake was relatively preserved. In contrast, examination of bout and state properties revealed that the manner in which this pattern of circadian variation was achieved was markedly perturbed. OB mice exhibited consistently larger feeding (OB 222 mg WT 38 mg) and drinking (OB 114 mg WT 61 mg) bouts than WT mice. However, the increased bout sizes were accompanied by decreased bout rates resulting in similar intake and crepuscular patterns in both WT and OB mice. For both feeding and drinking, the decreases in intake bout rates resulted primarily from changes in state organization (decreased AS onset rates accompanied by prolonged IS durations). These dramatic changes in the regulation of ingestion would not have been revealed without the ability to characterize the organization of behavior at the levels of bout and state properties.

These behavioral alterations likely result from the absence of leptin in OB mice acting as a signal to increase energy intake and decrease energy expenditure (Friedman and Halaas, 1998). Behaviorally this can be manifested by increased energy intake and decreased physical activity. We observed that at 3 months of age, OB mice exhibit a small increase in food intake (108% of WT) but a dramatic decrease in movement (17% of WT). This is consistent with prior work demonstrating that the relative hyperphagia in the OB mice declines with age while the decreases in activity persist (Joosten and van der Kroon, 1974; Mayer, 1953). It thus appears that decreased movement in the OB mice represents a major behavioral alteration contributing to conservation of energy. Accordingly, decreases in movement were apparent at multiple levels of behavioral organization. OB mice increased time spent in the IS, decreased time spent in bouts of locomotion, and decreased their intensity of locomotion.

Signals favoring energy conservation could potentially account for the altered feeding and drinking patterns observed in the OB mice. Such signals, combined with the increased body mass conferred by obesity, could increase the perceived costs of food acquisition in these animals. It is therefore notable that animals respond to experimental manipulations that increase the cost of food acquisition (eg, increased lever presses, exposure to cold) by reducing the number and increasing the size of feeding clusters (Collier et al., 1972; Johnson and Cabanac, 1982; Morato et al., 1995; Petersen and McCarthy, 1981). Thus, patterns of food intake occurring under increased costs bear a marked resemblance to those of OB mice.

The quantitative description of behavioral patterns in OB mice enables the generation of additional testable hypotheses regarding the impact of leptin on the wide array of processes that shape behavior. For example, animals can conserve energy by eliminating activities, such as reproduction, that are not immediately essential to survival (Ahima et al., 1996). Because male OB mice have very low levels of testosterone and are infertile (Caprio et al., 2001; Swerdloff et al., 1976), impairments of androgen signaling may play a role in the behavioral patterns observed in these mice. Consistent with this, gonadectomy increases feeding bout size and decreases locomotion in male mice and rats (Chai et al., 1999; Perrigo and Bronson, 1985; Petersen, 1978; Roy and Wade, 1975). Altogether, it is clear that detailed examination of home cage behavior in OB mice reveals alterations of multiple behaviors at distinct organizational levels. This facilitates the generation of testable hypotheses regarding the contributions of multiple neuroregulatory systems to these changes.

In contrast with OB mice, the alterations in the organization of behavior in 2C mice largely reflected changes in the circadian variation of state patterns (FIGS. 36A-36D & 37A-37D). The 2C mice exhibited a decrease in IS duration throughout the day and a marked increase in the AS onset rate during the LC. Interestingly, the increased food intake in the 2C mice was restricted to the LC when the AS onset rate and AS probability were increased. During this time neither feeding AS bout rate nor bout size were increased, thus the increased AS probability appears to play an important role in the increased food intake exhibited by the 2C mice. In fact, comparison clustering revealed that in the 6 hours preceding DC onset, the 2C mice exhibited an increase in short duration ASs (1-5 minutes) that frequently contained feeding bouts without drinking bouts. The increased LC AS onset rate in the 2C mice thus corresponds with an increase in ASs with a high behavioral priority for feeding.

While state pattern changes in the 2C mice were most notable, changes in within-AS properties were also observed. For example, the 2C mice had shorter feeding bout durations than the WT mice but they also exhibited compensatory increases in bout intensity, resulting in bout sizes similar to those of WT mice. A similar compensation was observed with regard to locomotion. The 2C mice exhibited decreased locomotion bout durations but increased bout intensity resulting in similar bout sizes. These findings, as well as the preservation of crepuscular intake patterns in OB mice reveal that alterations at one level of organization may frequently be compensated by changes in another level of organization to preserve various aspects of the behavioral pattern such as bout size or circadian intake pattern.

An additional alteration in within-AS properties of 2C mice was also observed. During the DC, 2C mice increased AS bout rates for locomotion and "other" behavior more than WT mice but exhibited a trend toward decreased AS feeding bout rates. This difference likely accounts for the observation that the increased LC AS probability in 2C mice was accompanied by increased feeding and locomotion but the increased DC AS probability was only accompanied by increased locomotion. Interestingly, similar circadian influences on feeding and locomotion are seen with administration of orexin, a neuropeptide produced by neurons of the lateral hypothalamus (LH). During the LC, orexin treatment increases both feeding and movement but during the DC orexin only increases movement (Espana et al., 2002). The similarity in the circadian dependence of orexin effects and the expression of 5HT2CRs in the LH, raise the possibility that hyperactivity of orexin signaling neurons may contribute to the 2C phenotype. Other examples of selective LC hyperphagia include the increased feeding resulting from VMH lesions (Choi and Dallman, 1999; Choi et al., 1998) and from loss of histamine H1 receptor function (Masaki et al., 2004) suggesting VMH and histamine system function as other possible mechanisms that might contribute to the LC hyperphagia of 2C mice Alteration in dopamine system function may also play a role in some of the phenotypic alterations of 2C mice observed in this study. Previously, 2C mice have been demonstrated to exhibit increased responses to novelty and cocaine accompanied by alterations in dopamine system function with elevated dopamine levels (Rocha et al., 2002). The increased home cage movement observed in the 2C mice may thus result from dopamine system hyperactivity. This may also contribute to their increased food intake as hyperdopaminerigic mutant mice (dopamine transporter knock down) exhibit increased food intake (Pecina et al., 2003). Interestingly, withdrawal from chronic cocaine treatment in rats results in a persistent selective LC increase in food intake (Giorgetti and Zhdanova, 2000). Thus, alterations in the functioning of the dopamine system could also contribute to the selective LC increase in food intake in the 2C mice.

Finally, the increased time spent by 2C mice in locomotion and "other" behaviors is intriguing to consider in light of the phenomenon known as "non-exercise activity thermogenesis" (NEAT) (Levine et al., 1999). In humans, NEAT refers to all physical activity except purposeful exercise, and includes routine daily activities, such as sitting, standing, walking and fidgeting. Overfeeding was found to increase NEAT, and the extent to which this occurs is highly correlated with weight gain (Levine et al., 1999). Accordingly, obese individuals display reduced NEAT, (increased time sitting and diminished time standing and ambulating) even after weight loss (Levine et al., 2005; Ravussin, 2005). It has thus been proposed that NEAT levels are innately determined and subject to biological regulation (Levine, 2007). In this context, it is intriguing that time spent engaged in both locomotor and nonlocomotor physical activity is elevated in 3 month old 2C mice. At this age, body weights and adiposity levels of 2C mice are normal, despite chronic elevations of food intake (Nonogaki et al., 1998). It is therefore possible that elevations of NEAT enable these animals to maintain normal body weights. Since both orexinergic and dopaminergic pathways have been implicated in NEAT regulation (Teske et al., 2007), perturbed serotonergic influences on these pathways may contribute to NEAT elevation in 2C mice.

The invention claimed is:

1. An automated method of analyzing animal behavioral data collected using a measurement system, said behavioral data comprising spatial and temporal information regarding positions of an animal subject in a defined measurement area during a temporal window, said method comprising:
    identifying transitions between active states and inactive states of the animal subject using the spatial and temporal information, wherein the entire duration of the temporal window is divided into the active states and the inactive states, an active state being a state in which there is a higher probability of a plurality of different types of behaviors indicating activity than in an inactive state, and the inactive state being a state during which the probability of being in one or more characteristic locations is higher than a probability during the active state.

2. The automated method of claim 1 further comprising characterizing activity within identified active states as different types of behaviors.

3. The automated method of claim 1, wherein inactive states of the animal subject are classified during a time window from animal behavioral data collected over a measurement period using a measurement system, the animal behavioral data comprising event information regarding spatial positions of the animal subject in a measurement area, and wherein the identifying transitions between active states and inactive states of the animal subject comprises:
    receiving event information regarding the spatial positions of the animal subject during the time window;
    analyzing said event information to determine information regarding durations of the spatial positions in the time window;
    determining the longest duration position (LDP) in the time window;
    determining information about the spatial distance of every pause location from the longest duration position (LDP); and
    using the distance and duration information to classify inactive states of the animal subject in the time window.

4. The method of claim 3, wherein the animal behavioral data further comprises device event information regarding behavior of the animal subject at or with one or more types of devices at known locations in the measurement area, the method further comprising identifying any device events that occur during the classified inactive states.

5. The method of claim 4, further comprising optimizing the classification of the inactive states based on an inactive state error rate.

6. The method of claim 5 wherein the inactive state error rate is indicated by the occurrence of the device events during the identified inactive states.

7. The method of claim 4, further comprising reclassifying inactive states having a device event as active states.

8. The method of claim 7, further comprising calculating an active state error rate.

9. The method of claim 8, wherein calculating an active state error rate comprises comparing the total area traversed by the animal subject during each active state to areas traversed by the animal subject during inactive states.

10. The method of claim 3, further comprising identifying inactive states of the animal subject for multiple time windows in the measurement period and selecting a time window.

11. The method of claim 3, further comprising: identifying inactive states of the animal subject for multiple movement thresholds, wherein a movement threshold defines the minimum distance between two consecutive positions that must occur for a change in position location to be considered a movement in determining the duration of positions; and selecting a movement threshold.

12. The automated method of claim 1, further comprising analyzing a set of animal subject behavioral data collected over a measurement period using a measurement system by:
receiving position tracking information for the animal subject in a defined area during the measurement period and information about temporal patterns of one or more behaviors during the measurement period; and
using the position tracking information and the temporal information to identify bouts of the one or more behaviors.

13. The automated method of claim 12 further comprising receiving device event information regarding behavior of the animal subject at or with one or more devices at known locations in the defined measurement area, wherein each device is associated with a particular behavior.

14. The method of claim 3, wherein using the distance and duration information to classify inactive states of the animal subject in the time window comprises:
determining an inactive position duration threshold based on information comprising the spatial distance of every pause location from the LDP and the durations of the spatial positions;
using the inactive position duration threshold to classify inactive states of the animal subject in the time window; and
identifying transitions between active and inactive states.

15. The method of claim 14, wherein using the inactive position duration threshold to classify inactive states comprises classifying inactive states as consecutive positions with durations greater than the inactive position duration threshold.

16. The method of claim 12, wherein the bouts of the one or more behaviors comprise bouts of feeding, drinking, locomotor movements, non-locomotor movements, resting, or sleeping.

17. The method of claim 12, further comprising comparing temporal patterns of the active and inactive states across different animals.

18. The method of claim 12, further comprising comparing temporal patterns of the bouts of the one or more behaviors across different animals.

19. The method of claim 12, further comprising dissociating temporal patterns of the active and inactive states from temporal patterns of the bouts of the one or more behaviors.

20. The method of claim 1, wherein the active states being states in which there is an increased probability of locomotion and additional behaviors indicating physical activity and the inactive states being states characterized by increased likelihood of sleep and rest.

21. The method of claim 1, wherein the animal subject is classified as in an inactive state when it stays within a defined area for a duration longer than an inactive state threshold, and classified as being in an active state when it stays within a defined area for a duration shorter than the inactive state threshold.

22. The method of claim 21, wherein the defined area is determined by a movement threshold.

23. A method of analyzing animal behavioral data collected using a measurement system, said behavioral data comprising spatial and temporal information regarding spatial positions of an animal subject in a defined measurement area, said method comprising:
using the spatial information to identify transitions between active and inactive states, which comprises determining an inactive position duration threshold with reference to a longest duration position (LDP), wherein the LDP is the location of the longest duration between animal subject movements during a time period.

24. The method of claim 23 wherein using the spatial information to identify transitions between active and inactive states further comprises determining the relative distances of other positions of the animal subject during the time period from the longest duration position (LDP).

25. The method of claim 23 further comprising characterizing activity within identified active states as different types of behaviors.

26. The method of claim 25 wherein characterizing activity within identified active states comprises receiving position tracking information for the animal subject in a defined area during a measurement period and information about temporal patterns of one or more behaviors during the measurement period; and using the position tracking information and the temporal information to identify bouts of the one or more behaviors.

27. The method of claim 23, wherein said behavioral data comprise spatial positions and durations of the spatial positions of the animal subject during the time period, said method further comprising:
determining information about the spatial distances of the spatial positions from the longest duration position (LDP);
determining an inactive position duration threshold based on information comprising the spatial distances of the spatial positions from the LDP and the durations of the spatial positions; and
classifying inactive states as consecutive positions with durations greater than the inactive position duration threshold.

* * * * *

UNITED STATES PATENT AND TRADEMARK OFFICE
CERTIFICATE OF CORRECTION

| | | |
|---|---|---|
| PATENT NO. | : 9,152,851 B2 | Page 1 of 1 |
| APPLICATION NO. | : 12/863970 | |
| DATED | : October 6, 2015 | |
| INVENTOR(S) | : Evan Goulding et al. | |

It is certified that error appears in the above-identified patent and that said Letters Patent is hereby corrected as shown below:

Column 1, line 15, change "grant no. K08 MH071671" to -- grant numbers K08 MH071671 and R01 MH077128 --.

Signed and Sealed this
Sixteenth Day of February, 2016

Michelle K. Lee
*Director of the United States Patent and Trademark Office*